(12) United States Patent
Agnew et al.

(10) Patent No.: US 11,113,970 B2
(45) Date of Patent: Sep. 7, 2021

(54) APPARATUS AND METHOD OF SAFETY SUPPORT FOR VEHICLE

(71) Applicant: HYUNDAI MOBIS CO., LTD., Seoul (KR)

(72) Inventors: David Agnew, Plymouth, MI (US); Doug MacKenzie, Plymouth, MI (US); Nathan Johnson, Plymouth, MI (US)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/698,038

(22) Filed: Nov. 27, 2019

(65) Prior Publication Data
US 2020/0098265 A1    Mar. 26, 2020

Related U.S. Application Data

(63) Continuation of application No. 16/600,070, filed on Oct. 11, 2019, which is a continuation of application
(Continued)

(51) Int. Cl.
*G08G 1/16* (2006.01)
*B60W 50/00* (2006.01)
(Continued)

(52) U.S. Cl.
CPC .............. *G08G 1/16* (2013.01); *B60K 28/06* (2013.01); *B60K 28/066* (2013.01); *B60W 30/09* (2013.01);
(Continued)

(58) Field of Classification Search
None
See application file for complete search history.

(56) References Cited

U.S. PATENT DOCUMENTS 9,566,986 B1    2/2017  Gordon
10,446,031 B2   10/2019 Agnew et al.
(Continued)

FOREIGN PATENT DOCUMENTS

DE        10220782       11/2003
DE        102011109618    2/2013
(Continued)

OTHER PUBLICATIONS

Extended European Search Report dated Jul. 13, 2018, in European Application No. 18150417.6.
(Continued)

*Primary Examiner* — Tamara L Weber
(74) *Attorney, Agent, or Firm* — H.C. Park & Associates, PLC

(57) ABSTRACT

A vehicle safety support apparatus includes: a driver monitoring sensor configured to monitor a driver; an external environment monitoring sensor configured to monitor an external environment of a vehicle; and at least one processor configured to: determine whether the vehicle is in an immediate hazard situation based on data acquired from the driver monitoring sensor and the external environment monitoring sensor; determine, in response to determining that the vehicle is in the immediate hazard situation, whether to perform a recovery maneuver or a rescue maneuver based on the data acquired from the driver monitoring sensor and the external environment monitoring sensor to get out of the immediate hazard situation; and perform, in response to determining to perform the rescue maneuver, autonomous driving to move the vehicle to a safe area by taking over a driving control from the driver.

14 Claims, 74 Drawing Sheets

Related U.S. Application Data

No. 15/639,843, filed on Jun. 30, 2017, now Pat. No. 10,446,031.

(60) Provisional application No. 62/471,114, filed on Mar. 14, 2017.

(51) Int. Cl.

| | | |
|---|---|---|
| B60W 40/04 | (2006.01) | |
| B60K 28/06 | (2006.01) | |
| B60W 30/09 | (2012.01) | |
| G05D 1/00 | (2006.01) | |
| G05D 1/02 | (2020.01) | |
| B60W 40/08 | (2012.01) | |

(52) U.S. Cl.
CPC ........ B60W 40/04 (2013.01); B60W 50/0098 (2013.01); G05D 1/0055 (2013.01); G05D 1/0214 (2013.01); B60W 2040/0818 (2013.01); B60W 2040/0872 (2013.01); B60W 2420/42 (2013.01); B60W 2420/52 (2013.01); B60W 2420/54 (2013.01); B60W 2540/043 (2020.02); B60W 2540/10 (2013.01); B60W 2540/12 (2013.01); B60W 2540/18 (2013.01); B60W 2540/22 (2013.01); B60W 2554/00 (2020.02); G05D 1/0231 (2013.01); G05D 1/0255 (2013.01); G05D 1/0257 (2013.01)

(56) References Cited

U.S. PATENT DOCUMENTS

| | | | |
|---|---|---|---|
| 2014/0244096 A1* | 8/2014 | An | G05D 1/0055 701/25 |
| 2015/0360697 A1 | 12/2015 | Baek et al. | |
| 2016/0009295 A1 | 1/2016 | Chun et al. | |
| 2016/0023666 A1 | 1/2016 | Lee | |
| 2017/0242433 A1* | 8/2017 | Ochiai | G01C 21/3484 |
| 2017/0364070 A1 | 12/2017 | Oba | |
| 2018/0037216 A1 | 2/2018 | Otake | |
| 2018/0141570 A1* | 5/2018 | Kimura | B60W 50/16 |
| 2018/0170375 A1 | 6/2018 | Jang | |
| 2018/0178766 A1 | 6/2018 | Oba | |

FOREIGN PATENT DOCUMENTS

| | | |
|---|---|---|
| DE | 102013016436 | 4/2015 |
| DE | 102014215273 | 2/2016 |
| JP | 08-197977 | 8/1996 |
| JP | 10-315800 | 12/1998 |
| JP | 2009-151522 | 7/2009 |
| JP | 2014-019301 | 2/2014 |
| KR | 10-0282903 | 12/2000 |
| KR | 10-2012-0022305 | 3/2012 |

OTHER PUBLICATIONS

Non-Final Office Action dated Mar. 14, 2019, issued in U.S. Appl. No. 15/639,843.
Notice of Allowance dated Aug. 16, 2019, issued in U.S. Appl. No. 15/639,843.
Non-Final Office Action dated Oct. 21, 2020, in U.S. Appl. No. 16/600,070.
Non-Final Office Action dated Nov. 23, 2020, issued to U.S. Appl. No. 16/884,530.
Non-Final Office Action dated Oct. 21, 2020 issued to U.S. Appl. No. 16/600,070.
Final Office Action dated Apr. 9, 2021, in U.S. Appl. No. 16/600,070.
Final Office Action dated Apr. 13, 2021, in U.S. Appl. No. 16/884,530.
Notice of Allowance dated Jun. 16, 2021, issued to U.S. Appl. No. 16/600,070.
Notice of Allowance dated Jun. 23, 2021, issued to U.S. Appl. No. 16/884,530.

* cited by examiner

FIG. 16
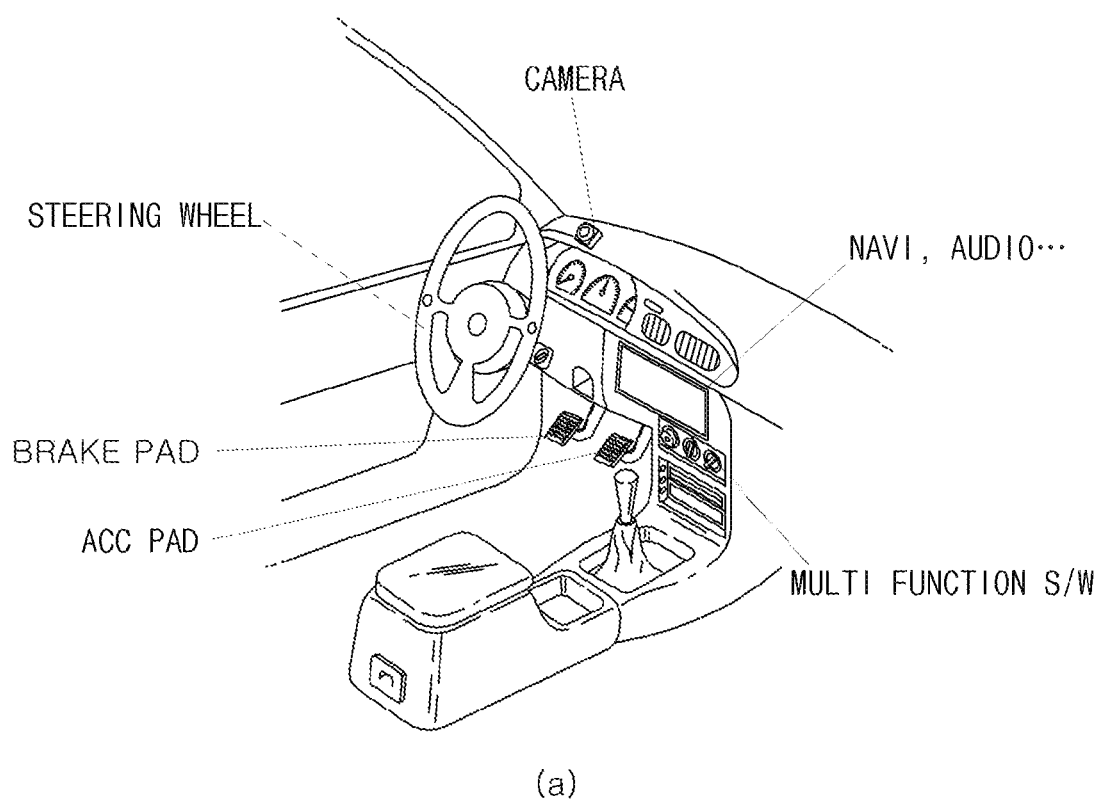
(a)
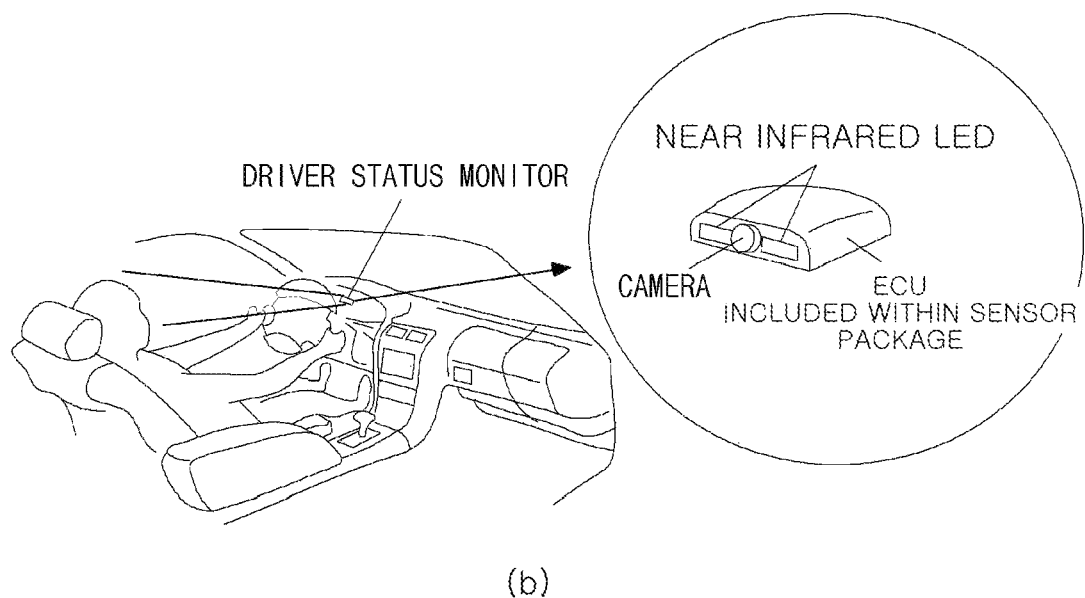
(b)

FIG. 17
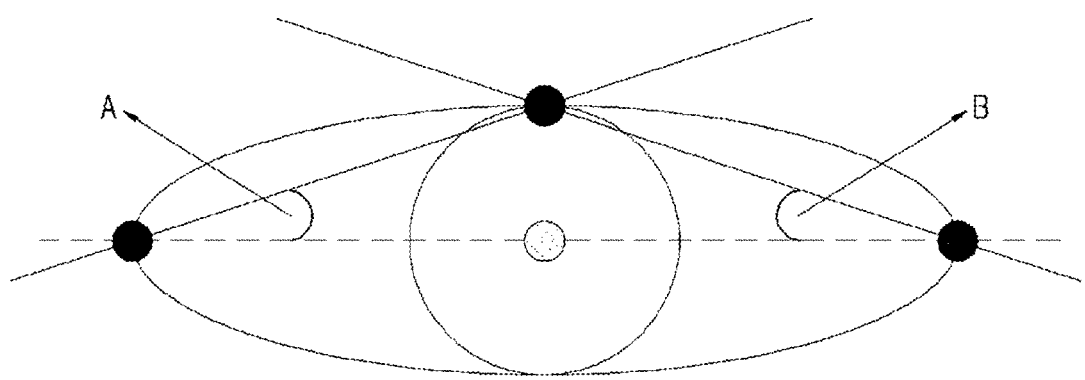
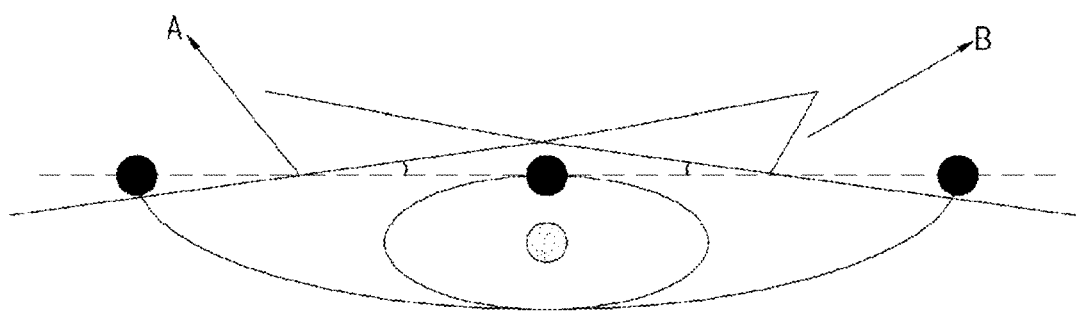

FIG. 20
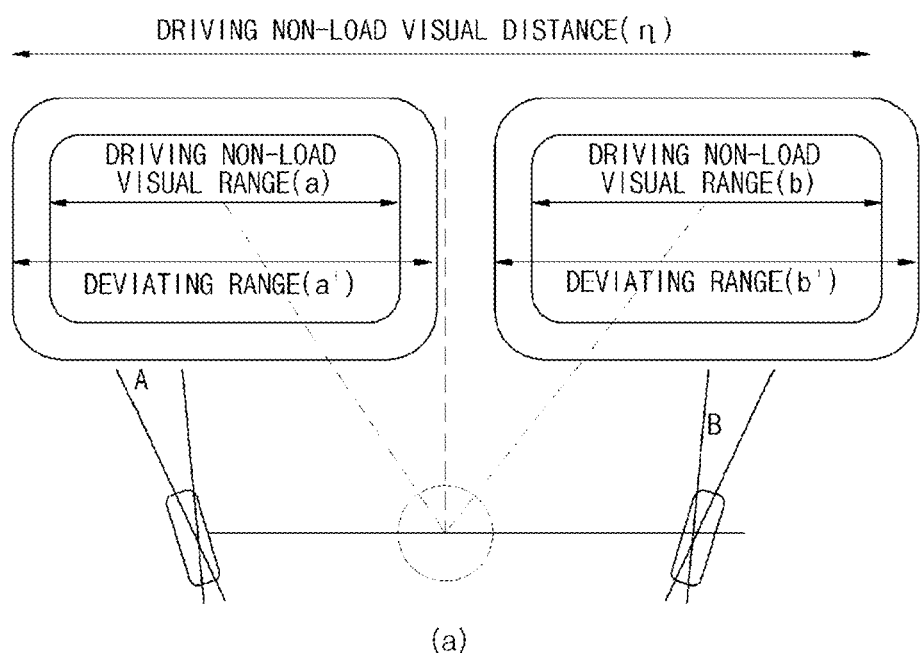
(a)
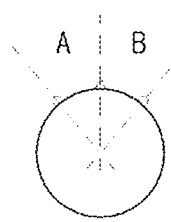
FACE ANGLE OF DRIVER($\alpha$)
(b)
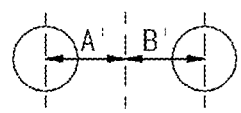
PUPIL POSITION OF DRIVER($\beta$)
(c)

| Brain wave | Frequency | Characteristic |
|---|---|---|
| α | 8 ~ 12.99 Hz | RELAXATION, MEDITATION |
| β | 13 ~ 29.99 Hz | ACTIVATION, CONCENTRATION |
| γ | 30 ~ 50 Hz | SYMPATHY, EXCITEMENT |
| θ | 4 ~ 7.99 Hz | DROWSINESS |

$$P(x_i | x_j) = \frac{P(x_j | x_i) P(x_i)}{P(x_j)}$$

$$P(x_1, x_2, \cdots, x_n) = \prod_{i=1}^{n} P(x_i | \text{Parent}(x_i))$$

APPARATUS AND METHOD OF SAFETY SUPPORT FOR VEHICLE

CROSS-REFERENCES TO RELATED APPLICATIONS

The present application is a Continuation of U.S. patent application Ser. No. 16/600,070, filed on Oct. 11, 2019, which is a Continuation of U.S. patent application Ser. No. 15/639,843, filed on Jun. 30, 2017, now issued as U.S. Pat. No. 10,446,031, which claims priority from U.S. Provisional Application No. 62/471,114, filed on Mar. 14, 2017, each of which is incorporated by reference in its entirety.

BACKGROUND OF THE INVENTION

The present invention relates to apparatus and method of vehicle safety support, and more particularly, to a vehicle safety support apparatus and method which is capable of supporting the safety of a driver using an autonomous driving system.

In general, a vehicle provides movement convenience and time efficiency to people, but a driver may cause much damage to surrounding people as well as the driver, due to the driver's carelessness. Therefore, attention is required for using the vehicle. In particular, the recent technological convergence between vehicles and ICT (Information & Communication Technology) has made the vehicles intelligent and advanced. Thus, a safe driving support system installed in each vehicle recognizes a dangerous situation, and informs a driver of the dangerous situation.

The conventional safe driving support system in the vehicle recognizes the dangerous situation mainly by collecting information through external sensors such as a radar and camera and determining an accident risk such as a lane departure or collision. Furthermore, the safe driving support system informs the driver of the dangerous situation by displaying the dangerous situation on a display device (for example, flickering a warning light) or outputting a voice. However, the voice outputted by the safe driving support system may be buried in noise caused by high-speed driving, or the warning light may not be visually and auditorily recognized when the driver keeps eyes forward while focusing his attention on the driving or dozes off at the wheel.

The research of IIHS in the US has also concluded that the lane departure warning and assist system is not enough to prevent a road departure accident or the like.

The related art is disclosed in Korean Patent Registration No. 10-0282903 published on Dec. 2, 2000.

As described above, the conventional safety support systems provide the function of warning a driver of drowsy driving, careless driving or collision risk. However, when the driver does not respond to the warning or cannot normally perform driving, the possibility that an accident will occur inevitably increases.

SUMMARY OF THE INVENTION

Embodiments of the present invention are directed to a vehicle safety support apparatus and method which is capable of preventing an accident by moving a vehicle to a safe area when a driver does not normally drive a vehicle or cannot control the vehicle any more.

In one embodiment, a vehicle safety support apparatus may include: a driver monitoring unit configured to monitor a driver; an external environment monitoring unit configured to monitor an external environment of a vehicle; and a control unit configured to determine a driving control for the vehicle based on data acquired from the driver monitoring unit and the external environment monitoring unit, and perform autonomous driving to move the vehicle to a safe area, when determining to take over the driving control from the driver.

The control unit may estimate a driver availability based on the data acquired from the driver monitoring unit, estimate a traffic hazard based on the data acquired from the external environment monitoring unit, and determine the driving control based on the estimated driver availability and traffic hazard.

The control unit may determine to take over the driving control from the driver when the vehicle is in immediate hazard situation and there is no response by the driver.

The control unit may perform autonomous driving to get out of the immediate hazard situation.

The vehicle safety support apparatus may further include a driver input filtering unit configured to filter a vehicle control input by the driver. When determining to take over the driving control from the driver, the control unit may control the driver input filtering unit to block the vehicle control input by the driver.

The control unit may operate a hazard lamp of the vehicle when performing the autonomous driving.

The control unit may transmit a signal calling for a help through a communication unit, after moving the vehicle to the safe area.

The control unit may perform the autonomous driving based on the data acquired from the external environment monitoring unit.

The driver monitoring unit may include one or more of a camera for filming the driver, a steering wheel angle sensor, an accelerator pedal sensor and a brake pedal sensor.

The external environment monitoring unit may include one or more of a camera, radar and ultrasonic sensor, which detect the outside of the vehicle.

In another embodiment, a vehicle safety support method may include: monitoring, by a control unit, a driver and an external environment of a vehicle; estimating, by the control unit, a driver availability and traffic hazard based on data acquired in the monitoring of the driver and the external environment; determining, by the control unit, a driving control based on the estimated driver availability and traffic hazard; and performing, by the control unit, autonomous driving to move the vehicle to a safe area, when determining to take over the driving control from the driver.

The vehicle safety support method may further include blocking, by the control unit, a vehicle control input by the driver, when determining to take over the driving control from the driver.

The vehicle safety support method may further include transmitting, by the control unit, a signal calling for a help through a communication unit, after the performing of the autonomous driving to move the vehicle to the safe area.

In the monitoring of the driver and the external environment, the control unit may monitor one or more of the physical feature, posture and control intention of the driver.

In the monitoring of the driver and the external environment, the control unit may monitor the road and traffic environment outside the vehicle.

BRIEF DESCRIPTION OF THE DRAWINGS

FIG. 16 is a diagram illustrating an apparatus for pieces of acquired information, according to an embodiment of the present invention.

FIG. 17 is a diagram for describing a method of checking the eye closing of a driver, according to an embodiment of the present invention.

FIG. 20 are a diagram for describing an observation negligence load of a driver in the driving interruption load according to an embodiment of the present invention.

FIG. 62 is a table illustrating a frequency range and characteristic of each brainwave.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
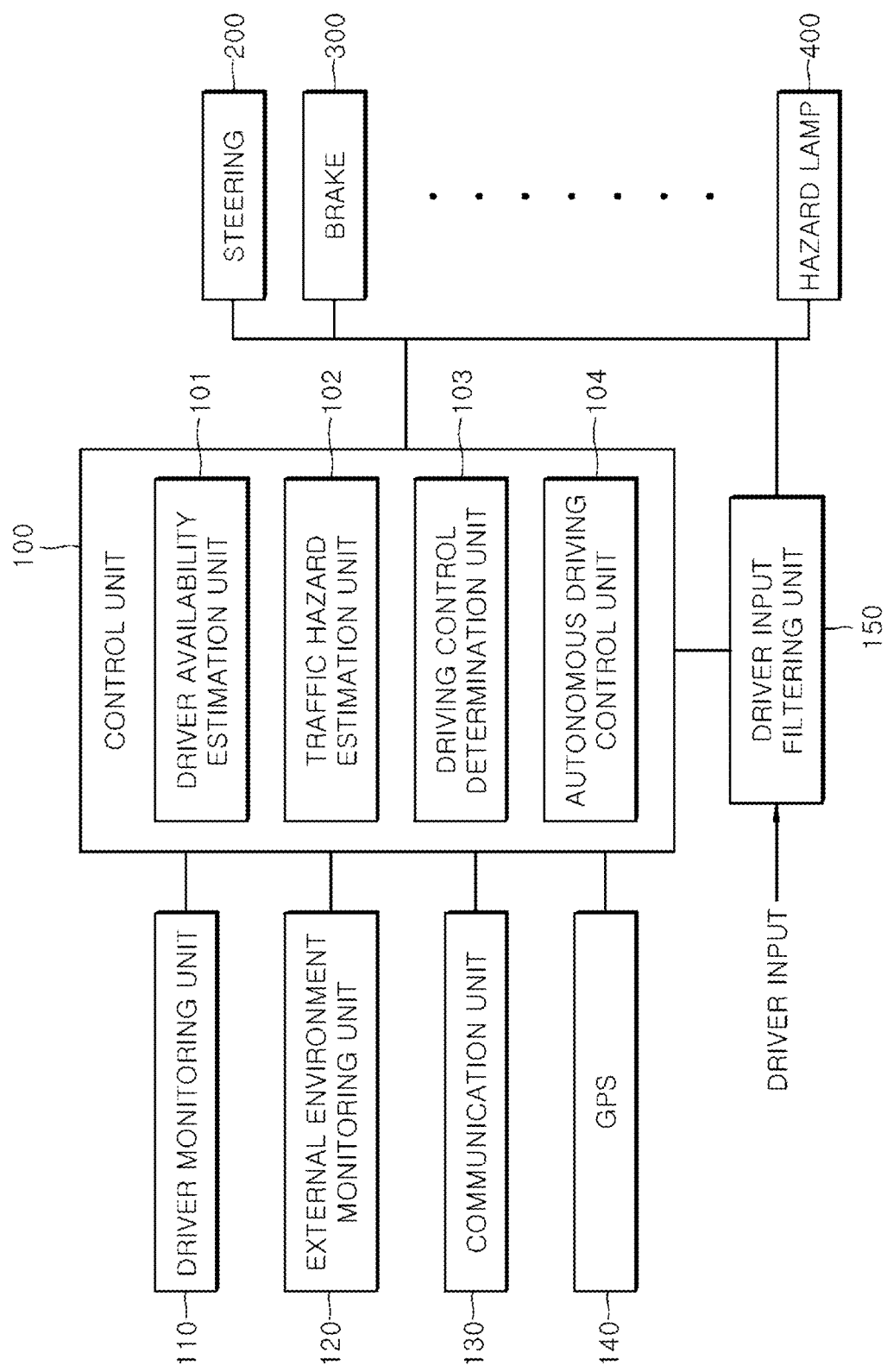
FIG. 1 is a block diagram illustrating the configuration of a vehicle safety support apparatus in accordance with an embodiment of the present invention.

FIG. 1 is a block diagram illustrating the configuration of a vehicle safety support apparatus in accordance with an embodiment of the present invention.

As illustrated in FIG. 1, the vehicle safety support apparatus in accordance with the embodiment of the present invention may include a control unit 100, a driver monitoring unit 110, an external environment monitoring unit 120, a communication unit 130, a GPS 140 and a driver input filtering unit 150. The control unit 100 may include a driver availability estimation unit 101, a traffic hazard estimation unit 102, a driving control determination unit 103 and an autonomous driving control unit 104.

The control unit 100 may be implemented with a processor such as an ECU (Electronic Control Unit). At this time, the control unit 100 may include a plurality of processors. That is, each of the driver availability estimation unit 101, the traffic hazard estimation unit 102, the driving control determination unit 103 and the autonomous driving control unit 104 may be implemented as an individual processor. Alternatively, the functions of the control unit 100 may be distributed to one or more processors. For example, the driver availability estimation unit 101 and the traffic hazard estimation unit 102 may be implemented on a single processor. In this case, each of the functions of the driver availability estimation unit 101, the traffic hazard estimation unit 102, the driving control determination unit 103 and the autonomous driving control unit 104 may be configured in the form of a control algorithm or logic.

Also, the functions of the control unit 100 may be implemented as a part of another system mounted in the vehicle, for example, ADAS (Advanced Driver Assistance System) or LDWS (Lane Departure Warning System).

The driver monitoring unit 110 may monitor the physical features, physical characteristics, posture and control intention of a driver. The driver monitoring unit 110 may include various sensors and devices for performing the above-described function. For example, the driver monitoring unit 110 may include a camera or radar for monitoring the physical features, physical characteristics and posture of the driver, and a steering wheel angle sensor, acceleration pedal sensor and brake pedal sensor for monitoring the vehicle control intention of the driver.

In addition, the driver monitoring unit 110 may include a suspension motion recognition sensor, multi-function maneuver recognition sensor, voice recognition sensor, AVN maneuver recognition sensor, air conditioning device maneuver recognition sensor, gear box sensor, console box maneuver recognition sensor, glove box maneuver recognition sensor, wearable sensors such as ECG (Electrocardiogram) sensor, EEG (Electroencephalogram) sensor and PPG (Photoplethysmography) sensor, and monitor the eyelids of the driver, the pupils of the driver, the speed of a steering wheel, the angle of the steering wheel, a motion of the suspension, whether the accelerator pedal is maneuvered, whether the brake pedal is maneuvered, whether the multi-function is maneuvered, whether the driver is talking, whether the AVN is maneuvered, whether the air conditioning device is maneuvered, whether the gear box is maneuvered, whether the console box is maneuvered, whether the glove box is maneuvered, the ECG of the driver, the EEG of the driver and the like.

The external environment monitoring unit 120 may monitor the road and traffic environment outside the vehicle. The external environment monitoring unit 120 may include various sensors and devices for performing the above-described function. For example, the external environment monitoring unit 120 may include a camera, radar, ultrasonic sensor and the like, in order to monitor the road and traffic environment outside the vehicle. At this time, an AVM (Around View Mode) device or black box for a vehicle may be employed as the camera included in the external environment monitoring unit 120, and the radar or ultrasonic sensor included in the ADAS or LDWS mounted in the vehicle may be employed as the sensors and devices included in the external environment monitoring unit 120.

The communication unit 130 may communicate with the outside of the vehicle. For example, the communication unit 130 may be configured to use a mobile communication network, near field communication or a communication platform for a vehicle. The mobile communication network may include CDMA (Code Division Multiple Access), GSM (Global System for Mobile communications), WCDMA (Wideband Code Division Multiple Access), LTE (Long Term Evolution) and WiBro (Wireless Broadband), the near field communication may include Wi-Fi, and the communication platform for a vehicle may include TPEG (Transport Protocol Expert Group), TIM (Traffic Information System), RDS (Radio Data System), telematics for a vehicle, DSRC (Dedicated Short Range Communication), WAVE (Wireless Access in Vehicular Environment).

The GPS 140 may receive the positional information of the vehicle. That is, the GPS 140 may receive information on the position of the vehicle, using a satellite navigation system.

The driver input filtering unit 150 may filter a vehicle control input by the driver, for example, a steering wheel maneuver, acceleration pedal maneuver, brake pedal maneuver or the like. That is, the driver input filtering unit 150 may block a vehicle control input by the driver from being transmitted to devices in the vehicle (a steering 200, a brake 300, a hazard lamp 400 and the like).

For example, when a steering wheel maneuver of the driver is performed by an electronic control system, for example, MDPS (Motor Driven Power Steering) or EPS (Electric Power Steering), the driver input filtering unit 150 may be implemented with an ECU capable of transmitting a control command to the electronic control system. At this time, the driver input filtering unit 150 may be implemented as a separate processor, but implemented as control logic in the processor constituting the control unit 100.

Alternatively, when a steering wheel maneuver of the driver is performed by a mechanical connection, for example, a hydraulic power steering, the driver input filtering unit 150 may include a component for blocking a transmission of oil pressure.

As such, the driver input filtering unit 150 may be implemented in various forms depending on the design specification of the vehicle. However, since the specific configurations can be implemented through proper design changes by a person skilled in the art, the detailed descriptions thereof are omitted herein.

The control unit 100 may control the operations of the respective units of the vehicle safety support apparatus in accordance with the embodiment of the present invention. That is, the control unit 100 may control the driver monitoring unit 110 to monitor the physical features, posture and control intention of the driver, control the external environment monitoring unit 120 to monitor the road and traffic environment outside the vehicle, control the communication unit 130 to perform data transmission/reception, control the GPS 140 to acquire the position information of the vehicle, and control the filtering operation of the driver input filtering unit 150.

The driver availability estimation unit 101 may estimate driver availability based on the physical features (characteristics), posture and control intention of the driver, acquired through the driver monitoring unit 110.

The driver availability may indicate whether the driver can effectively control the vehicle. For example, the driver availability may be designed to have a value of 0 to 1. When the driver availability is close to 1, it may indicate that the driver can effectively control the vehicle, and when the driver availability is close to 0, it may indicate that the driver cannot effectively control the vehicle. However, since the present embodiment is not limited to such a design, a variety of design methods may be employed, which indicate whether the driver can effectively vehicle control.

The driver availability estimation unit 101 may calculate the driver availability by inputting the data acquired through the driver monitoring unit 110 to a preset algorithm. For example, the driver availability estimation unit 101 may determine whether the driver is dozing at the wheel, by considering the size of the driver's pupil or the driver's posture. When it is determined that the driver is dozing at the wheel, the driver availability may be estimated to a value close to 0.

Furthermore, the driver availability estimation unit 101 may acquire heartbeat information as the physical features of the driver, and calculate the driver availability by determining an abnormal state of the driver based on the heartbeat information or determining whether the driver abnormally performs driving control, based on the angle of the steering wheel or the extent that the accelerator pedal or brake pedal is stepped on.

In addition, various types of algorithms for estimating the driver availability may be applied. For example, a dangerous driving index, an integrated risk index of a driver, a driving load and the like may be combined to estimate the driver availability. In other embodiments described later, a variety of methods will be described.

The traffic hazard estimation unit 102 may estimate a traffic hazard based on the road and traffic environment outside the vehicle, through the external environment monitoring unit 120.

The traffic hazard may indicate the possibility that an accident will occur. For example, the traffic hazard may be designed to have a value of 0 to 1. When the traffic hazard is close to 1, it may indicate that the possibility of accident occurrence is high, and when the traffic hazard is close to 0, it may indicate that the possibility of accident occurrence is low. However, since the present embodiment is not limited to such a design, various design methods indicating the possibility of accident occurrence can be employed.

The traffic hazard estimation unit 102 may calculate the traffic hazard by inputting the data acquired through the external environment monitoring unit 120 to a preset algorithm. For example, the traffic hazard estimation unit 102 may detect an obstacle, detect a VRU (Vulnerable Road User), detect a lane, recognize a vehicle, recognize a road edge, and detect road surface friction, using the camera, radar, ultrasonic sensor and the like. Then, the traffic hazard estimation unit 102 may calculate the possibility of accident occurrence by collectively analyzing the detection results.

The traffic hazard estimation of the traffic hazard estimation unit 102 may be performed through an algorithm used by a conventional collision warning system. In other embodiments described later, a variety of methods will be described.

The driving control determination unit 103 may determine a driving control based on the estimated driver availability and traffic hazard. That is, the driving control determination unit 103 may determine whether to allow the driver to continuously drive the vehicle or to take over the driving control from the driver in order to perform autonomous driving.

The driving control determination unit 103 may determine the driving control by applying the estimated driver availability and traffic hazard to a preset algorithm. For example, when the estimated driver availability is equal to or less than a high threshold value or the estimated traffic hazard is equal to or more than a low threshold value, the driving control determination unit 103 may determine to take over the driving control for the vehicle from the driver in order to perform autonomous driving, or determine the driving control for the vehicle depending on a result obtained by combining the estimated driver availability and the estimated traffic hazard. However, since the present embodiment is not limited to such an algorithm, various methods for determining the driving control for the vehicle may be used.

When the driving control determination unit 103 determined to take over the driving control for the vehicle from the driver in order to perform autonomous driving, the autonomous driving control unit 104 may control the respective devices in the vehicle (for example, the steering 200, the brake 300, the hazard lamp 400 and the like) to perform autonomous driving.

When the driver does not normally drive the vehicle or cannot control the vehicle any more, the autonomous driving control unit 104 may move the vehicle to a safe area through autonomous driving, in order to protect the driver by preventing an accident.

For this operation, the autonomous driving control unit 104 may establish a driving plan, and perform driving control to move the vehicle to the safe area. The driving plan may include checking a close safe area, setting a path to the safe area, planning to change a line, performing road exit control, performing collision avoidance control, and performing emergency driving, and the driving control may include lane following, lane changing, pulling off the road and holding.

At this time, the autonomous driving control unit 104 may perform autonomous driving by utilizing the information acquired through the external environment monitoring unit 120, the position information acquired through the GPS 140, the map information and the like, or perform autonomous driving by utilizing various techniques related to autonomous driving.

The safe area to which the vehicle will be moved may be included in the map information.

When the autonomous driving control unit 104 performs autonomous driving, the control unit 100 may control the driver input filtering unit 150 to block vehicle control by the driver. Then, the vehicle can be safely moved only through autonomous driving.

During the autonomous driving of the vehicle, the autonomous driving control unit 104 may operate the hazard lamp 400 of the vehicle in order to notify emergency driving.

When the vehicle is positioned in the safe area after exiting from the road, the autonomous driving control unit 104 may hold the vehicle, and the control unit 100 may call for a help through the communication unit 130. For example, a message indicating the emergency situation may be autonomously transmitted to 911.

In one embodiment, the control unit 100 may determine to take over the driving control from the driver when the vehicle is in immediate hazard situation and there is no response by the driver.

A lane departure situation, an intersection approach situation, a collision with another vehicle situation may be an example of the immediate hazard situation. The criterion for determining the immediate hazard situation is preset in the control unit 100. And algorithms, used in the traffic hazard estimating of the subject invention, a conventional lane departure detection system, a conventional collision warning system, may be used as the determination criterion. The control unit 100 may determine whether the vehicle is in intersection approach situation by using GPS and map information.

The control unit 100 may determine that there is no response by the driver when a vehicle control of corresponding to each of the immediate hazard situation is not performed by the driver. For example, returning vehicle to lane, emergency braking to avoid another vehicle or intersection running through should be performed according to each of the immediate hazard situation.

Therefore, the control unit 100 takes over the driving control from the driver and performs the vehicle control of corresponding to each of the immediate hazard situation to get out of the immediate hazard situation when the vehicle is in immediate hazard situation and there is no response by the driver. That is, the vehicle can do "recovery" or "rescue" maneuver to eliminate the immediate hazard.

Figure 2:
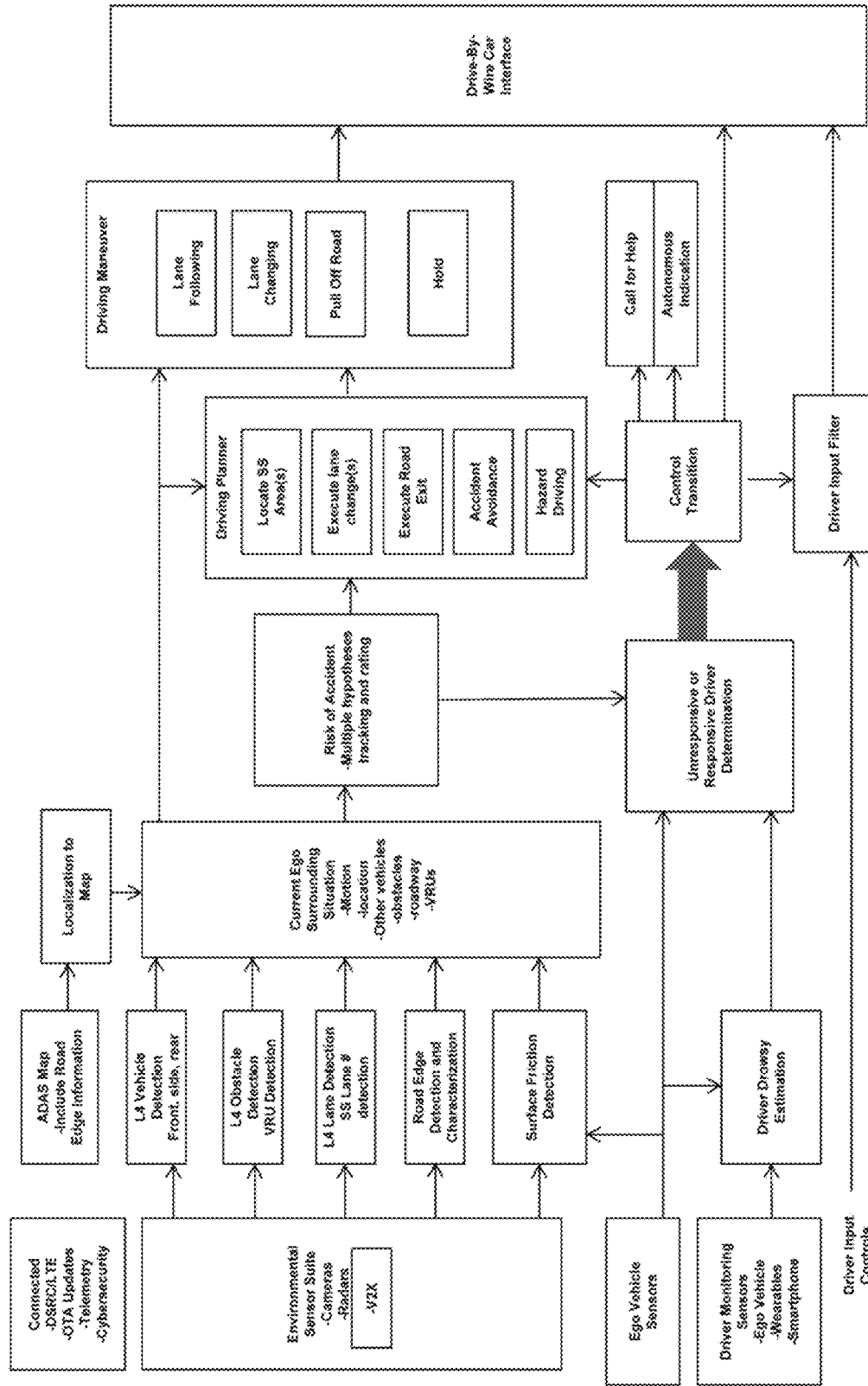
FIGS. 2 to 4 are diagrams for describing the technical concept of the vehicle safety support apparatus in accordance with the embodiment of the present invention.
Figure 3:
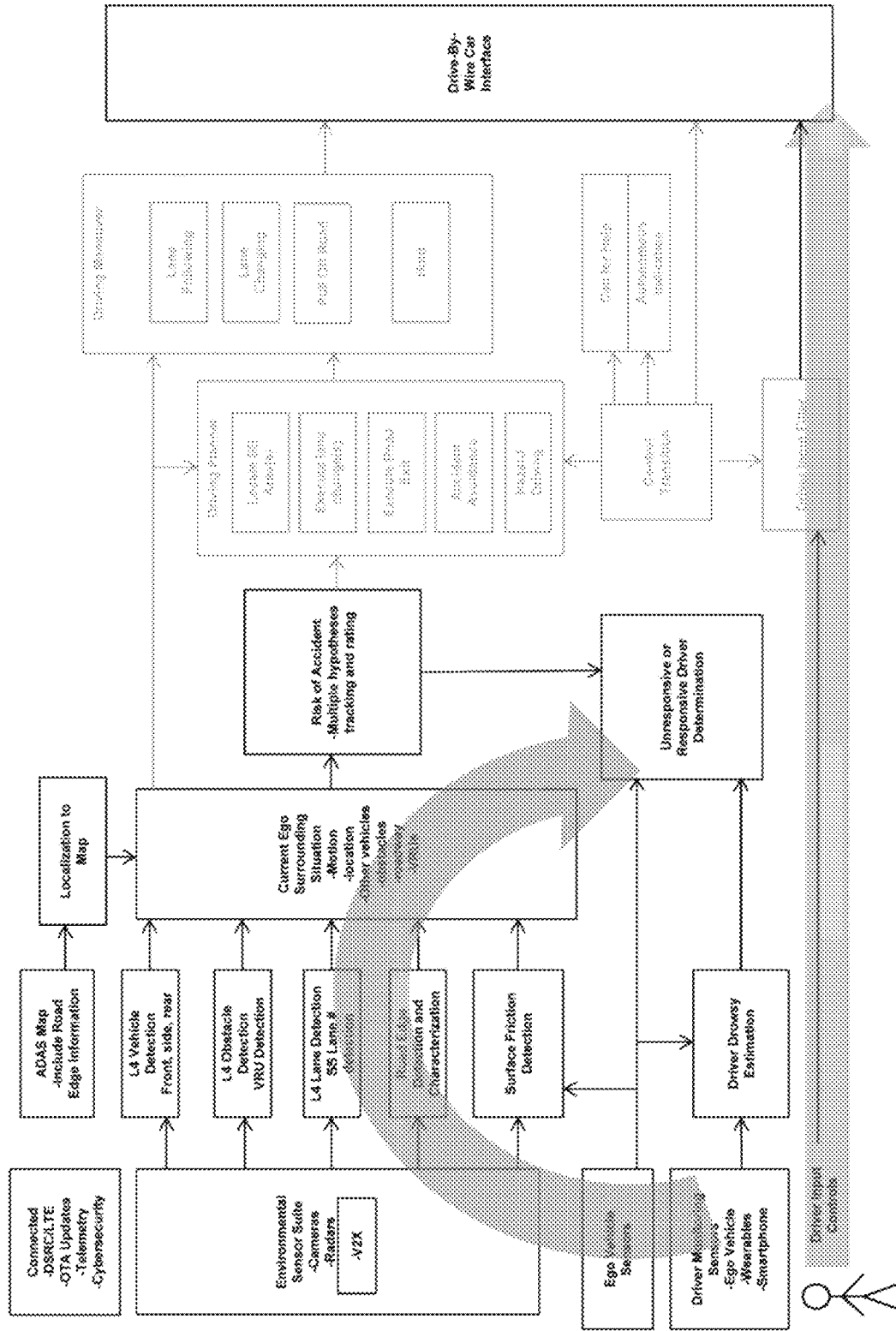
Figure 4:
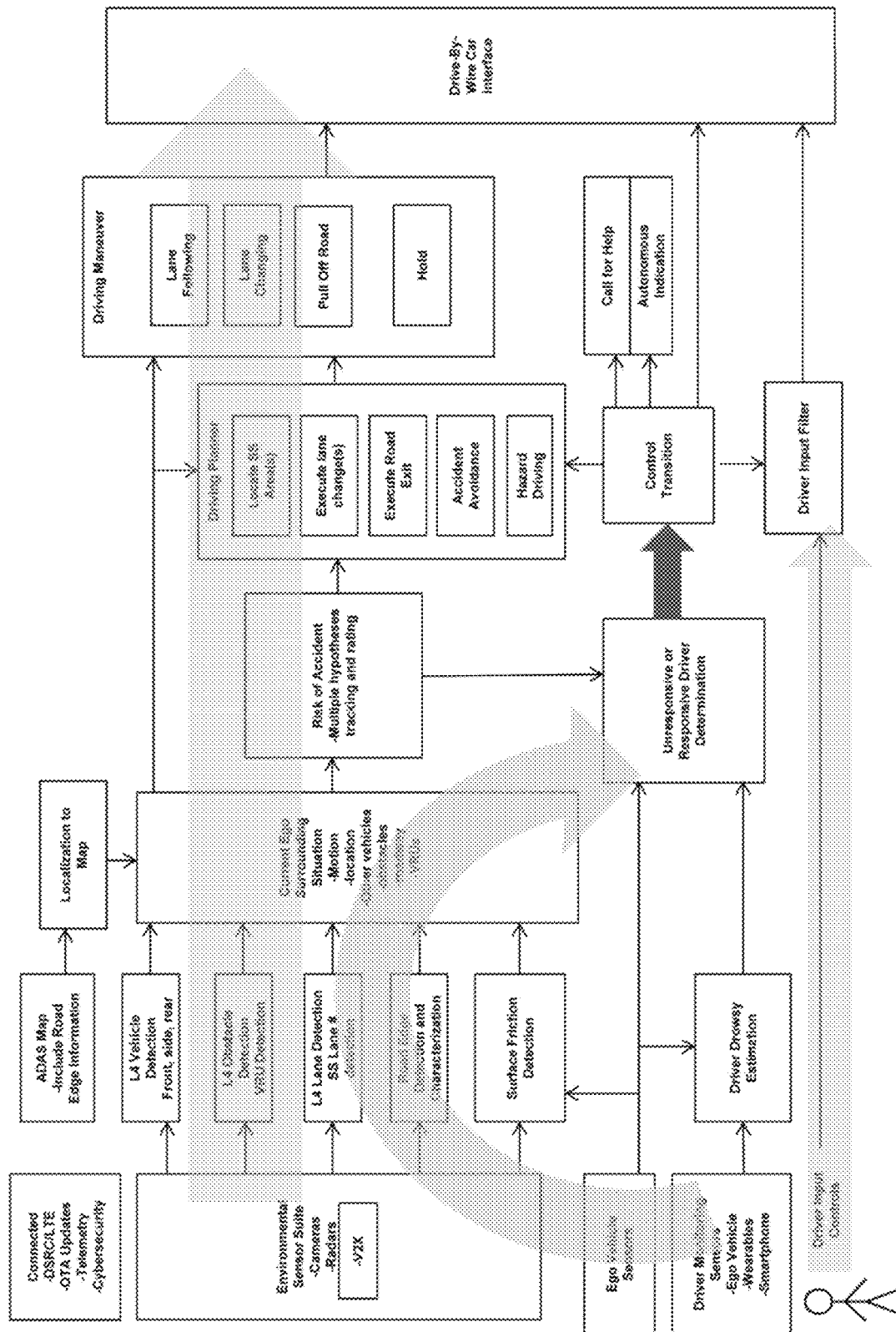

FIGS. 2 to 4 are diagrams for describing the technical concept of the vehicle safety support apparatus in accordance with the embodiment of the present invention.

As shown in FIGS. 2 to 4, the vehicle safety support apparatus in accordance with the embodiment of the present invention may monitor the driver availability by detecting various data and applying the data to the algorithms. When determining that a risk of accident is present while the driving control by the driver is maintained, the vehicle safety support apparatus may filter an input of the driver, and move the vehicle to a safe area through autonomous driving, thereby preventing a vehicle accident.

Figure 5:
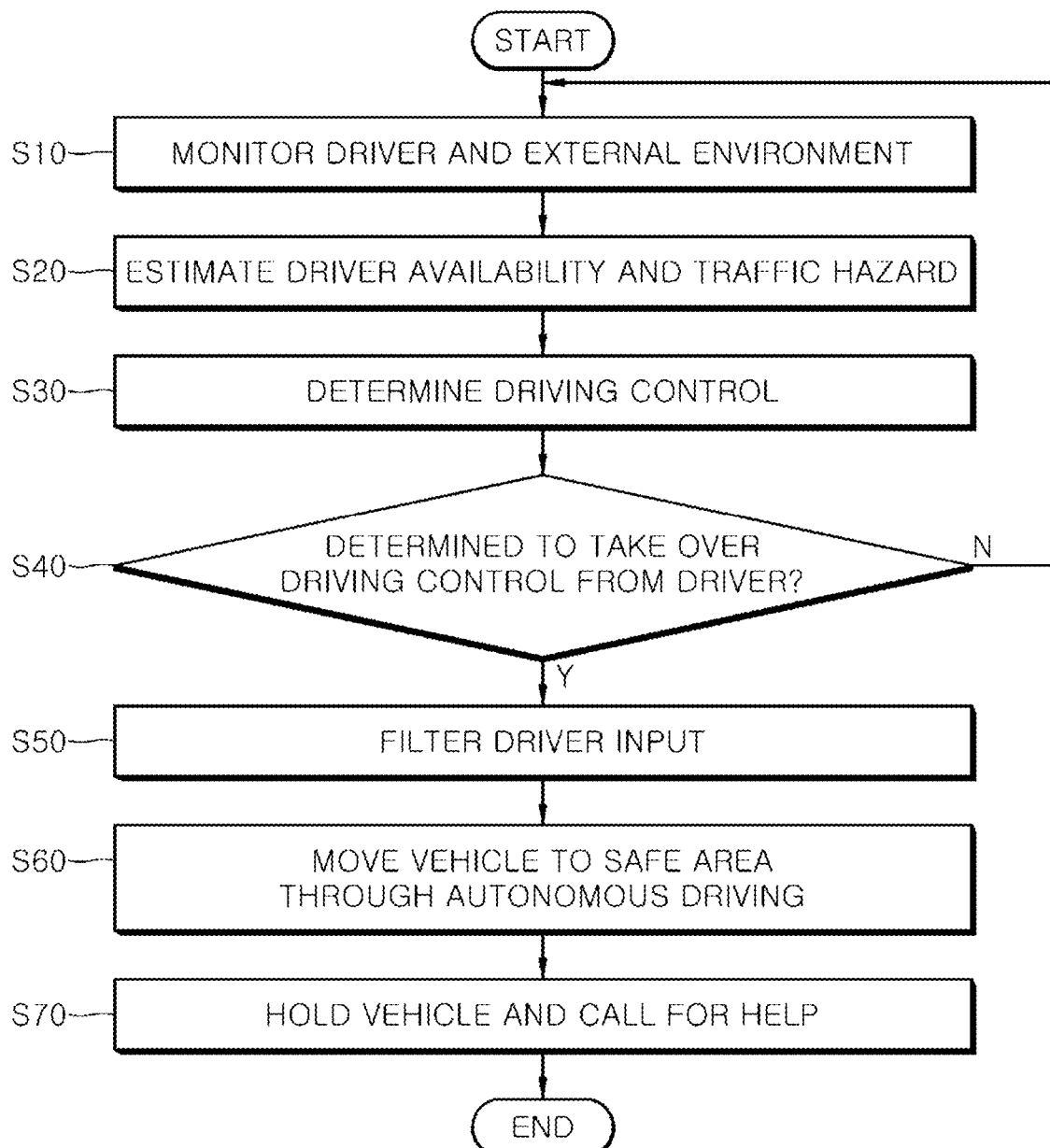
FIG. 5 is a flowchart for describing a vehicle safety support method in accordance with an embodiment of the present invention.

FIG. 5 is a flowchart for describing a vehicle safety support method in accordance with an embodiment of the present invention.

As illustrated in FIG. 5, the control unit 100 may monitor a driver and the external environment at step S10. That is, the control unit 100 may monitor the physical features, posture and control intention of the driver through the driver monitoring unit 110, and monitor the road and traffic environment outside the vehicle through the external environment monitoring unit 120.

Then, the control unit 100 may estimate a driver availability and traffic hazard according to the monitoring results of step S10, at step S20. That is, the control unit 100 may estimate the driver availability based on the physical features, posture and control intention of the driver, acquired through step S10, and estimate the traffic hazard based on the road and traffic environment outside the vehicle.

After step S20, the control unit 100 may determine a driving control based on the driver availability and traffic hazard estimated at step S20, at step S30. That is, the control unit 100 may determine whether to allow the driver to continuously drive the vehicle according to the control of the driver or to take over the driving control from the driver in order to perform autonomous driving, based on the driver availability and traffic hazard estimated at step S20.

When determining to take over the driving control from the driver (Yes at step S40), the control unit 100 may filter a driver input at step S50, and move the vehicle to a safe area through autonomous driving at step S60. That is, the control unit 100 may block the driver input such that the vehicle is controlled only through autonomous driving, establish a driving plan, and perform driving control to move the vehicle to a safe area. The driving plan may include checking a close safe area, setting a path to the safe area, planning to change a line, performing road exit control, performing collision avoidance control, and performing emergency driving, and the driving control may include lane following, lane changing, pulling off the road and holding.

Then, the control unit 100 may hold the vehicle, and call for a help at step S70. When the vehicle is positioned in the safe area after pulling off the road, the control unit 100 may hold the vehicle, and call for a help through the communication unit 130. For example, a message indicating the emergency situation may be autonomously transmitted to 911.

On the other hand, when determining to maintain the driving control of the driver (No at step S40), the control unit 100 may return to step S10 to continuously monitor the driver and the external environment.

In accordance with the embodiments of the present invention, the vehicle safety support apparatus and method may determine a driving control by monitoring a driver and an external environment, and move a vehicle to a safe area through autonomous driving when determining to take over the driving control from the driver, thereby preventing a vehicle accident.

Hereafter, embodiments which can be applied when the driver availability estimation, the traffic hazard estimation, the driving control determination and the autonomous driving are performed will be described. All, part or combinations of components described in the following embodiments may be utilized for implementing the control unit 100, the driver monitoring unit 110, the external environment monitoring unit 120, the communication unit 130, the GPS 140, the driver input filtering unit 150, the driver availability estimation unit 101, the traffic hazard estimation unit 102, the driving control determination unit 103 and the autonomous driving control unit 104, or implementing the control logic or algorithm included in each of the units. In the following embodiments, a control operation of changing a driving control for a vehicle from a driver to the control unit 100 may be performed with an operation of warning the driver of a dangerous situation or carelessness, and the vehicle safety support apparatus and method may be designed to determine the driving control depending on the level of the warning.

The vehicle safety system (vehicle safety support apparatus) can be divided into an environment recognition system and a vehicle control system. The environment recognition system accurately recognizes the environment of vehicle and provides the recognized environment information to the vehicle control system. The vehicle control system safely controls the vehicle using the environment information.

The environment recognition system should be able to handle variety information which occurs during driving. Therefore, the environment recognition system requires high computational complexity and many subsystems. Research is underway to efficiently control these calculations.

Hereinafter, exemplary embodiments will be described in detail with reference to the accompanying drawings.

Figure 6:
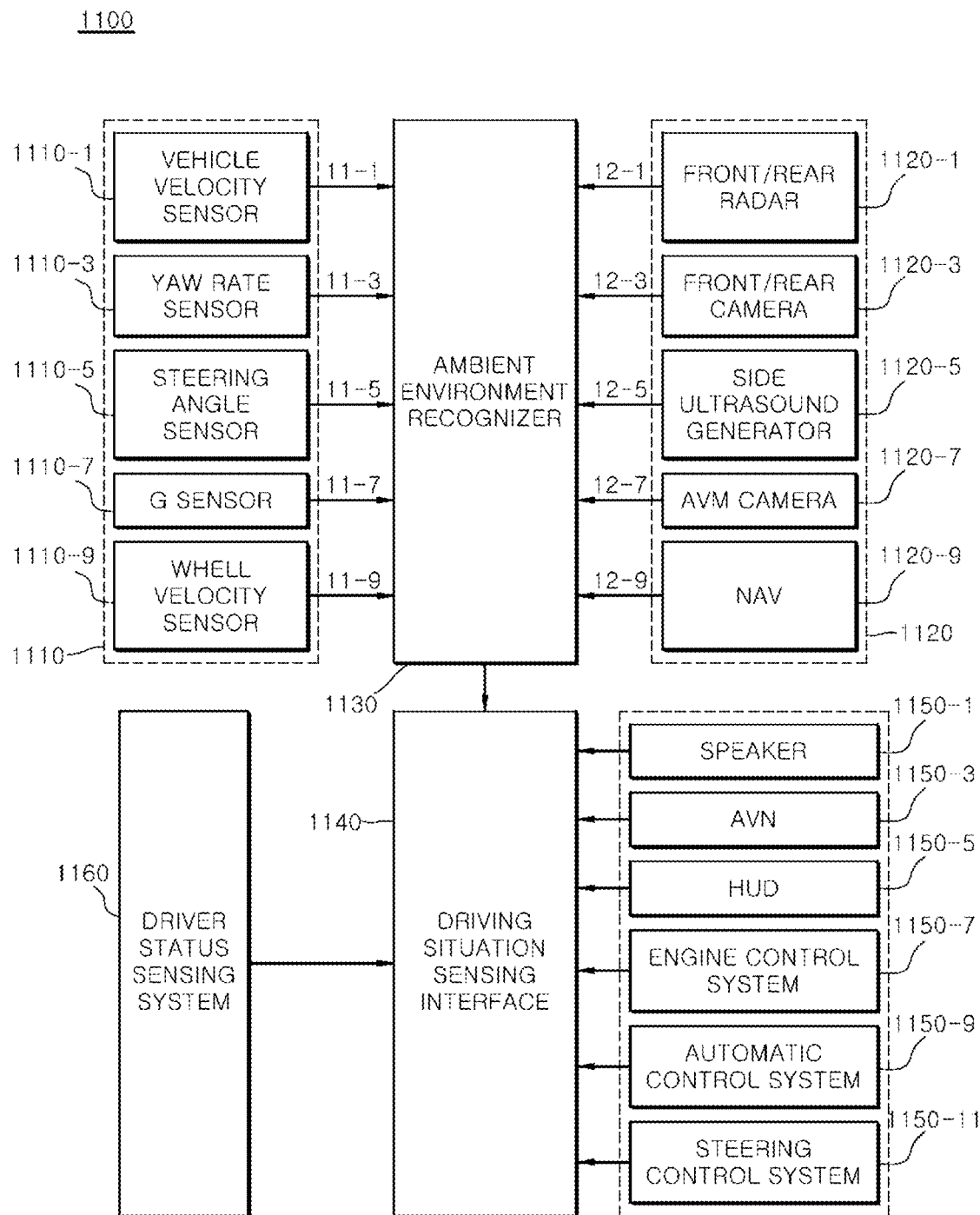
FIG. 6 is a block diagram illustrating a system for managing a dangerous driving index for vehicles, according to an embodiment of the present invention.

FIG. 6 is a block diagram illustrating a system 1100 for managing a dangerous driving index for vehicles, according to an embodiment of the present invention.

Referring to FIG. 6, the system 1100 for managing the dangerous driving index may not analyze a driving habit of a driver from a previously learned past driving pattern but may accurately analyze a driving habit, based on information which is acquired through various sensors in real time.

The system 1100 for managing the dangerous driving index according to an embodiment of the present invention may use the information which is acquired through the various sensors in real time, and thus more accurately analyzes a driving habit of a driver than a related art driving habit analysis method which analyzes a driving habit from a learned past driving pattern.

The system 1100 for managing the dangerous driving index may include an internal sensor 1110, an external sensor 1120, an ambient environment recognizer 1130, a driving situation sensing interface 1140, a driver status sensing system 1160, and an output unit 1150.

The internal sensor 1110 may sense a driving situation of a driver's vehicle to acquire driver's vehicle driving information. The driver's vehicle driving information may include vehicle velocity information 11-1, yaw rate information 11-3, steering angle information 11-5, acceleration information 11-7, and wheel velocity information 11-9.

In order to acquire the driver's vehicle driving information, the internal sensor 1110 may include a vehicle velocity sensor 1110-1 that acquires the vehicle velocity information 11-1, a yaw rate sensor 1110-3 that acquires the yaw rate information 11-3, a steering angle sensor 1110-5 that acquires the steering angle information 11-5, and a wheel velocity sensor 1110-9 that acquires the wheel velocity information 11-9.

The external sensor 1120 may sense an ambient situation of the driver's vehicle to acquire ambient environment information. The ambient environment information may include front/rear radar information 12-1, front/rear image information 12-3, side ultrasound information 12-5, around view monitoring (AVM) image information 12-7, and navigation information 12-9.

In order to acquire the ambient environment information, the external sensor 1120 may include a front/rear radar 1120-1 that acquires the front/rear radar information 12-1, a front/rear camera 1120-3 that acquires the front/rear image information 12-3, a side ultrasound generator 1120-5 that acquires the side ultrasound information 12-5, an AVM camera 1120-7 that acquires the AVM image information 12-7, a navigation (NAV) 1120-9 that acquires the navigation information 12-9, a vehicle-to-infrastructure communication system and a vehicle-to-vehicle communication system. A vehicle-to-infrastructure communication system and a vehicle-to-vehicle communication system may include information, for example, about traffic control feature(e.g., stop lights, stop signs), current weather related information, information relating to transient anomalies transient anomalies and transient anomaly locations (e.g., construction zones, temporary speed limits, incident scenes (e.g., accident scenes, roadblocks, and so on), other vehicle's location, other vehicle's route(e.g., starting point, destination, expected trajectory), lane status, and cut in sign(e.g., turn signal). The lane status (information) can be one-lane county road, divided highway, boulevard, multi-lane road, one-way road, two-way road, or city street. Any variations of the above teachings are also intended to be covered by this patent application.

The ambient environment recognizer 1130 may calculate a trajectory load by using the driver's vehicle driving information supplied from the internal sensor 1110 and the ambient environment information supplied from the external sensor 1120, and may manage a dangerous driving index, based on a result of the calculation. This will be described below in detail with reference to FIG. 7.

The driving situation sensing interface 1140 may interface the output unit 1150 and provide a driver with driver status information supplied from the driver status sensing system 1160 and the dangerous driving index through the output unit 1150.

The output unit 1150 may output the dangerous driving index, reflected in the driving status information, in a visual or acoustical information form to provide the dangerous driving index to the driver. To this end, the output unit 1150 may include a speaker 1150-1, an audio video navigation (AVN) 1150-3, and a head up display 1150-5.

Moreover, the output unit 1150 may further include an engine control system 1150-7, an automatic control system 1150-9, and a steering control system 1150-11, for adjusting a timing when the lateral control of the vehicle starts.

The driver status sensing system 1160 may sense a driving status such as drowsy driving, etc. The driver status sensing system 1160 will be described below in detail with reference to FIGS. 15 to 22.

Figure 7:
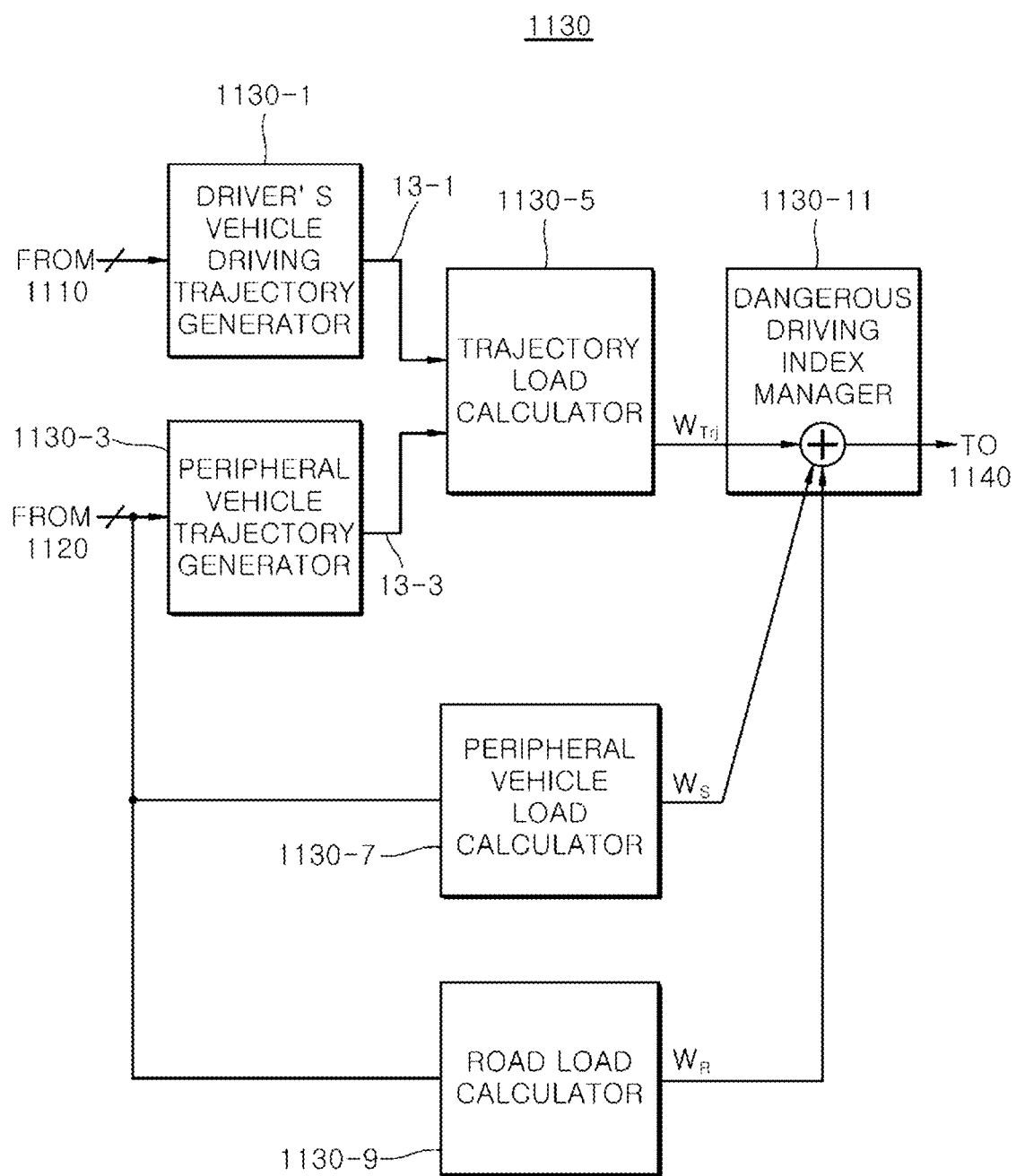
FIG. 7 is a block diagram illustrating a detailed configuration of an ambient environment recognizer illustrated in FIG. 6.

FIG. 7 is a block diagram illustrating a detailed configuration of the ambient environment recognizer 1130 illustrated in FIG. 6.

Referring to FIG. 7, as described above, the ambient environment recognizer 1130 may calculate the trajectory load by using the driver's vehicle driving information supplied from the internal sensor 1110 and the ambient environment information supplied from the external sensor 1120, and calculate the dangerous driving index (or a peripheral risk index), based on the calculated trajectory load.

In order to more accurately manage the dangerous driving index, the ambient environment recognizer 1130 may calculate the dangerous driving index in further consideration of a peripheral vehicle load and a road load in addition to the trajectory load.

The ambient environment recognizer 1130 may include a driver's vehicle driving trajectory generator 1130-1, a peripheral vehicle trajectory generator 1130-3, a trajectory load calculator 1130-5, a peripheral vehicle load calculator 1130-7, a road load calculator 1130-9, and a dangerous driving index manager 1130-11.

The driver's vehicle driving trajectory generator 1130-1 may acquire a driver's vehicle driving trajectory 13-1 by using vehicle velocity information, steering angle information, reduction/acceleration information, and yaw rate information supplied from the internal sensor 1110.

The peripheral vehicle trajectory generator 1130-3 may acquire a peripheral vehicle driving trajectory 13-3 by using the ambient environment information which includes the front/rear radar information 12-1, the front/rear image information 12-3, the side ultrasound information 12-5, and the AVM image information 12-7 supplied from the external sensor 1120.

The front/rear radar information 12-1 is low in accuracy of determining an object, but enables accurate distance information (a longitudinal direction) to be obtained. On the other hand, since the image information 12-3 and 12-7 are used to acquire a monocular image, the image information 12-3 and 12-7 are low in accuracy of the distance information (the longitudinal direction), but the image information 12-3 and 12-7 enable an object to be accurately determined and enable lateral information to be obtained.

In a target vehicle model equation, the longitudinal distance information may be acquired by using the front/rear radar 1120-1, and the lateral distance information may be acquired by using the front/rear camera 1120-3, the AVM camera 1120-7, and the side ultrasound generator 1120-5.

The following Equation (1) may be the target vehicle module equation which is used by the peripheral vehicle trajectory generator 1130-3, for predicting a peripheral vehicle trajectory.

$$A = \begin{bmatrix} 1 & \Delta t & 0 & 0 \\ 0 & 1 & 0 & 0 \\ 0 & 0 & 1 & \Delta t \\ 0 & 0 & 0 & 1 \end{bmatrix}, H = \begin{bmatrix} 1 & 0 & 0 & 0 \\ 0 & 0 & 1 & 0 \end{bmatrix} \quad (1)$$

$$x = \begin{bmatrix} x \\ v_x \\ y \\ v_y \end{bmatrix} \quad \boxed{\begin{aligned} x_k &= Ax_k + w_k \\ z_k &= Hx_k + v_k \end{aligned}}$$

where x, $V_x$, y, and $V_y$ denote status variables of a target vehicle, and x and y denote a position of the target vehicle and are measured by an image camera. $V_x$ and $V_y$ denote a velocity of the target vehicle. A denotes a vehicle model equation, H denotes a measurement value model equation, and the status variables respectively denote a distance and a velocity in an x axis direction and a distance and a velocity in a y axis direction. A system noise and a measurement value noise denote white Gaussian.

The trajectory load calculator 1130-5 may calculate a trajectory load "$W_{Trj}$". The trajectory load "$W_{Trj}$" may be a comparison result which is obtained by comparing a predetermined threshold value with a trajectory distance value which is a difference between the peripheral vehicle trajectory 13-3 and the driver's vehicle driving trajectory 13-1.

The driver's vehicle driving trajectory 13-1 and the peripheral vehicle trajectory 13-3 may be predicted, and a situation where there is a risk of collision may be a situation where a high caution of the driver is required. The trajectory load calculator 1130-5 may digitize the situation as the trajectory load "$W_{Trj}$".

The trajectory load "$W_{Trj}$" may be calculated as expressed in the following Equation (2):

$$W_{Trj}(i) = |T_{Trj}(i) - D_{Trj}(i)| \text{ if } W_{Trj}() > \text{Threshold}, 0 \\ W_{Trj}(i) < \text{Threshold}, 1 \quad (2)$$

where $D_{Trj}$ denotes a driver's vehicle driving trajectory, and $T_{Trj}$ denotes a peripheral vehicle trajectory. Also, i (1, 2, . . . , n) denotes a detected peripheral vehicle.

According to Equation (1), trajectories of detected peripheral vehicles may be compared with a trajectory of the driver's vehicle, and when a trajectory distance is less than a threshold value, the trajectory load "$W_{Trj}$" may be set to 1. Also, when the trajectory distance is greater than the threshold value, the trajectory load "$W_{Trj}$" may be set to 0.

The peripheral vehicle load calculator 1130-7 may analyze the number of front/rear/side peripheral vehicles and whether the peripheral vehicles change lanes, based on the ambient environment information and may calculate a peripheral vehicle load "$W_S$", based on a result of the analysis. The number of the peripheral vehicles and a trajectory change of each of the peripheral vehicles may act as a load requiring a caution of the driver.

Figure 8:
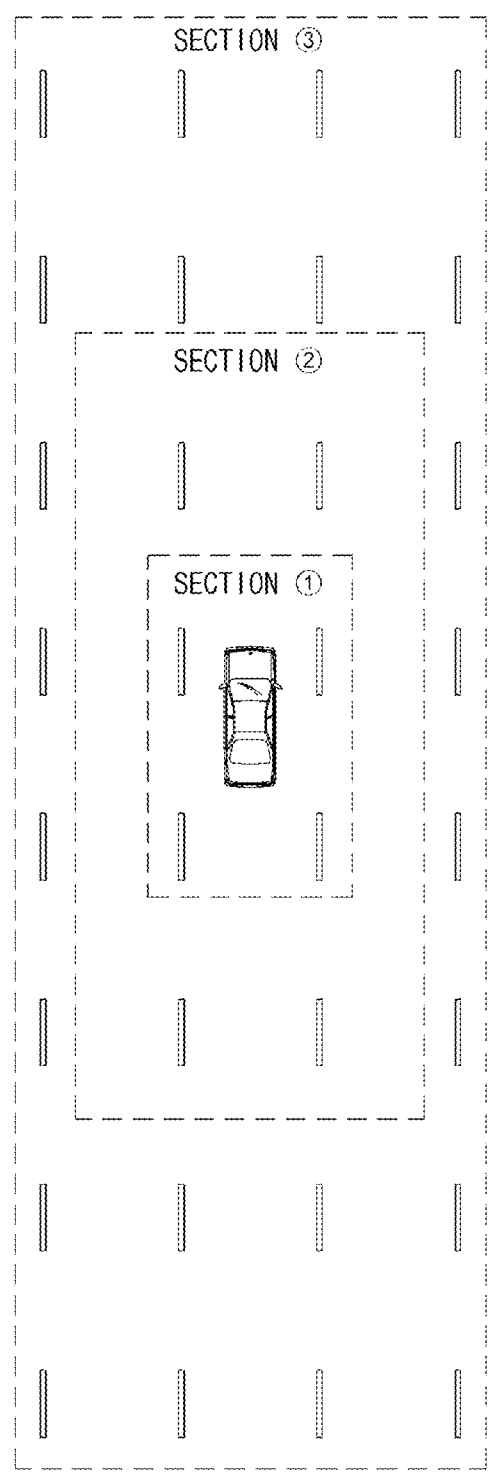
FIG. 8 is a diagram schematically illustrating three dangerous sections which are divided by a peripheral vehicle load calculator of FIG. 7, based on a time to collision (TTC).

In order to calculate the peripheral vehicle load, three dangerous sections ①, ② and ③ may be calculated based on a time to collision (TTC). The three dangerous sections ①, ② and ③ are illustrated in FIG. 8. Here, the TTC may be defined as a time which is taken until a corresponding vehicle collides with a target vehicle when a closing velocity of a vehicle is constant. The TTC may be calculated, based on the vehicle velocity information 11-1 and the steering angle information 11-5.

Figure 9:
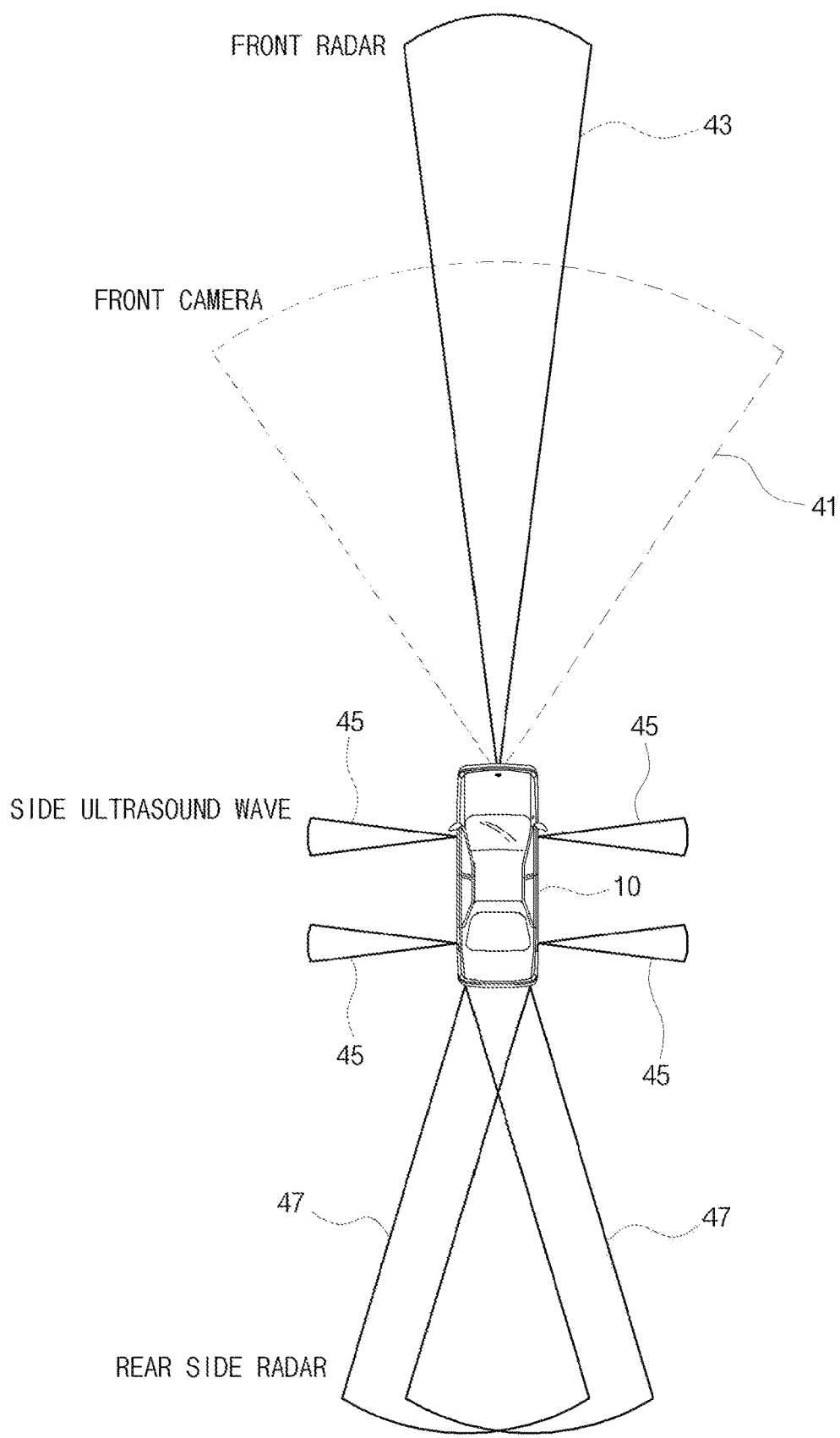
FIG. 9 is a diagram illustrating a configuration of a sensor for detecting peripheral vehicles located in each of the dangerous sections of FIG. 8.
Figure 10:
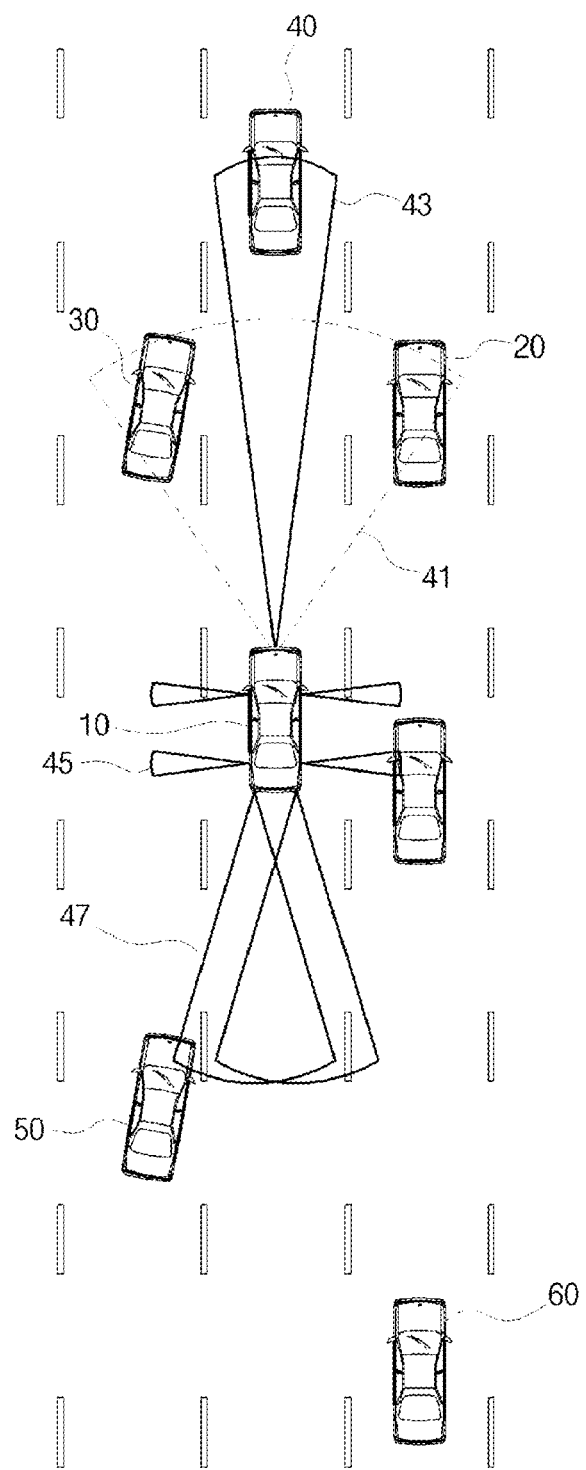
FIG. 10 is a diagram illustrating an example of detecting peripheral vehicles by using the sensor illustrated in FIG. 9.

For example, as illustrated in FIGS. 9 and 10, the three dangerous sections ①, ② and ③ may be set by calculating a time which is obtained by a relative velocity value of a detected vehicle by a TTC value for each of peripheral vehicles (20, 30, 40 and 50 in FIG. 10) which are detected from detection sections 43 and 47 detected by the front/rear radar 1120-1, detection sections detected by the front/rear camera 1120-3, and a detection section 45 detected by the side ultrasound generator 1120-5.

When the three dangerous sections ①, ② and ③ are set, the peripheral vehicle load calculator 1130-7 may analyze the number of peripheral vehicles detected from the sections and whether the peripheral vehicles change lanes, and calculate the peripheral vehicle load "$W_S$", based on a result of the analysis.

As the number of vehicles detected from the section ① increases and as the number of times the detected vehicles change lanes increases, the peripheral vehicle load "$W_S$" may increase. On the other hand, when there is no detected peripheral vehicle, or although there is a detected peripheral vehicle, the peripheral vehicle is detected from the section ③ or a trajectory change of the peripheral vehicle detected from the section ③ is not severe, the peripheral vehicle load "$W_S$" may decrease.

The peripheral vehicle load "$W_S$" may be expressed as the following Equation (3):

$$W_S = \alpha \sum_{i=1}^{n} S_i + \beta \sum_{i=1}^{n} L_i \quad (3)$$

where α denotes a weighting factor, β denotes a weighting factor, S denotes a position (the section ①, ② or ③) of a detected peripheral vehicle, and L denotes whether the detected peripheral vehicle changes a lane. When the detected peripheral vehicle has changed a lane, L may be set to 1, and when a lane is not changed, L may be set to 0. i (1<i<n, where n is a natural number) denotes a detected peripheral vehicle.

The road load calculator 1130-9 may calculate a road load by using a road shape, a road surface status, and a traffic status which are included in the ambient environment information.

A caution of a driver is more required in a curve road than a straight road and in a crossroad than a general road, and as a front traffic situation becomes worse, a caution of the driver is required. Therefore, it is required to calculate the road load.

The road load may be calculated based on the navigation information 12-9, which is supplied from the navigation 1120-9 and includes road status information, and road surface status information acquired from the front/rear camera 1120-3. The road load may be calculated as expressed in the following Equation (4):

$$W_R = \alpha \times A + \beta \times B + \gamma \times C \quad (4)$$

where A denotes a value representing a road status. For example, as a curvature value of a front road increases, A may have a large value, and when traffic lights are changed, there is a pedestrian, a velocity is limited, or a current zone is a children protection zone, A may have a large value. B denotes a road surface status value, and a paved road and an unpaved road may be reflected in B. C denotes traffic of a front road, and as traffic increases, C may have a large value. A, B, and C may be all normalized to a range of 0 to 5.

The dangerous driving index manager 1130-11 may manage the dangerous driving index (the peripheral risk index) obtained by summating the plurality of loads "$W_{Trj}$", "$W_S$" and "$W_R$" which are calculated in respective steps.

The dangerous driving index manager 1130-11 may summate the trajectory load "$W_{Trj}$", the peripheral vehicle load "$W_S$", and the road load "$W_R$" to calculate a summating result value as the dangerous driving index.

When the calculated dangerous driving index is higher than a predetermined threshold value, the dangerous driving index manager 1130-11 may supply the calculated dangerous driving index to the vehicle control systems 1150-7, 1150-9 and 1150-11 through the driving situation sensing interface 1140.

The vehicle control systems 1150-7, 1150-9 and 1150-11, which have received the calculated dangerous driving index higher than the predetermined threshold value, may control an engine operation, a braking operation, and a steering operation to restrict a driving function of the vehicle.

The dangerous driving index may be expressed as the following Equation (5):

$$\text{Dangerous Driving Index} = W_{Trj} + W_S + W_R \quad (5)$$

Figure 11:
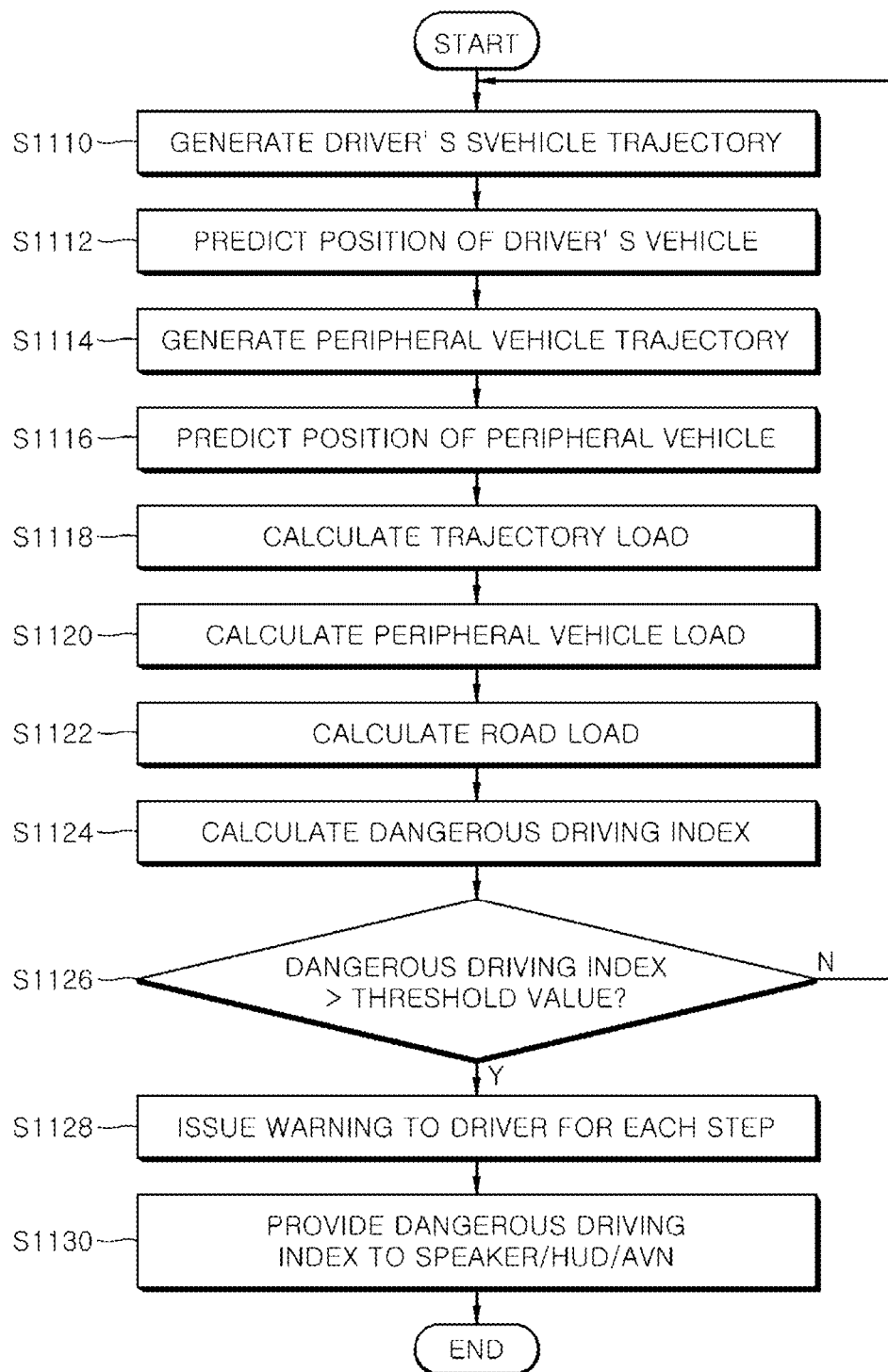
FIG. 11 is a flowchart illustrating a method of managing a dangerous driving index for vehicles, according to an embodiment of the present invention.

FIG. 11 is a flowchart illustrating a method of managing a dangerous driving index for vehicles, according to an embodiment of the present invention.

Referring to FIG. 11, in step S1110, an operation of generating a driver's vehicle driving trajectory may be performed, and in step S1112, an operation of predicting a position of the driver's vehicle by using the generated driver's vehicle driving trajectory may be performed. The driver's vehicle driving trajectory may be generated based on vehicle velocity information, steering angle information, reduction/acceleration information, and yaw rate information.

Subsequently, in step S1114, an operation of generating a peripheral vehicle driving trajectory may be performed, and in step S1116, an operation of predicting a position of a peripheral vehicle may be performed. The peripheral vehicle driving trajectory may be generated based on longitudinal distance information acquired from a radar, lateral distance information acquired from a camera, and lateral distance information acquired from an ultrasound generator. Here, the longitudinal distance information may be longitudinal distance information to the peripheral vehicle with respect to the driver's vehicle, and the longitudinal distance information may be longitudinal distance information to the peripheral vehicle with respect to the driver's vehicle.

Subsequently, in step S1118, an operation of calculating a trajectory load may be performed. The trajectory load may be calculated based on the driver's vehicle driving trajectory and the peripheral vehicle driving trajectory. For example, driving trajectories of detected peripheral vehicles may be compared with the driver's vehicle driving trajectory, and when a trajectory distance which is a difference therebetween is less than a threshold value, the trajectory load may be calculated as 1. On the other hand, when the trajectory distance is greater than the threshold value, the trajectory load may be calculated as 0.

Subsequently, in step S1120, an operation of calculating a peripheral vehicle load may be performed. The peripheral vehicle load may be calculated in consideration of the number of vehicles, located in each of a plurality of dangerous sections which are divided based on a TTC, and whether the vehicles change lanes. The peripheral vehicles located in the plurality of dangerous sections may be detected by using a radar, a camera, and an ultrasound generator, and the plurality of dangerous sections may be obtained by calculating a time which is obtained by dividing a relative velocity value by a relative distance (which is a TTC value) to a detected vehicle.

Subsequently, in step S1122, an operation of calculating a road load may be performed. The road load may be calculated based on navigation information, road surface status information, traffic information, etc.

Subsequently, in step S1124, an operation of calculating a dangerous driving index may be performed. The dangerous driving index may be calculated by summating the trajectory load, the peripheral vehicle load, and the road load.

Subsequently, in step S1126, an operation of comparing the calculated dangerous driving index with a threshold value may be performed. When the dangerous driving index is equal to or greater than the threshold value, the system 1100 may warn the driver of a dangerous driving situation by steps, based on a level of the threshold value in step S1128. Here, when the dangerous driving index is less than the threshold value, steps S1110 to S1124 may be again performed.

In step S1130, an operation of providing the dangerous driving index indicating the dangerous driving situation to the driver through a speaker, a HUD, and an AVN equipped in the vehicle may be performed.

Figure 12:
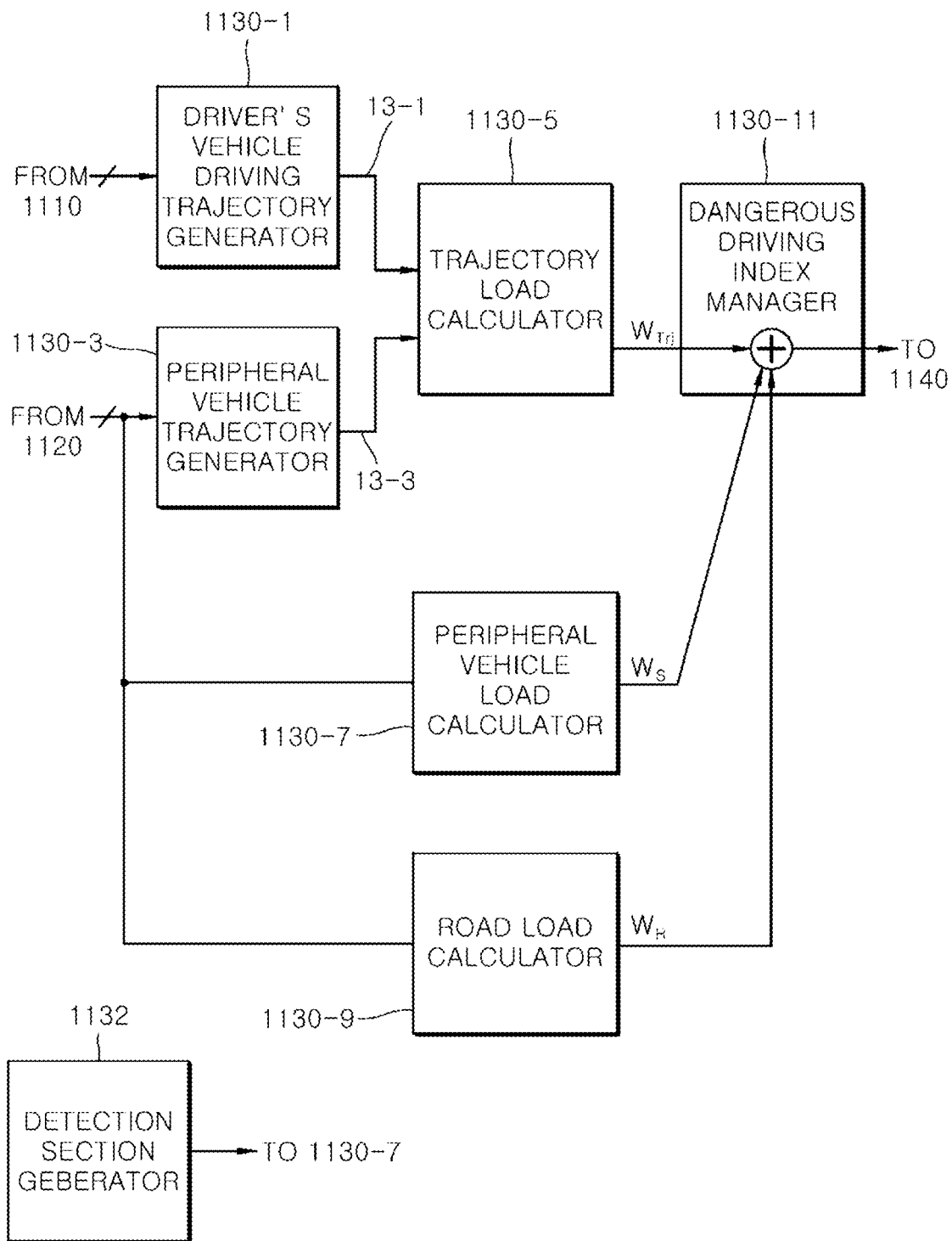
FIG. 12 is a block diagram for describing another embodiment of the ambient environment recognizer illustrated in FIG. 7.

FIG. 12 is a block diagram for describing another embodiment of the ambient environment recognizer illustrated in FIG. 7.

Referring to FIG. 12, an ambient environment recognizer 1130 according to another embodiment of the present invention may include a detection section generator 1132 for detecting an optimized section region (hereinafter referred to as a detection section) and recognizing an ambient environment in the optimized detection section. Other elements except the detection section generator 1132 are the same as the elements included in the ambient environment recognizer 1130 of FIG. 7, and thus, the details of the ambient environment recognizer 1130 described above with reference to FIG. 7 may be applied to the other elements.

The detection section generator 1132 may optimize a detection section including a target object so as to accurately distinguish an actual obstacle among target objects around a vehicle.

Figure 13:
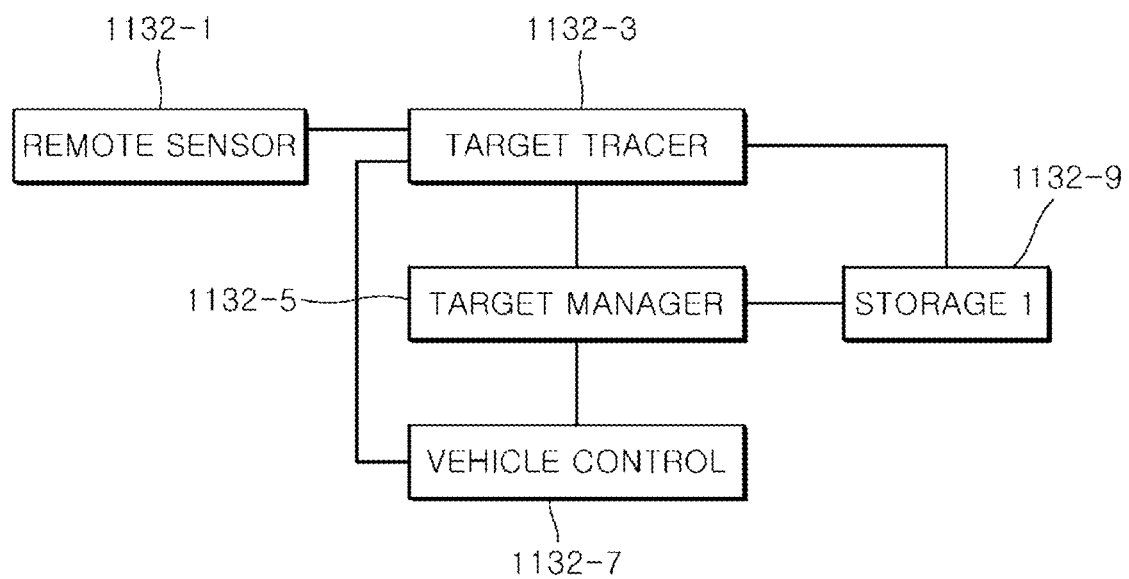
FIG. 13 is a block diagram illustrating a detailed configuration of a detection section generator illustrated in FIG. 12.

FIG. 13 is a block diagram illustrating a detailed configuration of the detection section generator 1132 illustrated in FIG. 12.

As illustrated in FIG. 13, the detection section generator 1132 for optimizing a detection section according to an embodiment of the present invention may include a remote sensor 1132-1, a target tracer 1132-3, a track manager 1132-5, and a storage 1132-9.

The remote sensor 1132-1 may detect a position of an object around a vehicle to output a detection signal. In this case, the remote sensor 1132-1 may include one or more of a lidar sensor, a radar sensor, and a camera sensor.

The target tracer 1132-3 may distinguish an obstacle, based on the detection signal and generate a track which includes a covariance of an error and a position estimation value corresponding to the distinguished obstacle, thereby tracing the position.

Generally, a Kalman filter may be used for overcoming an error of a sensor and sensing a position of a moving object. The Kalman filter may use a technique that repeats an operation of calculating an estimation value of a positon of an object, based on an estimation value of a position of the object at a previous time and a measurement value of a position of the object and thus counteracts an error which occurs in measuring the position of the object, thereby estimating an accurate position of the object. In this case, an estimation value at a current time which is based on only a measurement value to a previous time may be calculated based on an estimation value of a position of an object to the previous time.

Subsequently, an estimation value at a current time which is based on only a measurement value to a previous time may be corrected based on a covariance at the current time, which is calculated based on only the measurement value to the previous time, and a measurement value of a position of an object at the current time, and an estimation value of the position of the object at the current time may be calculated.

The target tracer 1132-3 may set the number of tracks and a detection section and an initial position of an obstacle corresponding to each of the tracks, based on the position of the object indicated by the detection signal. In this case, the detection section and the initial position of the obstacle may be calculated by the Kalman filter as expressed in the following Equation (6):

$$\hat{x}(k|k-1) = F(k-1)\hat{x}(k-1|k-1) \quad \hat{z}(k|k-1) = H(k)\hat{x}(k|k-1) \quad (6)$$

where $\hat{x}(k|k-1)$ denotes an estimation value of a status value of the object at a time "k" which is estimated based on information to a time "k−1", $\hat{x}(k-1|k-1)$ denotes an estimation value of a status value of the object at the time "k−1" which is estimated based on the information to the time "k−1", and $\hat{z}(k|k-1)$ denotes an estimation value of a position of the object at the time "k" which is estimated based on the information to the time "k−1".

Here, each track may include the Kalman filer for tracing a specific object sensed by the remote sensor 1132-1. That is, each track may include a covariance of an error for correcting a position on the basis of a measurement value and an estimation value of a position of a traced obstacle, and an estimation value, a measurement value, and a covariance which are calculated per time may be stored as histories in the storage 1132-9.

A configuration of the Kalman filter included in each track may be expressed as the following Equation (7):

$$x(k) = F(k-1)x(k-1) + v(k-1) \quad (7)$$
$$z(k) = H(k)x(k) + w(k)$$
$$P(k|k) = \sum_i \beta(k,i)\left[P(k|k,i) + (\hat{x}(k|k,i) - \hat{x}(k|k))(\hat{x}(k|k,i) - \hat{x}(k|k))^T\right]$$
$$P(k|k-1) = F(k-1)P(k-1|k1)F(k-1)^T + Q(k-1)$$

where x(k) denotes a status value of the object at the time "k", F(k−1) denotes a status change model representing a change when a time is changed from the time "k−1" to the time "k", z(k) denotes a position of the object at the time "k", H(k) denotes an observation model representing a change from a statue of the object to the position of the object, v(k−1) denotes a processing noise at the time "k−1", and w(k) denotes a measurement noise at the time "k". Also, P(k|k) denotes a covariance of an error of the Kalman filter at the time "k" which is calculated based on information to the time "k", and P(k|k−1) denotes a covariance of an error of the Kalman filter at the time "k" which is calculated based on information to the time "k−1". Q(k−1) denotes a prediction covariance at the time "k−1".

The target tracer 1132-3 may determine whether the position of the object indicated by the detection signal is included in the detection section corresponding to a track, based on errors of a measurement value and an estimation value of the position of the object and a covariance of each of the errors.

In this case, the target tracer 1132-3 may set a range of the detection section, based on a status value of the Kalman filter included in a current track and update a status value of the Kalman filter, based on measurement values included in the detection section. The target tracer 1132-3 may calculate a residual based on the measurement value and the estimation value of the position of the object, calculate a residual covariance, based on the observation model and a covariance of an estimation error included in the Kalman filter and determine whether the object enters the detection section, based on the residual and the residual covariance.

Here, the detection section may be set as a section which represents a specific probability value or less in the Gaussian probability distribution having the residual covariance as a variance, and the probability value may be referred to as a gate probability. Therefore, the detection section may be calculated by calculating the residual covariance and setting a gate probability value, and the residual covariance and the gate probability value may be optimized by the Kalman filter with time, whereby the detection section may be optimized with time.

A method of calculating the residual and the residual covariance and a condition where the object is located in the detection section may be expressed as the following Equation (8):

$$v(k,i) = z(k,i) - \hat{z}(k|k-1)$$

$$S(k) = H(k)\, P(k|k-1)\, H(k)^T + R(k)$$

$$v(k,i)^T S(k)^{-1} v(k,i) < r \qquad (8)$$

where v(k, i) denotes a residual of an object "i" at a time "k", and z(k, i) denotes a measurement value of a position of the object "i". Also, P(k|k−1) denotes a covariance of an estimation error of the Kalman filter, R(k) denotes a measurement noise at the time "k", S(k) denotes an estimation noise at the time "k", and r denotes a range of a detection section.

The track manager 1132-5 may update a position estimation value included in a track, based on a detection signal included in the track corresponding to an object which is located in a detection section.

In this case, in order to update the position estimation value, the track manager 1132-5 may calculate a Kalman gain, based on a residual covariance and a covariance of an estimation error and calculate the position estimation value by using information to a current time, based on an estimation value of a position which is estimated based on the Kalman gain, a position measurement value of an object, and information to a previous time. The update of the position estimation value may be expressed as the following Equation (9):

$$K(k) = P(k|k-1)H^T S(k)^{-1} \qquad (9)$$

$$\hat{x}(k|k, i) = \begin{cases} \hat{x}(k|k-1) & i = 0 \\ \hat{x}(k|k-1) + K(k)v(k, i) & i > 0 \end{cases}$$

$$\hat{x}(k|k) = \sum_i \beta(k, i)\hat{x}(k|k, i)$$

where K(k) denotes the Kalman gain.

As described above, the track manager 1132-5 may update the position measurement value with time, based on the measurement value, thereby calculating a more accurate position estimation value.

When a distance between an object position estimation value included in a first track and an object position estimation value included in a second track is less than a predetermined reference value, the track manager 1132-5 may initialize the first track and the second track, based on a history stored in the storage 1132-9.

The storage 1132-9 may store a history which is obtained by updating a track. In this case, the history stored in the storage 1132-9 may include a position estimation value, a position measurement value, and a covariance value of an estimation error with time of the Kalman filter included in the track.

When a position estimation value is updated as described above, objects indicated by two tracks may collide with each other depending on the case. When a position estimation value indicated by an object is reduced to less than a pre-stored reference value, the track manager 1132-5 may determine that the objects indicated by two tracks collide with each other, and initialize the track, based on data included in histories of the two colliding tracks.

Moreover, when all object position estimation values included in a track are not included in a detection section corresponding to the track, the track manager 1132-5 may initialize the track, based on a history of the track stored in the storage 1132-9. That is, when an object traced by a track deviates from the detection section, or the object traced by the track is determined as noise or an error and thus disappears, the track may fail to trace the object, and thus, the track manager 1132-5 may initialize the track and trace a new object.

As described above, a track may trace a moving obstacle by using the Kalman filter. When a track tracing an object fails to trace the object or two tracks collide with each other, a track may be initialized, and a new object may be traced. Accordingly, an object identification performance of a peripheral status detection system is enhanced.

As described above, the target tracer 1132-3 and the track manager 1132-5 may trace an obstacle to generate or update a track, and data included in the generated or updated track may be transferred to the vehicle controller 1132-7 and may be used to control a vehicle in order for the vehicle to avoid an obstacle or issue a warning.

Figure 14:
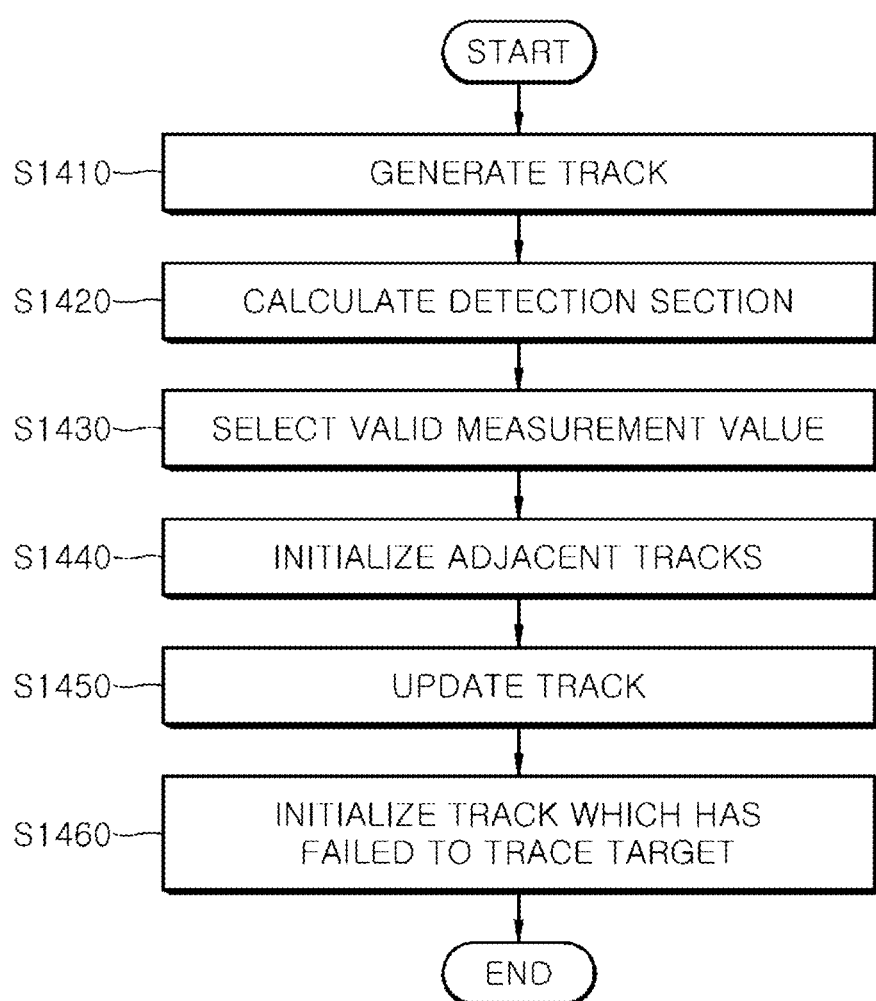
FIG. 14 is a flowchart illustrating a method of optimizing a detection section, according to an embodiment of the present invention.

FIG. 14 is a flowchart illustrating a method of optimizing a detection section, according to an embodiment of the present invention.

Referring to FIG. 14, in step S1410, the target tracer 1132-3 may generate a track which includes a covariance of an error and a position estimation value corresponding to a distinguished obstacle, based on a detection signal which the remote sensor 1132-1 senses a position of an object and outputs.

In this case, as described above, the remote sensor 1132-1 may include one or more of a lidar sensor and a radar sensor.

Moreover, a track generated by the target tracer 1132-3 may include a Kalman filter which includes a position estimation value and a covariance of an error. In this case, a configuration of the Kalman filter included in the track is as described with reference to Equations (1) and (2).

Subsequently, in step S1420, the target tracer 1132-3 may calculate a detection section which is a range where an obstacle is detected for the track.

In this case, a size of the detection section may be set to an initial value, based on a position of the object indicated by the detection signal. Also, the detection section may be set as a section which represents a gate probability value or less in the Gaussian probability distribution having a residual covariance as a variance.

Subsequently, in step S1430, the target tracer 1132-3 may select a valid detection signal, where the position of the object indicated by the detection signal is included in the detection section, from the detection signal.

As described above, the detection signal may include a measurement value of the position of the object traced by a peripheral search system of a vehicle, and the target tracer 1132-3 may select a valid measurement value of the measurement value included detection section to update the Kalman filter, and use the updated Kalman filter for tracing an object.

In this case, the target tracer 1132-3 may determine whether the position of the object indicated by the detection signal is included in the detection section corresponding to the track, based on errors of a measurement value and an estimation value of the position of the object and a covariance of each of the errors.

The target tracer 1132-3 may set a range of the detection section, based on a status value of a Kalman filter included in a current track and update a status value of the Kalman filter by using measurement values included in the detection section. Here, the target tracer 1132-3 may calculate a residual based on the measurement value and the estimation value of the position of the object, calculate a residual covariance, based on the observation model and a covariance of an estimation error included in the Kalman filter and determine whether the object enters the detection section, based on the residual and the residual covariance. A method of calculating the residual and the residual covariance and a condition where the object is located in the detection section are as expressed in Equation (8). The residual covariance and a gate probability value may be optimized by the Kalman filter with time, and thus, the detection section may be optimized with time.

Subsequently, in step S1440, when a distance between an object position estimation value included in a first track and an object position estimation value included in a second track is less than a predetermined reference value, the track manager 1132-5 may initialize the first track and the second track, based on a history stored in the storage 1132-9.

The history stored in the storage 1132-9 may include a position estimation value, a position measurement value, and a covariance value of an estimation error with time of the Kalman filter included in the track.

When a position estimation value is updated as described above, objects indicated by two tracks may collide with each other depending on the case. When a position estimation value indicated by an object is reduced to less than a pre-stored reference value, the track manager 1132-5 may determine that the objects indicated by two tracks collide with each other, and initialize the track, based on data included in histories of the two colliding tracks.

Subsequently, in step S1450, the track manager 1132-5 may update the selected detection signal and a position estimation value included in a track corresponding to an object of which a position is located in the detection section.

In this case, in order to update the position estimation value, the track manager 1132-5 may calculate a Kalman gain, based on a residual covariance and a covariance of an estimation error and calculate the position estimation value by using information to a current time, based on an estimation value of a position which is estimated based on the Kalman gain, a position measurement value of an object, and information to a previous time. The update of the position estimation value is as expressed in Equation (9).

Subsequently, when all object position estimation values included in a track are not included in a detection section corresponding to the track, the track manager 1132-5 may initialize the track, based on a history of the track stored in the storage 1132-9 and terminate a process.

That is, when an object traced by a track deviates from the detection section, or the object traced by the track is determined as noise or an error and thus disappears, the track may fail to trace the object, and thus, the track manager 1132-5 may initialize the track and trace a new object.

As described above, a track may trace a moving obstacle by using the Kalman filter. When a track tracing an object fails to trace the object or two tracks collide with each other, a track may be initialized, and a new object may be traced. Accordingly, an object identification performance of a peripheral status detection system is enhanced.

Data included in a track which is generated or updated by the above-described method may be transferred to the vehicle controller 1132-7 and may be used to control a vehicle in order for the vehicle to avoid an obstacle or issue a warning.

As described above, a vehicle control apparatus and method according to an embodiment of the present invention dynamically updates a valid gate representing a section of interest (SOI) which is traced by the peripheral status detection system of a vehicle for sensing an obstacle, and thus accurately traces an obstacle around the vehicle. Therefore, the vehicle control apparatus and method extend a distance to an obstacle of which a position is accurately traced by using only a lidar sensor or a radar sensor, thereby preventing an accident.

Figure 15:
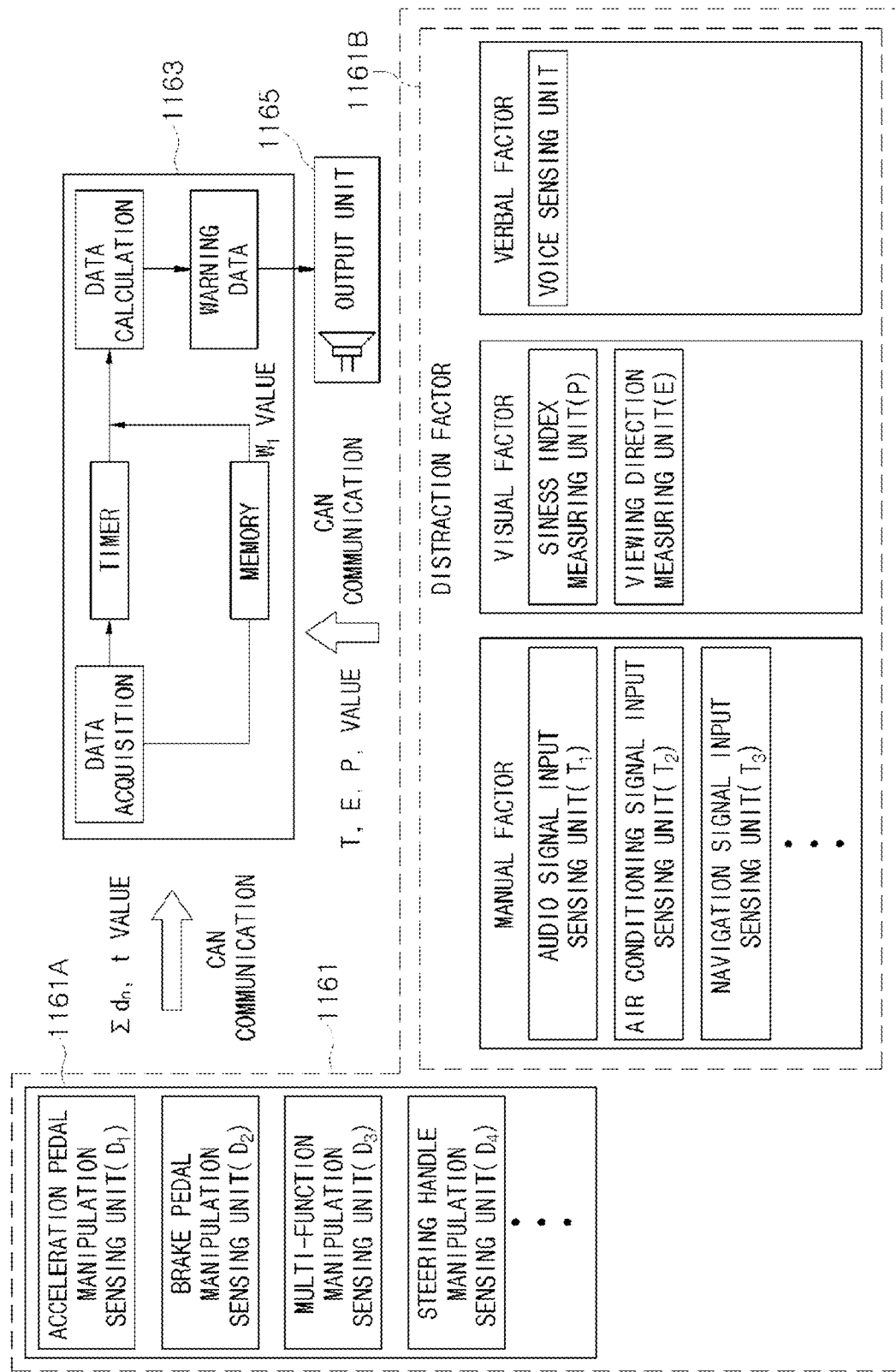
FIG. 15 is a block diagram illustrating a detailed configuration of a driver status sensing system illustrated in FIG. 6.
Figure 18A:
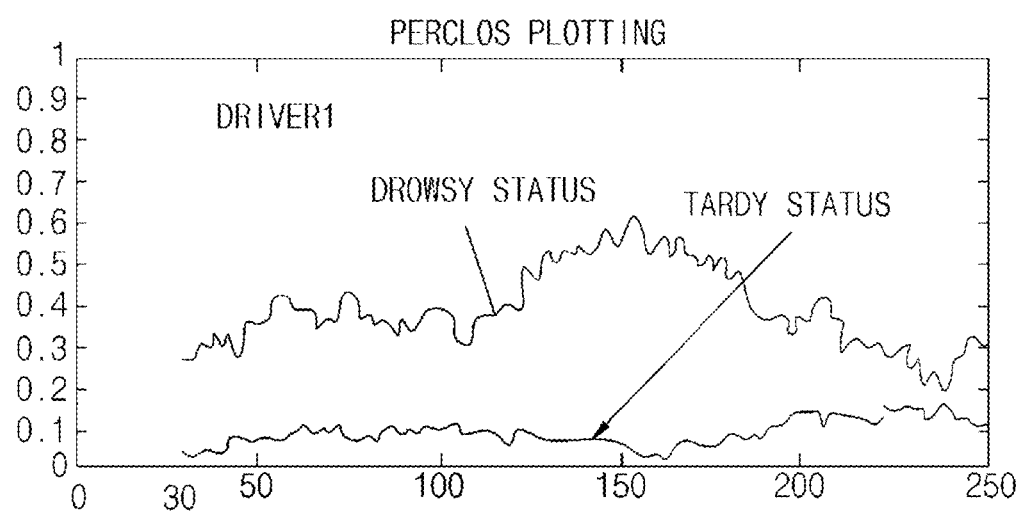
FIGS. 18A to 18F are a graph for describing a drowsiness load of a driver in a driving interruption load according to an embodiment of the present invention.
Figure 18B:
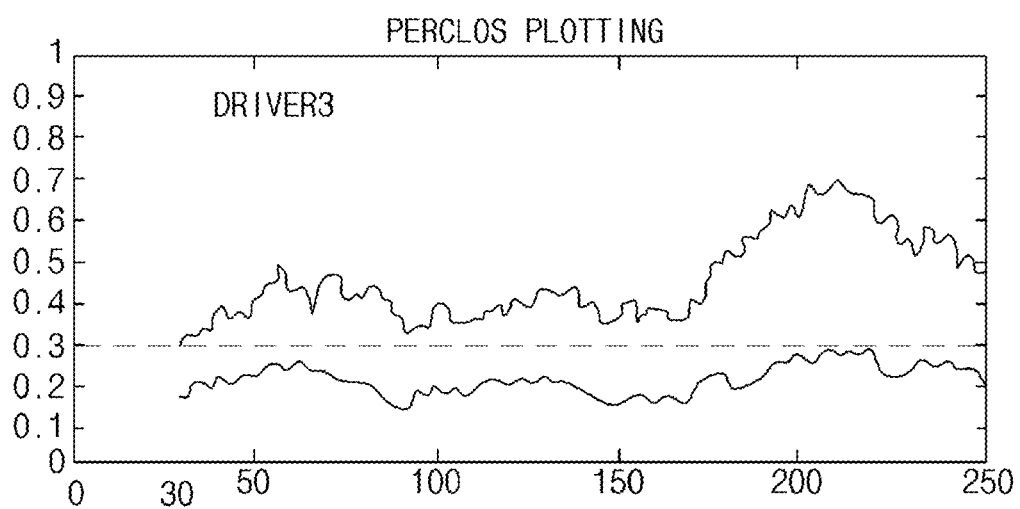
Figure 18C:
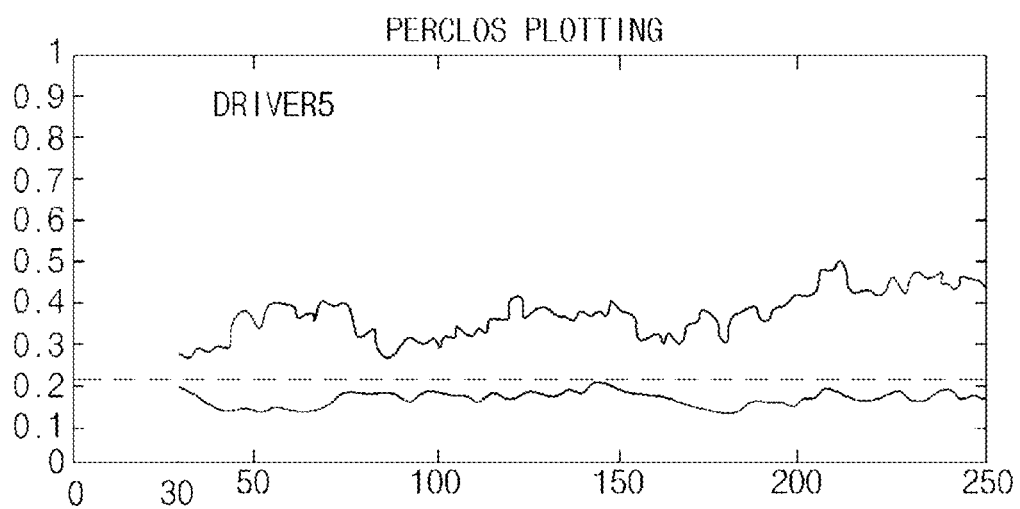
Figure 18D:
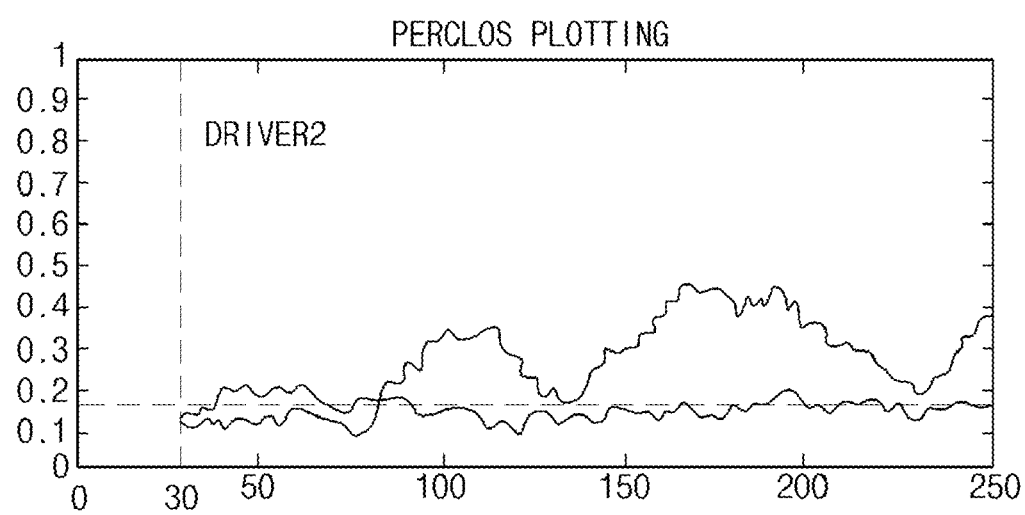
Figure 18E:
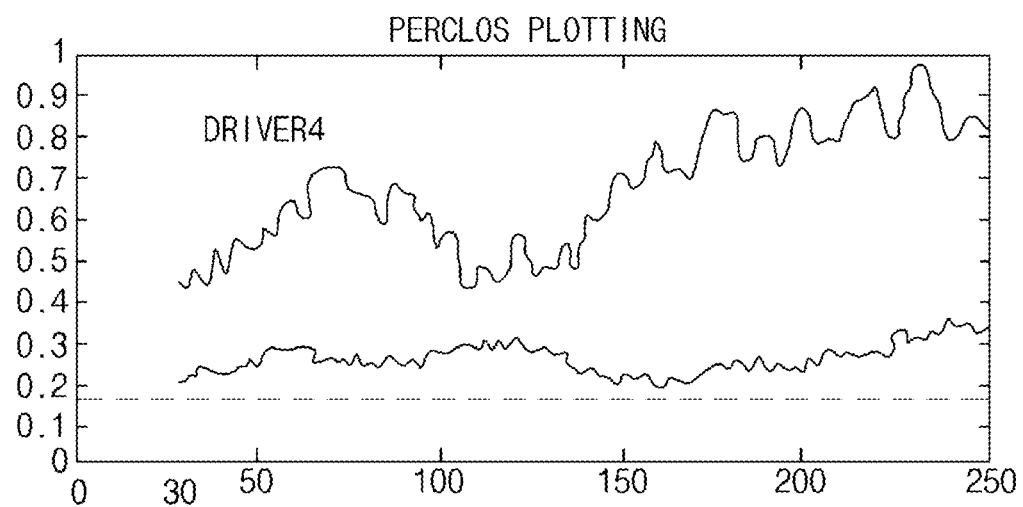
Figure 18F:
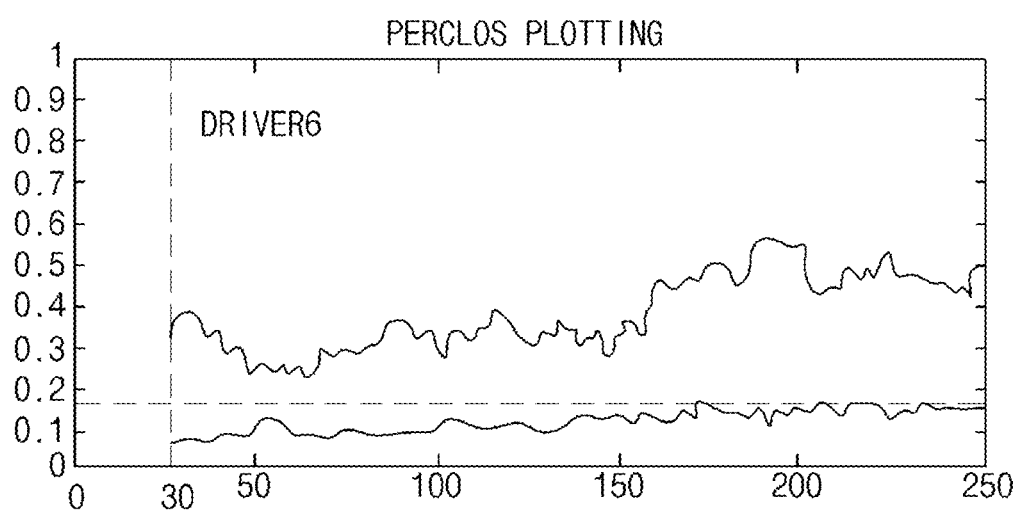

FIG. 15 is a block diagram illustrating a detailed configuration of the driver status sensing system 1160 illustrated in FIG. 1.

Referring to FIG. 15, the driver status sensing system 1160 may include an acquisition unit 1161, a control unit 1163, and an output unit 1165.

The acquisition unit 1161 may be an element for acquiring driving manipulation information of a vehicle and careless status information of a driver. In this case, the acquisition unit 1161 may include a driving manipulation sensing unit 1161A and a careless status sensing unit 1161B. The acquisition unit 1161 may acquire the driving manipulation information by using the driving manipulation sensing unit 1161A and acquire the careless status information by using the careless status sensing unit 1161B.

The driving manipulation sensing unit 1161A may be an element for sensing manipulation of a control unit which necessarily operates for driving a vehicle. For example, the driving manipulation sensing unit 1161A may be an electronic control unit (ECU) of the vehicle or a separate module which is included in the ECU.

The driving manipulation sensing unit 1161A may include a plurality of manipulation sensing units such as an acceleration pedal manipulation sensing unit $d_1$, a brake pedal manipulation sensing unit $d_2$, a multi-function manipulation sensing unit $d_3$, and a steering handle manipulation sensing unit $d_4$.

As illustrated in (a) FIG. 16, the plurality of manipulation sensing units included in the driving manipulation sensing unit 1161A may sense manipulation for driving of the vehicle, and for example, may sense at least one of acceleration pedal (ACC pad) manipulation, brake pedal manipulation, multi-function switch manipulation, and steering handle manipulation.

In addition, the driving manipulation sensing unit 1161A may acquire the driving manipulation information which further includes clutch pedal manipulation or transmission manipulation of a manual-gear vehicle. In this case, the driving manipulation sensing unit 1161A may check a velocity of the vehicle, and when the velocity of the vehicle is equal to or higher than a certain velocity (for example, 10 km/h), the driving manipulation sensing unit 1161A may acquire the driving manipulation information.

For example, the driving manipulation sensing unit 1161A may sense the number "$n_A$" of operations of an acceleration pedal manipulated by a driver at every certain time for a predetermined time. For example, the driving manipulation sensing unit 1161A may continuously check whether the acceleration pedal operates (ON), at every second of 50 ms for second of 200 ms.

Likewise, the driving manipulation sensing unit 1161A may sense the numbers "$n_B$" and "$n_C$" of operations of the brake pedal and the clutch pedal which are manipulated at every certain time.

As another example, the driving manipulation sensing unit 1161A may sense the number "$n_M$" of operations of each multi-function switch which is manipulated by a driver for a certain time. Here, each multi-function switch may be a switch for operating a vehicle wiper or a vehicle lamp such as a turn signal lamp. For example, the driving manipulation sensing unit 1161A may count the number of operations of a multi-function switch which is manipulated for second of 200 ms.

As another example, the driving manipulation sensing unit 1161A may sense an angular velocity of a steering wheel which is manipulated by the driver for a certain time. In this case, the driving manipulation sensing unit 1161A may measure an angle change amount of the steering wheel to calculate the angular velocity without separately measuring the angular velocity. For example, the driving manipulation sensing unit 1161A may measure the angle change amount of the steering wheel to calculate the angular velocity at every second of 50 ms for second of 200 ms.

The careless status sensing unit 1161B may be an element for sensing a motion of the driver and manipulation of a control unit which additionally operates when the vehicle drives. The careless status sensing unit 1161B may include a plurality of sensing units such as an audio signal input sensing unit $T_1$, an air conditioning signal input sensing unit $T_2$, a navigation signal input sensing unit $T_3$, etc.

Moreover, the careless status sensing unit 1161B may include a drowsiness index measuring unit P, a viewing direction measuring unit E, and a voice sensing unit V, for sensing a motion (a visual factor or a verbal factor) of the driver. The plurality of sensing units and the plurality of measuring units included in the careless status sensing unit 1161B, as illustrated in FIG. 15, may be provided at a certain position of the vehicle and may acquire careless status information, based on information about at least one of manipulation of a peripheral device, a facial image of the driver, and a voice of the driver.

For example, the careless status sensing unit 1161B may sense the number "$n_T$" of manipulations of peripheral devices which are made by the driver while the vehicle is driving. Here, the peripheral devices may not be devices essential for driving of the driver unlike an AVN, a vehicle air conditioning device, etc., but may be control units which are manipulated for convenience of the driver or a vehicle indoor environment. For example, the careless status sensing unit 1161B may sense the number of inputs of operational switches of peripheral devices, which are manipulated by the driver for a certain time while the vehicle is driving at a certain velocity (for example, 10 km/h) or more, to acquire careless status information.

As another example, the careless status sensing unit 1161B may sense a voice of the driver through a microphone which is disposed at a certain position in the vehicle. For example, the careless status sensing unit 1161B may check a voice production time and a pulse level (a voice level) of voice data which is received from the microphone for a certain time. For example, the careless status sensing unit 1161B may detect a time, at which voice data having a pulse level equal to or higher than a pulse threshold value is received for a certain time (for example, 200 ms), to acquire careless status information by using the pulse threshold value stored in a memory.

As another example, the careless status sensing unit 1161B may receive a facial image of the driver from a camera, which is disposed at a certain position of the vehicle, to acquire eye-closing information and observation negligence information of the driver. In this case, as illustrated in (b) of FIG. 16, the camera may include a near infrared light emitting diode (LED) for recording an image at daytime and nighttime.

For example, the careless status sensing unit 1161B may separately extract an eye region image of the driver from the facial image of the driver. In this case, the eye region image may be extracted from the facial image of the driver through image processing. That is, the careless status sensing unit 1161B may acquire careless status information such as the eye closing and observation negligence of the driver, based on the facial image of the driver acquired from the camera and the eye region image included in the facial image.

The careless status sensing unit 1161B may acquire the eye-closing information of the driver, based on the eye region image extracted from the facial image of the driver.

Referring to FIG. 17, the careless status sensing unit 1161B may sense an eyelid region from the eye region image, and when a sum of ∠A and ∠B which are angles of eyelids is equal to or less than ∠C which is a predetermined threshold angle value (∠A+∠B≤φC), the careless status sensing unit 1161B may determine the driver as closing eyes.

The careless status sensing unit 1161B may check the angles of the eyelids for a certain time to sense the number of times the driver closes eyes, and calculate a certain time value and the number of times the driver closes the eyes, thereby acquiring a drowsing time (a drowsiness index) of the driver. For example, the careless status sensing unit 1161B may measure (count) the number of eye-closings by dividing one second into sections of 250 ms, and when a counting value is 3, a time (the drowsiness index) when the driver closes the eyes may be acquired as 750 ms.

Moreover, the careless status sensing unit 1161B may acquire the observation negligence of the driver, based on the facial image of the driver and the eye region image included in the facial image.

Referring to FIG. 20, in an observation negligence range, observation negligence information may be acquired by checking (a viewing direction) whether a viewing range of the driver is within a visual distance "η" where there is no load when the vehicle drives, based on an angle of a vehicle wheel (i.e., an angle change amount (ΘA or ΘB in (a) of FIG. 20) of a wheel in a center of the vehicle) instead of an angle of a steering wheel. The viewing range may be checked by performing an operation which calculates an angle of a face (α in (b) of FIG. 20) from the facial image of the driver acquired from the camera and then measures a position (a position of pupil) of a pupil (β in (c) of FIG. 20) in the eye region image.

In detail, in a case where a gear lever is D gear or N gear when an angle of the steering wheel is within a certain angle, when the viewing of the driver does not enter a driving non-load visual range (a, b) for a certain time, the careless status sensing unit 1161B may determine observation negligence, check a corresponding time, and acquire the observation negligence information. For example, in a case where an angle of the steering wheel is less than ±15 degrees when a velocity of the vehicle is 10 Km or more and the gear lever is the D gear or the N gear, when the viewing of the driver does not enter the driving non-load visual range (a, b) for 1.5 seconds or more, the careless status sensing unit 1161B may determine observation negligence for the front of the vehicle.

The control unit 1163 may be an element that controls an overall operation of the driver status sensing system 1160, and may be an electronic control unit. For example, the control unit 1163 may be referred to as a driving workload compute unit (DWC).

In detail, the control unit 1163 may calculate a driving manipulation load and a driving interruption load, based on the driving manipulation information and the careless status information acquired from the acquisition unit 1161.

Moreover, the control unit 1163 may compare the driving manipulation load with the driving interruption load to determine whether a driving status of the driver is a safety driving status, and when it is determined that the driving status of the driver is not the safety driving status, the control unit 1163 may control the output unit 1165 to output warning information.

First, the control unit 1163 may calculate the driving manipulation load and the driving interruption load, based on the driving manipulation information and the careless status information acquired from the acquisition unit 1161.

For example, the control unit 1163 may calculate the driving manipulation load "$W_d$", based on the driving manipulation information acquired from the driving manipulation sensing unit 1161A of the acquisition unit 1161.

In detail, the control unit 1163 may acquire the driving manipulation information from the driving manipulation sensing unit 1161A, read an item-based weight value of the driving manipulation information from the memory, and calculate the driving manipulation load.

Here, the weight value may be a value which is extracted and predetermined for each item of driving manipulation information through various experiments. Alternatively, the weight value may be a value which is arbitrarily predetermined for each item by a worker. Also, the memory may be a storing means for storing data, and for example, may be a nonvolatile memory.

Moreover, the control unit 1163 may calculate a load for each item, based on an item included in the driving manipulation information and a weight value corresponding to the s item. For example, when driving manipulation information of acceleration pedal manipulation, brake pedal manipulation, multi-function switch manipulation, and steering handle manipulation is acquired from the acquisition unit 1161, the control unit 1163 may read, from the memory, a weight value "$D_A$" of the acceleration pedal manipulation, a weight value "$D_B$" of the brake pedal manipulation, a weight value "$D_M$" of the multi-function switch manipulation, and a weight value "$\theta$" of the steering handle manipulation.

For example, when time information and times information of each item are acquired from the acquisition unit 1161 in units of 50 ms for second of 200 ms, the driving manipulation load "$W_d$" calculated by the control unit 1163 for second of 200 ms may be expressed as the following Equation (10):

$$W_d = D_A \times n_A \times 50 \text{ ms} + D_B \times n_B \times 50 \text{ ms} + D_C \times n_C \times 50 \text{ ms} + D_M \times n_M + \theta \times n_\theta \times 50 \text{ ms} \quad (10)$$

Each item included in the driving manipulation information may be added or subtracted depending on the case. For example, when clutch pedal manipulation and transmission manipulation are included in the driving manipulation information depending on the kind of a vehicle, the control unit 1163 may calculate the driving manipulation load in further consideration of a weight value of the clutch pedal manipulation and a weight value of the transmission manipulation.

As another example, the control unit 1163 may calculate the driving interruption load "$W_i$", based on the careless status information acquired from the careless status sensing unit 1161B of the acquisition unit 1161. In detail, the control unit 1163 may calculate loads of the items included in the careless status information acquired from the careless status sensing unit 1161B, and summate the calculated loads of the items to calculate the driving interruption load.

The control unit 1163 may calculate a peripheral device manipulation load "T(n)", based on the number of manipulations of peripheral devices acquired from the careless status sensing unit 1161B of the acquisition unit 1161.

For example, the control unit 1163 may calculate the peripheral device manipulation load in further consideration of a weight value of peripheral device manipulation which is stored in the memory. For example, when the number of inputs of peripheral device manipulation which is made by the driver for second of 20 ms is acquired from the acquisition unit 1161, the control unit 1163 may perform an arithmetic operation on the number of inputs of the peripheral device manipulation and a weight value to calculate the peripheral device manipulation load "T(n)".

Furthermore, the control unit 1163 may calculate a voice load "V(n)", based on voice data of the driver acquired from the careless status sensing unit 1161B of the acquisition unit 1161. In detail, the control unit 1163 may calculate the voice load, based on a pulse threshold value of the voice data stored in the memory. For example, the control unit 1163 may calculate a time, at which voice data having the pulse threshold value or more is received, in the voice data of the driver which is acquired from the careless status sensing unit 1161B of the acquisition unit 1161 for a certain time (for example, 200 ms), thereby calculating a voice load "V(t)".

Moreover, the control unit 1163 may calculate a drowsiness load "P(t)" and a driving observation negligence load "E(t)", based on the eye-closing information and the observation negligence information which are included in the careless status information acquired from the careless status sensing unit 1161B of the acquisition unit 1161.

Referring to a graph of FIGS. 18A to 18F, when the driver is in a tardy state, a change width of the graph may be very stably narrow, but a PERCLOS value when the driver is in a drowsy status may be very severe in change and may be higher in whole numerical value than the tardy status. Here, the PERCLOS value may be expressed as the following Equation (11):

$$PERCLOS(\%) = \frac{\text{accumulation of eye-}closing\text{ time}}{\text{certain measurment time for accumulation}} \times 100 \quad (11)$$

Based on the graph of FIGS. 18A to 18F, when it is checked by the control unit 1163 that the PERCLOS value is a certain percentage (30%) or more, namely, it is checked through the careless status sensing unit 1161B that the driver have closed eyes for a certain time (for example, 75 seconds) with respect to a certain time (for example, 250 seconds), the control unit 1163 may control the output unit 1165 to output a vehicle warning sound. This is for immediately outputting a warning sound to a driver by determining the driving of the driver as drowsy driving when it is checked that the driver has closed eyes for a certain time or more because the drowsy driving is the highest dangerous factor in driving a vehicle.

Hereinafter, an operation where the control unit 1163 checks the eye closing of the driver will be described with reference to a flowchart of FIG. 19.

In detail, in step S1910, the control unit 1163 may determine whether a vehicle velocity "V" is a certain velocity (for example, V≥10 Km/h) or more. When it is determined that the vehicle velocity "V" is the certain velocity or more, by using the careless status sensing unit 1161B, the control unit 1163 may check the number "y" of eye closings from an angle of an eyelid per certain time "x" (for example, 250 ms or 0.25 s) for a certain measurement time "N" to calculate an eye closing time (a drowsing time) of the driver.

In step S1920, the control unit 1163 may determine whether the angle of the eyelid is ∠A+∠B≤∠C. When the angle of the eyelid is ∠A+φB≤∠C, the control unit 1163 may determine the driver as closing the eyes to count (y++) the number of eye closings in step S1930.

The control unit 1163 may count (x+=0.25, y++) the number "y" of eye closings per certain time "x", and when the number of eye closings is three (x=1, y=3) for one second in step S1940, the control unit 1163 may count (P++) a patient factor value "P" and repeat the operation while increasing (N++) a time by one second in step S1950.

For example, when the patient factor value "P" is 100 or more within a measurement time of 250 seconds in step S1960, the control unit 1163 may control the output unit 1165 to generate a warning event in step S1970. At this time, the control unit 1163 may change the patient factor value "P" to 99, reduce (P=99, N−=1) the measurement time "N" by one second, repeat the above-described steps, and calculate an eye closing time (a drowsing time) of the driver. In addition, the control unit 1163 may check a case where the PERCLOS value is 30% or more for a certain time, thereby calculating the drowsiness load "P(t)".

Moreover, the control unit 1163 may calculate the observation negligence load "E(t)", based on the observation negligence information acquired from the careless status sensing unit 1161B.

As illustrated in (a) of FIG. 20, when the viewing range deviates from the driving non-load visual distance "η", a factor value of the load factor "P" may be changed according to a deviating range.

When a deviating range (a', b') is predetermined, the control unit 1163 may read a factor value of a load factor from the memory for each range corresponding to a current viewing range of the driver, thereby calculating the observation negligence load "E(t)".

The control unit 1163 may perform an arithmetic operation on the calculated peripheral device manipulation load "T(n)", voice load "V(t)", drowsiness load "P(t)", and observation negligence load "E(t)" to calculate the driving interruption load "$W_i$".

Moreover, depending on a status of the vehicle and the case, at least one of loads which are acquired based on the careless status information may not be considered for calculating the driving interruption load.

The control unit 1163 may compare the driving load "$W_d$" with the driving interruption load "$W_i$" to determine a safety driving status of the driver.

In detail, when a value of the driving interruption load "$W_i$" subtracted from the driving load "$W_d$" is equal to or less than a predetermined spare load "$W_1$", the control unit 1163 may determine that the driver is not in a safety driving status. Here, the predetermined spare load "$W_1$" may be a value which is extracted from a driving load and driving information (including a change gear status, vehicle acceleration, steering, and/or the like) through an experiment based on a condition of an experimented driver and is stored in the memory, and may be varied ($W_d \propto W_1$) depending on a driving condition. That is, a condition expressed as the following Equation (12) may be satisfied for determining a driving status of the driver as the safety driving status:

$$\sum_{t=t1}^{t=t2} \{W_d(t, n) - (v(t) + T(n) + E(t) + P(t))\} \geq W_i \quad (12)$$

$$W_d = d_1 t_1 + d_2 t_2 + d_3 t_3 + d_4 t_4$$

where t denotes a time value, and n is a times value.

The output unit 1165 may be an element for outputting a screen and a warning sound, and may include a liquid crystal display (LCD) and a speaker. For example, as illustrated in FIG. 16 (*b*), the output unit 1165 may output the screen and the warning sound through a cluster. Alternatively, the output unit 1165 may display the screen through an audio display. In addition, as illustrated in (*a*) of FIG. 21, the output unit 1165 may display a safety driving status determination result and a result value thereof, which are obtained by the control unit 1163, on the screen in a rod graph form. In this case, the rod graph may be displayed in various colors.

For example, the control unit 1163 may control the output unit 1165 to display information of a current load, which is based on a difference between the driving load and the driving interruption load, as a rod graph on a screen.

In detail, a result value "C" which is obtained by dividing, by the spare load "$W_1$", a difference between the driving load "$W_d$" and the driving interruption load "$W_i$" calculated by the control unit 1163 may be shown as a percentage unit of the rod graph.

For example, a case where it is difficult to drive the vehicle is set to 75%, and when the result value "C" is 75% or more, the control unit 1163 may control the output unit 1165 to display the rod graph in red. Also, by controlling the output unit 1165 for the rod graph to flicker, the control unit 1163 may remind the driver of a driving danger of the vehicle.

In this case, the control unit 1163 may control the output unit 1165 to output the warning sound, thereby issuing a warning to the driver.

When the result value "C" is less than 75%, the rod graph may be displayed in green and thus may inform the driver of a safe status.

Furthermore, when the result value "C" which is obtained by dividing a difference between the driving load "$W_d$" and the driving interruption load "$W_i$" by the spare load "$W_1$" is equal to or greater than a certain level (for example, 85%), the control unit 1163 may forcibly turn off power of an AVN which has no difficulty to perform the safe driving of the vehicle.

In addition, the control unit 1163 may increase volume of the warning sound output by the output unit 1165 so as to be proportional to the power of the result value "C", thereby strongly warning the driver of a driving danger.

As described above, the present invention may compare a driving load, which occurs in driving a vehicle, with a driving interruption load which interrupts the driving of the vehicle like a peripheral device, drowsiness of a driver, and/or the like, and thus check a safety driving status of the driver. The present invention may issue a warning to the driver when a load of interrupting the driving of the vehicle is high, and depending on the case, the present invention may forcibly stop an operation of an element (for example, a peripheral device), which is not essential for the driving of the vehicle, to decrease a driving interruption load which interrupts the driving of the vehicle, thereby enabling the driver to safely drive the vehicle.

Figure 22:
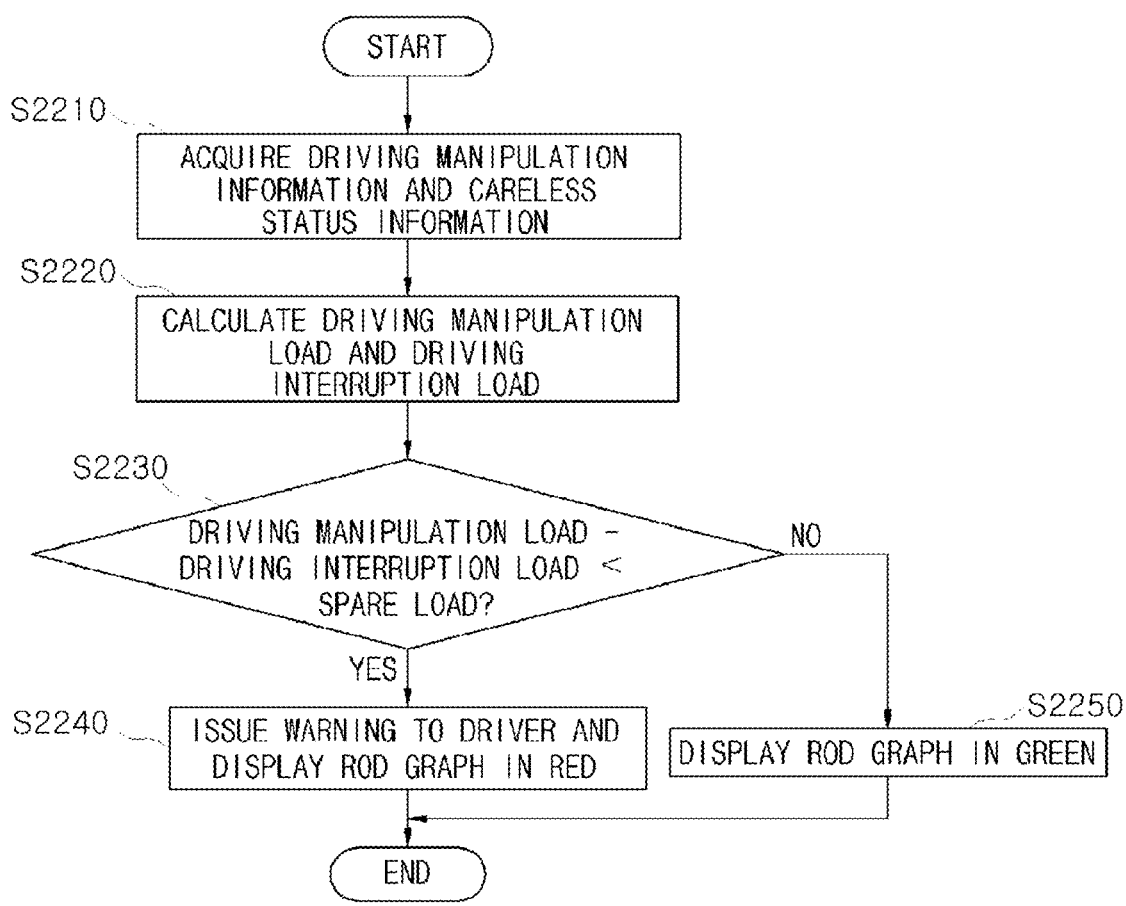
FIG. 22 is a flowchart illustrating a driver status sensing method according to an embodiment of the present invention.

FIG. 22 is a flowchart illustrating a driver status sensing method according to an embodiment of the present invention.

First, in step S2210, the driver status sensing system 1160 may acquire driving manipulation information and careless status information of a driver.

In detail, the driver status sensing system 1160 may sense driving manipulations of driving control units, which are essential for driving of the vehicle, to acquire the driving manipulation information.

For example, the driver status sensing system 1160 may acquire driving manipulation information by sensing at least one of acceleration pedal (ACC pad) manipulation, brake pedal manipulation, multi-function switch manipulation, and steering handle manipulation. In this case, the driver status sensing system 1160 may check a velocity of the vehicle, and when the velocity of the vehicle is equal to or higher than a certain velocity (for example, 10 km/h), the driver status sensing system 1160 may acquire the driving manipulation information.

For example, the driver status sensing system 1160 may sense the number "$n_A$" of operations of an acceleration pedal manipulated by a driver at every certain time for a predetermined time. Likewise, the driver status sensing system 1160 may sense the numbers "$n_B$" and "$n_C$" of operations of the brake pedal and the clutch pedal which are manipulated at every certain time.

As another example, the driver status sensing system 1160 may sense the number "$n_M$" of operations of each multi-function switch which is manipulated by a driver for a certain time. Here, each multi-function switch may be a switch for operating a vehicle wiper or a vehicle lamp such as a turn signal lamp.

As another example, the driver status sensing system 1160 may sense an angular velocity of a steering wheel which is manipulated by the driver for a certain time. In this case, the driver status sensing system 1160 may measure an angle change amount of the steering wheel to calculate the angular velocity without separately measuring the angular velocity.

Furthermore, the driver status sensing system 1160 may acquire careless status information, based on a peripheral device which is selectively controlled by the driver while the vehicle is driving, a voice of the driver, and facial information.

For example, the driver status sensing system 1160 may sense the number "nT" of manipulations of peripheral devices which are made by the driver while the vehicle is driving. Here, the peripheral devices may not be devices essential for driving of the driver unlike an AVN, a vehicle air conditioning device, etc., but may be control units which are manipulated for convenience of the driver or a vehicle indoor environment.

As another example, the driver status sensing system 1160 may sense a voice of the driver through a microphone which is disposed at a certain position in the vehicle. For example, the driver status sensing system 1160 may check a voice production time and a pulse level (a voice level) of voice data which is received from the microphone for a certain time.

As another example, the driver status sensing system 1160 may receive a facial image of the driver from a camera, which is disposed at a certain position of the vehicle, to acquire eye-closing information and observation negligence information of the driver. In this case, as illustrated in FIG. 16, the camera may include a near infrared LED for recording an image at daytime and nighttime.

For example, the driver status sensing system 1160 may separately extract an eye region image of the driver from the facial image of the driver. In this case, the eye region image may be extracted from the facial image of the driver through image processing. That is, the driver status sensing system 1160 may acquire careless status information such as the eye closing and observation negligence of the driver, based on the facial image of the driver acquired from the camera and the eye region image included in the facial image.

The driver status sensing system 1160 may acquire the eye-closing information of the driver, based on the eye region image extracted from the facial image of the driver. Referring to FIG. 17, the driver status sensing system 1160 may sense an eyelid region from the eye region image, and when a sum of $\angle A$ and $\angle B$ which are angles of eyelids is equal to or less than $\angle C$ which is a predetermined threshold angle value ($\angle A+\angle B \leq \angle C$), the careless status sensing unit 1161B may determine the driver as closing eyes.

The driver status sensing system 1160 may check the angles of the eyelids for a certain time to sense the number of times the driver closes eyes, and calculate a certain time value and the number of times the driver closes the eyes, thereby acquiring eye-closing information (a drowsiness time) of the driver.

Moreover, the driver status sensing system 1160 may acquire the observation negligence of the driver, based on the facial image of the driver and the eye region image included in the facial image.

Referring to FIG. 20, in an observation negligence range, observation negligence information may be acquired by checking (a viewing direction) whether a viewing range of the driver is within a visual distance "$\eta$" where there is no load when the vehicle drives, based on an angle of a vehicle wheel (i.e., an angle change amount ($\Theta A$ or $\Theta B$ in (a) of FIG. 20) of a wheel in a center of the vehicle) instead of an angle of a steering wheel. The viewing range may be checked by performing an operation which calculates an angle of a face ($\alpha$ in (b) of FIG. 20) from the facial image of the driver acquired from the camera and then measures a position (a position of pupil) of a pupil ($\beta$ in (c) of FIG. 20) in the eye region image.

In detail, in a case where a gear lever is D gear or N gear when an angle of the steering wheel is within a certain angle, when the viewing of the driver does not enter a driving non-load visual range (a, b) for a certain time, the driver status sensing system 1160 may determine observation negligence, check a corresponding time, and acquire the observation negligence information.

First, in step S2220, the driver status sensing system 1160 may calculate the driving manipulation load and the driving interruption load, based on the driving manipulation information and the careless status information which is acquired in step S2210.

For example, the driver status sensing system 1160 may calculate the driving manipulation load "$W_d$", based on the driving manipulation information. In detail, the driver status sensing system 1160 may acquire the driving manipulation information, read an item-based weight value of the driving manipulation information from the memory, and calculate the driving manipulation load.

Here, the weight value may be a value which is extracted and predetermined for each item of driving manipulation information through various experiments. Alternatively, the weight value may be a value which is arbitrarily predetermined for each item by a worker.

Moreover, the driver status sensing system 1160 may calculate a load for each item, based on an item included in the driving manipulation information and a weight value corresponding to the item. For example, when driving manipulation information of acceleration pedal manipulation, brake pedal manipulation, multi-function switch manipulation, and steering handle manipulation is acquired, the driver status sensing system 1160 may read, from the memory, a weight value "$D_A$" of the acceleration pedal manipulation, a weight value "$D_B$" of the brake pedal manipulation, a weight value "$D_M$" of the multi-function switch manipulation, and a weight value "θ" of the steering handle manipulation. For example, when time information and times information of each item are acquired in units of 50 ms for second of 200 ms, the driving manipulation load "$W_d$" for second of 200 ms may be expressed as Equation (10).

As another example, the driver status sensing system 1160 may calculate the driving interruption load "$W_i$", based on the careless status information. In detail, the driver status sensing system 1160 may calculate loads of the items included in the careless status information and summate the calculated loads of the items to calculate the driving interruption load.

The driver status sensing system 1160 may calculate a peripheral device manipulation load "T(n)", based on the number of manipulations of peripheral devices. For example, the driver status sensing system 1160 may calculate the peripheral device manipulation load in further consideration of a weight value of peripheral device manipulation which is stored in the memory. For example, when the number of inputs of peripheral device manipulation which is made by the driver for second of 20 ms is acquired, the driver status sensing system 1160 may perform an arithmetic operation on the number of inputs of the peripheral device manipulation and a weight value to calculate the peripheral device manipulation load "T(n)".

Furthermore, the driver status sensing system 1160 may calculate a voice load "V(n)", based on voice data of the driver acquired. In detail, the driver status sensing system 1160 may calculate the voice load, based on a pulse threshold value of the voice data stored in the memory. For example, the driver status sensing system 1160 may calculate a time, at which voice data having the pulse threshold value or more is received, in the voice data of the driver which is acquired for a certain time (for example, 200 ms), thereby calculating a voice load "V(t)".

Moreover, the driver status sensing system 1160 may calculate a drowsiness load "P(t)" and a driving observation negligence load "E(t)", based on the eye-closing information and the observation negligence information which are included in the careless status information.

Figure 19:
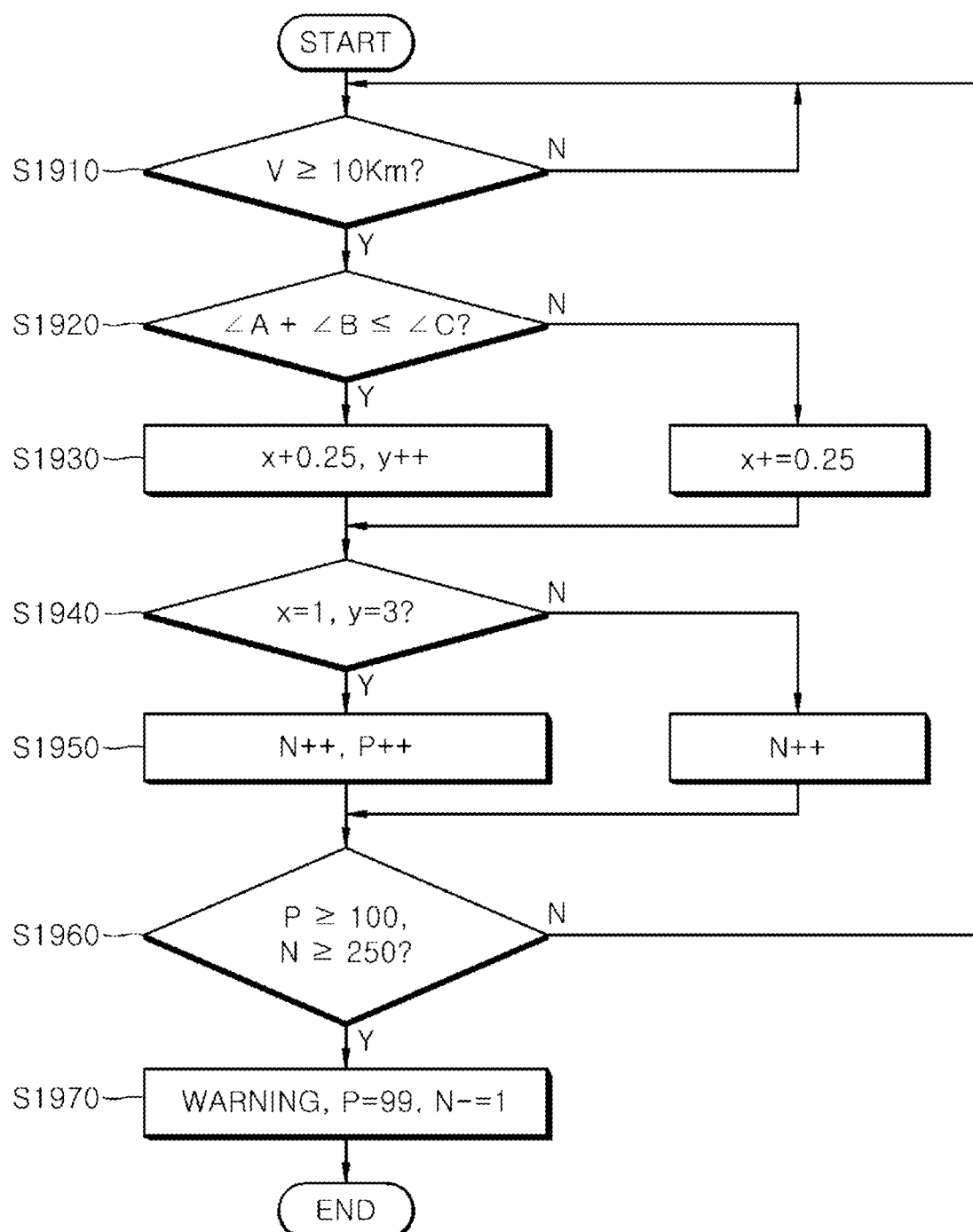
FIG. 19 is a flowchart illustrating an operation of checking the eye closing of a driver, according to an embodiment of the present invention.
Figure 21:
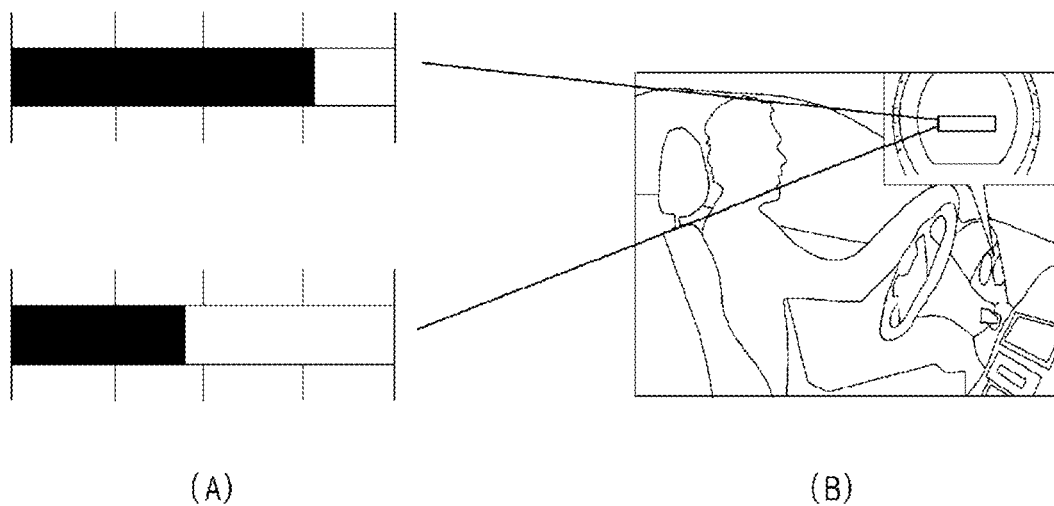
FIG. 21 is a diagram illustrating an output of a screen according to an embodiment of the present invention.

In this case, the driver status sensing system 1160 may perform an operation of checking the eye closing of the driver as in the flowchart of FIG. 19. The driver status sensing system 1160 may check the number "y" of eye closings from an angle of an eyelid per certain time "x" for a certain measurement time "N" to calculate an eye closing time (a drowsing time) of the driver. Furthermore, the driver status sensing system 1160 may convert a value, which is obtained by counting (P) a case where a PERCLOS value is equal to or more than 30% for a certain time, into a load factor to calculate a drowsiness load "P(t)".

Moreover, the driver status sensing system 1160 may calculate the observation negligence load "E(t)", based on the observation negligence information included in the careless status information. As illustrated in FIG. 20, when the viewing range deviates from the driving non-load visual distance "η", a factor value of the load factor "P" may be changed according to a deviating range. In FIG. 20, when a deviating range (a', b') is predetermined, the driver status sensing system 1160 may read a factor value of a load factor from the memory for each range corresponding to a current viewing range of the driver, thereby calculating the observation negligence load "E(t)".

The driver status sensing system 1160 may perform an arithmetic operation on the calculated peripheral device manipulation load "T(n)", voice load "V(t)", drowsiness load "P(t)", and observation negligence load "E(t)" to calculate the driving interruption load "$W_i$".

In step S2230, the driver status sensing system 1160 may compare a predetermined spare load "$W_1$" with a difference between the driving load "$W_d$" and the driving interruption load "$W_i$".

In detail, when a value of the driving interruption load "$W_i$" subtracted from the driving load "$W_d$" is equal to or less than a predetermined spare load "$W_1$", the driver status sensing system 1160 may determine that the driver is not in a safety driving status. Here, the predetermined spare load "$W_1$" may be a value which is extracted from a driving load and driving information (including a change gear status, vehicle acceleration, steering, and/or the like) through an experiment based on a condition of an experimented driver and is stored in the memory, and may be varied ($W_d \propto W_1$) depending on a driving condition. In this case, the driver status sensing system 1160 may calculate a result value "C" which is obtained by dividing the difference between the driving load "$W_d$" and the driving interruption load "$W_i$" by the predetermined spare load "$W_1$".

For example, a case where it is difficult to drive the vehicle may be set to a threshold percentage value, and when the result value "C" which is calculated in step S2230 is equal to or greater than the threshold percentage value, the driver status sensing system 1160 may issue a warning to the driver in step S2240.

The case where it is difficult to drive the vehicle is set to 75%, and when the result value "C" is 75% or more, the driver status sensing system 1160 may display a rod graph, which shows a current load, in red. Also, by allowing the rod graph to flicker, the driver status sensing system 1160 may remind the driver of a driving danger of the vehicle. In this case, the driver status sensing system 1160 may output a warning sound to issue a warning to the driver.

For example, when the result value "C" which is calculated in step S2230 is less than 75%, the driver status sensing system 1160 may display the rod graph, which shows the current load, in green and thus may inform the driver of a safe status in step S2250.

As described above, the present invention may compare a driving load, which occurs in driving a vehicle, with a driving interruption load which interrupts the driving of the vehicle like a peripheral device, drowsiness of a driver, and/or the like, and thus check a safety driving status of the driver. The present invention may issue a warning to the driver when a load of interrupting the driving of the vehicle is high, and depending on the case, the present invention may forcibly stop an operation of an element (for example, a peripheral device), which is not essential for the driving of the vehicle, to decrease a driving interruption load which interrupts the driving of the vehicle, thereby enabling the driver to safely drive the vehicle.

Moreover, when a driving habit indicates a case where a vehicle is driven by a plurality of different drivers, learning is performed without considering that the different drivers have different driving pattern learnings and driving situations, thereby removing a driver habit recognition defect.

Moreover, the present invention solves a problem where lanes are not recognized in lateral control when backlight occurs and a vehicle enters a tunnel, thereby enlarging a lateral controller available range.

Moreover, the present invention may be applied to a self-driving vehicle controller which will be developed later.

Figure 23:
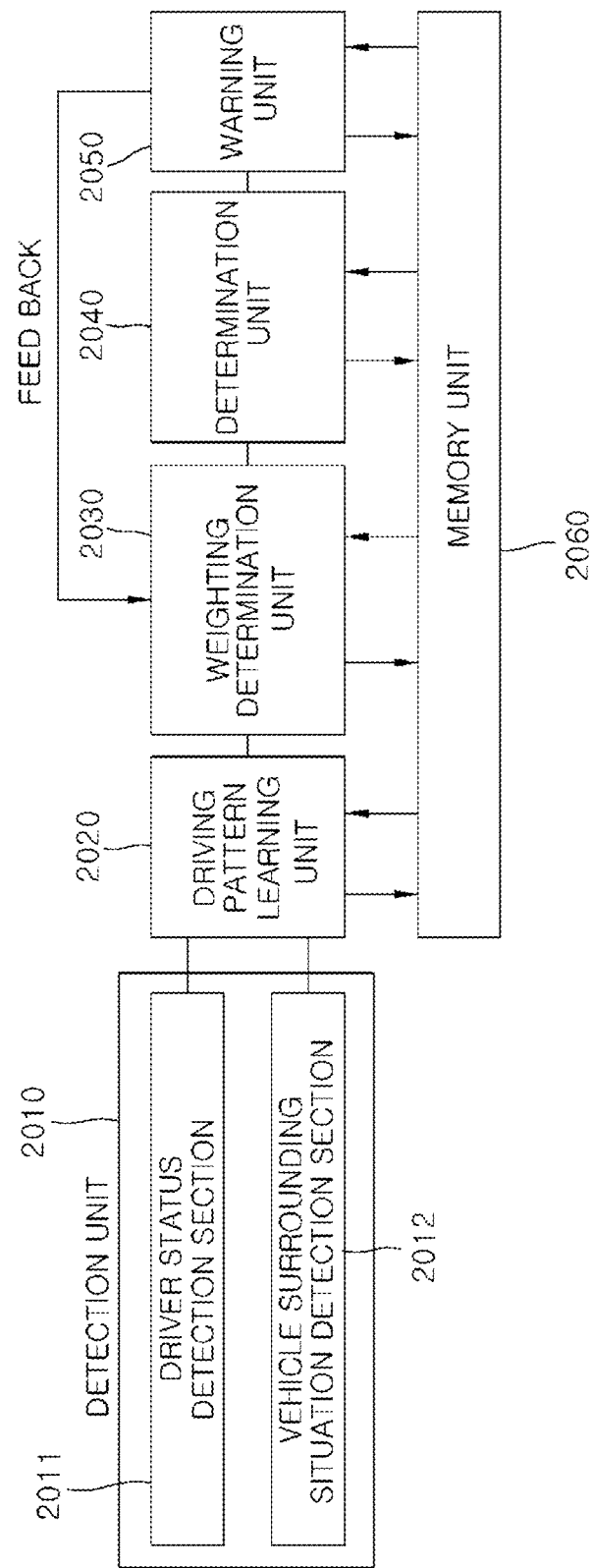
FIG. 23 is a block diagram schematically illustrating a situation detection apparatus according to an embodiment of the present invention.
Figure 24:
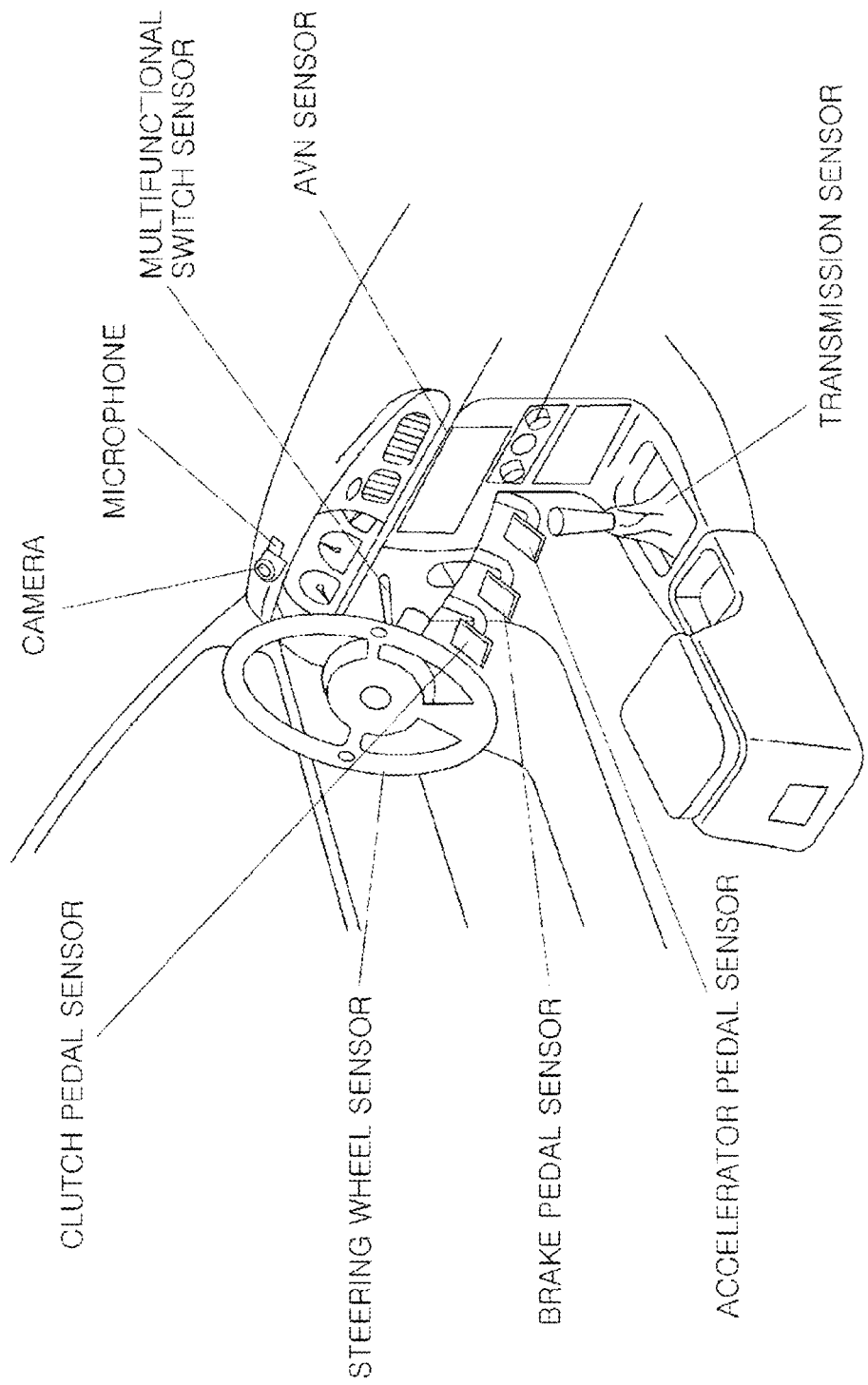
FIG. 24 is an illustrative view of a driver status detection section.
Figure 25:
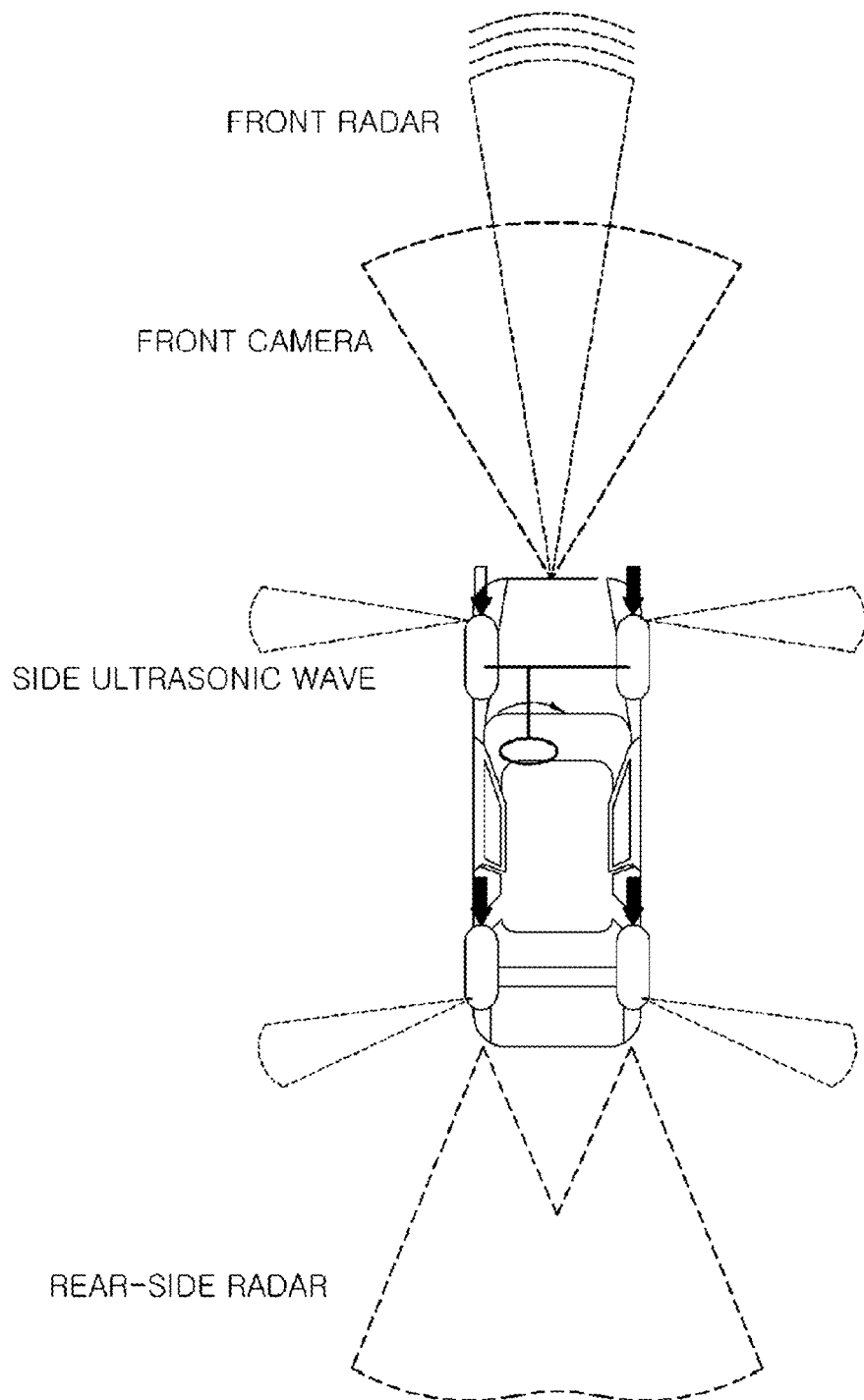
FIG. 25 is an illustrative view of a vehicle surrounding situation detection section.
Figure 26:
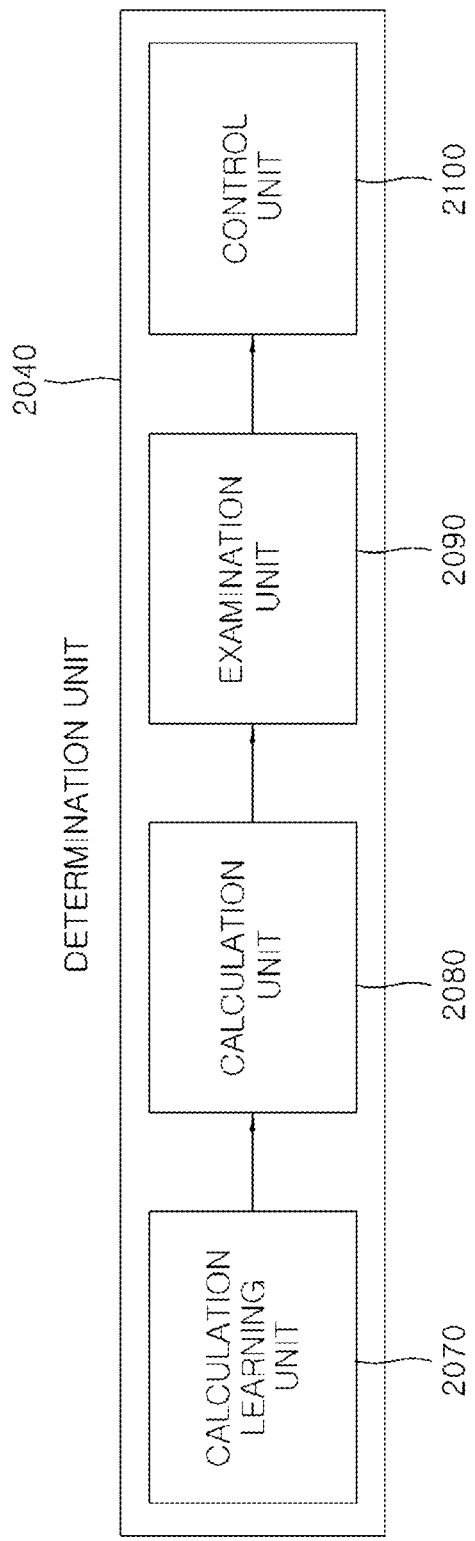
FIG. 26 is a block diagram illustrating a determination unit.
Figure 27:
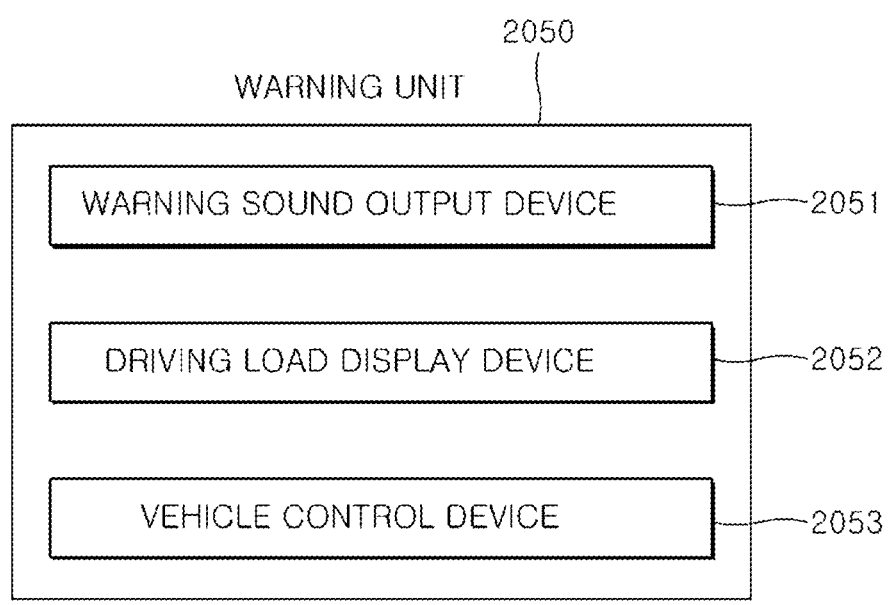
FIG. 27 is a block diagram illustrating a warning unit.

FIG. 23 is a block diagram schematically illustrating a situation detection apparatus according to an embodiment of the present invention. FIG. 24 is an illustrative view of a driver status detection section of FIG. 23. FIG. 25 is an illustrative view of a vehicle surrounding situation detection section of FIG. 23. FIG. 26 is a block diagram illustrating a determination unit of FIG. 23. FIG. 27 is a block diagram illustrating a warning unit of FIG. 23. Referring to FIGS. 23 to 27, the situation detection apparatus according to the embodiment of the present invention includes a detection unit 2010, a driving pattern learning unit 2020, a weighting determination unit 2030, a determination unit 2040, a warning unit 2050, and a memory unit 2060. The detection unit 2010, the driving pattern learning unit 2020, the weighting determination unit 2030, the determination unit 2040, the warning unit 2050, and the memory unit 2060 may also be interconnected in a wireless manner using Bluetooth, ZigBee, WiFi, etc. or in a wired manner using RS-232, RS-485, CAN, etc.

A driver status detection section 2011 is a component to acquire vehicle driving information, vehicle operation information, and driver status information. The vehicle driving information means, for example, information such as how often a driver steps on an accelerator pedal, how often a driver steps on a brake pedal, how often a driver operates a steering wheel, and how often a driver operates a multifunctional switch. In addition, in a manual transmission vehicle, the driving information may include information such as how often a driver steps on a clutch pedal and how often a driver operates a transmission, besides the above information. The multifunctional switch means a switch of a wiper, a turn signal indicator, a lighting lamp, or the like. Since the multifunctional switch is a factor necessary to vehicle driving, operation information of the multifunctional switch may be included in the vehicle driving information. The vehicle operation information may include, for example, information such as how often a driver operates an AVN (Audio Video Navigation) and how often a driver operates an air conditioning device. The driver status information may include, for example, information such as how long a driver makes conversation (including a telephone conversation), whether or not a driver drowses, whether or not a driver keeps eyes forward, and whether or not abnormality is generated in a driver's electrocardiogram or brainwave. The detection unit 2010 is a component to identify a driver and acquire driver status data, vehicle driving information data and vehicle surrounding obstacle data. The detection unit 2010 includes a driver status detection section 2011 and a vehicle surrounding situation detection section 2012.

The driver status detection section 2011 may include one or more of an infrared LED imaging device, a steering wheel speed detection sensor, a steering wheel angle detection sensor, a suspension movement detection sensor, a pedal operation detection sensor, a multifunctional switch operation detection sensor, a voice recognition sensor, an AVN operation detection sensor, an air conditioning device operation detection sensor, a gearbox sensor, a console box operation detection sensor, and a glove box operation detection sensor. The driver status detection section 2011 also acquires information about driver operation and behavior, which are not directly related to driving, so as to provide reasons for situation determination. The driver status detection section 2011 acquires image data of pupils and faces through the infrared LED imaging device. Thus, the current driver is identified. The driver status detection section 2011 acquires eyelid detection data to determine whether or not a driver drowses and pupil direction data to determine whether or not a driver keeps eyes forward through the infrared LED imaging device. In addition, the driver status detection section 2011 acquires data generated by operations of an accelerator pedal, a brake pedal, a steering wheel, a multifunctional switch, etc. The driver status detection section 2011 acquires data about how long a driver makes conversation (including a telephone conversation) by recognizing a voice of the driver. The driver status detection section 2011 acquires data about how often a driver operates peripheral devices such as an AVN, an air conditioning device, a gearbox, a console box, and a glove box.

The vehicle surrounding situation detection section 2012 is a component to acquire self-vehicle driving information and surrounding vehicle driving information. The self-vehicle driving information means, for example, information such as a self-vehicle speed, a yaw rate, a steering angle, an acceleration, a steering wheel angle change amount, and an angular speed in a self-vehicle. The surrounding vehicle driving information means, for example, information such as a surrounding vehicle speed, a yaw rate, a steering angle, an acceleration, a steering wheel angle change amount, and an angular speed in a surrounding vehicle. To this end, the vehicle surrounding situation detection section 2012 may include one or more of a self-vehicle speed sensor, a yaw rate sensor, a steering angle sensor, an acceleration sensor, a steering wheel sensor, front/rear radars, front/rear cameras, side ultrasonic devices, an AVM (Around View Monitoring System) camera, an SCC (Smart Cruise Control), an LKAS (Lane Keeping Assistant System), an SPAS (Smart Parking Assistant System), and an AVM (Around View Monitoring). The vehicle surrounding situation detection section 2012 collects the self-vehicle driving information and the surrounding vehicle driving information such as surrounding obstacles and surrounding environments, thereby enhancing reliability when a degree of risk is determined during driver's driving.

The driving pattern learning unit 2020 learns a driver's driving pattern (updates data) and stores learned data in the memory unit 2060, based on the data acquired by the detection unit 2010.

In a case of a new driver, the driving pattern learning unit 2020 calls a pre-stored default driving pattern to execute situation detection and newly allocates memory to begin learning. The pre-stored default driving pattern may be an average driving pattern of a plurality of drivers defined by experiment. Thus, it may be possible to induce the new driver to drive the vehicle with safety corresponding to the driving of the new driver, unlike the related art. The driving pattern learning unit 2020 learns and stores a driving pattern within a preset learning range. A possibility of unnecessary warning is increased when a driving pattern such as rapid acceleration, rapid brake, or rapid rotation according to unexpected situations during driving is learned under the same condition. Accordingly, in order to remove such noise, a driving pattern, which is a subject to be learned, is restricted to the driving pattern within a preset learning range. The preset range may be determined by experiment according to conditions of test subjects.

The weighting determination unit 2030 determines a weighting assigned to the information data acquired by the detection unit 2010, based on the driving pattern learned by the driving pattern learning unit 2020. This is to induce safe driving by providing a situation detection and warning system specified for each driver according to the learned driving pattern. For example, when a driver A frequently operates the accelerator pedal, the brake pedal, the multi-functional switch, or the like, a weighting of operation information data of such a device is set high, and when a driver B frequently operates the AVN switch, the air conditioning device, or the like, a weighting of operation information data of such devices is set high. The weighting may be determined by experiment according to conditions of test subjects. Thus, a weighting is also determined about the new driver and thus the situation detection of the vehicle may be performed. The determined weighting is changed as in the following equation, by comparing acquired information data and a calculated integrated risk index with an information data reference value and an integrated risk index reference value, by feedback from the warning unit 2050. Thus, it may be possible to induce safe driving by providing the situation detection and warning system specified for each driver according to the driver's driving pattern.

$$\alpha(n+1)=\alpha(n), \text{ if } W<d_W \text{ and } R\geq d_R$$

$$\alpha(n+1)=\alpha(n)+\delta, \text{ if } W\geq d_W$$

$$\alpha(n+1)=\alpha(n)-\delta, \text{ if } W<d_W \text{ and } R<d_R,$$

where R=integrated risk index,
α=weighting,
α(n+1)=weighting changed by feedback,
α(n)=weighting before change,
W=acquired information data,
$d_R$=integrated risk index reference value,
$d_W$=information data reference value, and
δ=α(n)/R.

In the above equation, $d_W$ refers to an information data reference value and $d_R$ refers to an integrated risk index reference value. The weighting determination unit 2030 compares current R and W values with respective reference values and changes the weighting as in FIG. 30 and the above equation. In addition, α(n+1) refers to a weighting changed by feedback and α(n) refers to a weighting before change. In addition, δ refers to a rate occupied by a weighting before change of each information data in the integrated risk index and the weighting of each information data may be increased or decreased by a δ value.

The determination unit 2040 is a component which determines a safe driving state of a driver, based on the data to which the weighting determined by the weighting determination unit 2030 is assigned. The determination unit 2040 includes a calculation learning unit 2070, a calculation unit 2080, an examination unit 2090, and a control unit 2100.

The calculation learning unit 2070 arranges data, to which the weighting determined by the weighting determination unit 2030 is assigned, in the order of data causing the integrated risk index to exceed a preset reference risk index and selects only a plurality of high data. The situation detection apparatus of the present invention collects a great deal of data from a plurality of sensors inside/outside the vehicle to accurately detect situations. However, when a considerable time is required in processing a great deal of data, it is deviated from the purpose of the present invention for preventing accidents and inducing safe driving. Accordingly, there is a need to select some data from a great deal of data and perform rapid calculation during driving required for instantaneous determination. Thus, learning for rapid calculation and data selection are performed in the calculation learning unit 2070. A selection function of the calculation learning unit 2070 is initially inactivated and the calculation learning unit 2070 stores results arising from the control unit 2100. Subsequently, when data equal to or more than a certain number of times are stored, the calculation learning unit 2070 arranges the data in the order of data mainly causing the integrated risk index calculated by the calculation unit 2080 to exceed a preset reference risk index and selects only a plurality of high data. Here, the selected data is used for calculation and the remaining data is ignored such that calculation speed is increased.

For example, when risk warnings equal to or more than 5000 times are generated and risk index data equal to or more than 5000 times are stored, data causing the calculated integrated risk index to exceed a preset reference risk index is selected. That is, the highest three data may be selected from data to which the weighting is reflected by analysis of causes such as the number of times of operation of the brake pedal, a steering wheel angle change amount, a forward observation neglect of a driver, and a trajectory of a surrounding vehicle.

Subsequently, calculation speed may be increased in such a manner that only the selected data is reflected to calculate the integrated risk index and the remaining data is not reflected to calculate the integrated risk index. The data selected by the calculation learning unit 2070 is transferred to the calculation unit 2080.

The calculation unit 2080 calculates some data selected by the calculation learning unit 2070 among data, to which the weighting determined by the weighting determination unit 2030 is assigned, according to a preset calculation equation and calculates an integrated risk index. For example, a driver's integrated risk index may be calculated by adding up respective risk indexes which multiply data selected by the calculation learning unit 2070 by a weighting for each data assigned by the weighting determination unit, as in the following equation.

$$R=\alpha_A\times W_A+\alpha_B\times W_B+\alpha_C\times W_C,$$

where R=integrated risk index,
α=weighting for each selected information data,
W=selected information data.

The examination unit 2090 determines whether a result calculated by the calculation unit 2080 is valid. When the calculation learning unit 2070 selects some data for rapid calculation and calculation is performed based on the same, there is a possibility of error occurring in the calculated result. Since the object of the present invention is to induce safe driving, an examination process for error removal is required for driver's safe driving. The examination unit 2090 compares a risk index calculated by a pre-stored driving pattern of a current driver (hereinafter, referred to as "examination risk index) with an integrated risk index calculated by a driving pattern learning a current driving pattern of the current driver and determines that a calculated risk index value is valid when a difference between the examination risk index and the calculated integrated risk index is within a preset error range. In addition, the integrated risk index is transferred to the control unit 2100. The preset error range may be an experimental value according to conditions of test subjects. In addition, the examination risk index may be previously calculated before current driving of the driver and stored in the memory unit 2060.

The control unit 2100 compares the integrated risk index transferred from the examination unit 2090 with a preset reference risk index and serves to activate the warning unit 2050 according to the compared result.

The warning unit 2050 is a component which warns a driver that the driving state of the driver is not in a safe driving state to induce the safe driving by the determination unit 2040, and includes a warning sound output device 2051, a driving load display device 2052, and a vehicle control device 2053. When the driving state of the driver is determined to be not in the safe driving state by the determination unit 2040, the warning sound output device 2051 may generate a warning sound to the driver or play an announcement for notifying that the driver is not in the safe driving state. The warning sound output device 2051 may also utilize a speaker installed to the vehicle. The driving load display device 2052 may also display a driving load through an instrument panel, an AVN, or an HUD (Head Up Display) in the vehicle. The vehicle control device 2053 is a device to safely stop the vehicle when the driver is determined to be not in the safe driving state, and may be a device for controlling a steering wheel, a transmission, and a brake which are installed to the vehicle. The memory unit 2060 may store and call information such as driver information, driver's driving pattern information, a preset weighting, a preset error range, a pre-stored examination risk index, and a preset reference risk index. The memory unit 2060 may be a nonvolatile memory as a storage means for storing data. For example, the driver information of a driver A, a driver B, a driver C, . . . , etc. is stored in the memory unit 2060 and the driving pattern information corresponding to each driver is stored in the form of "driver A—driving pattern A", "driver B—driving pattern B" "driver C—driving pattern C", "driver A—driving pattern A", . . . , etc. in the memory unit 2060. In this case, the data acquired by the detection unit 2010, such as the number of times of operation of the accelerator pedal for unit time and the number of times of operation of the brake pedal for unit time, are included in each driving pattern.

Figure 28:
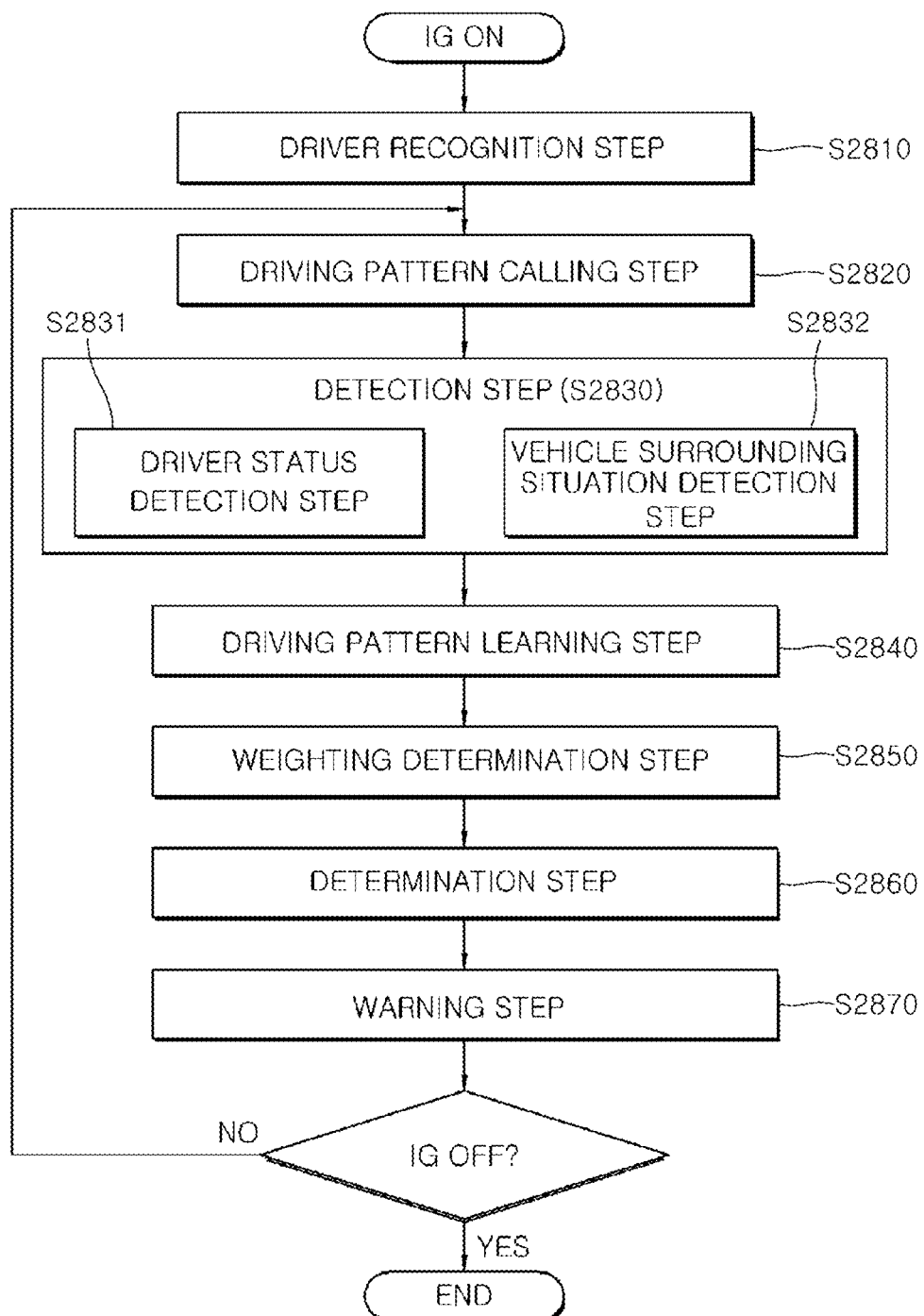
FIG. 28 is a flowchart schematically illustrating a situation detection method according to another embodiment of the present invention.
Figure 29:
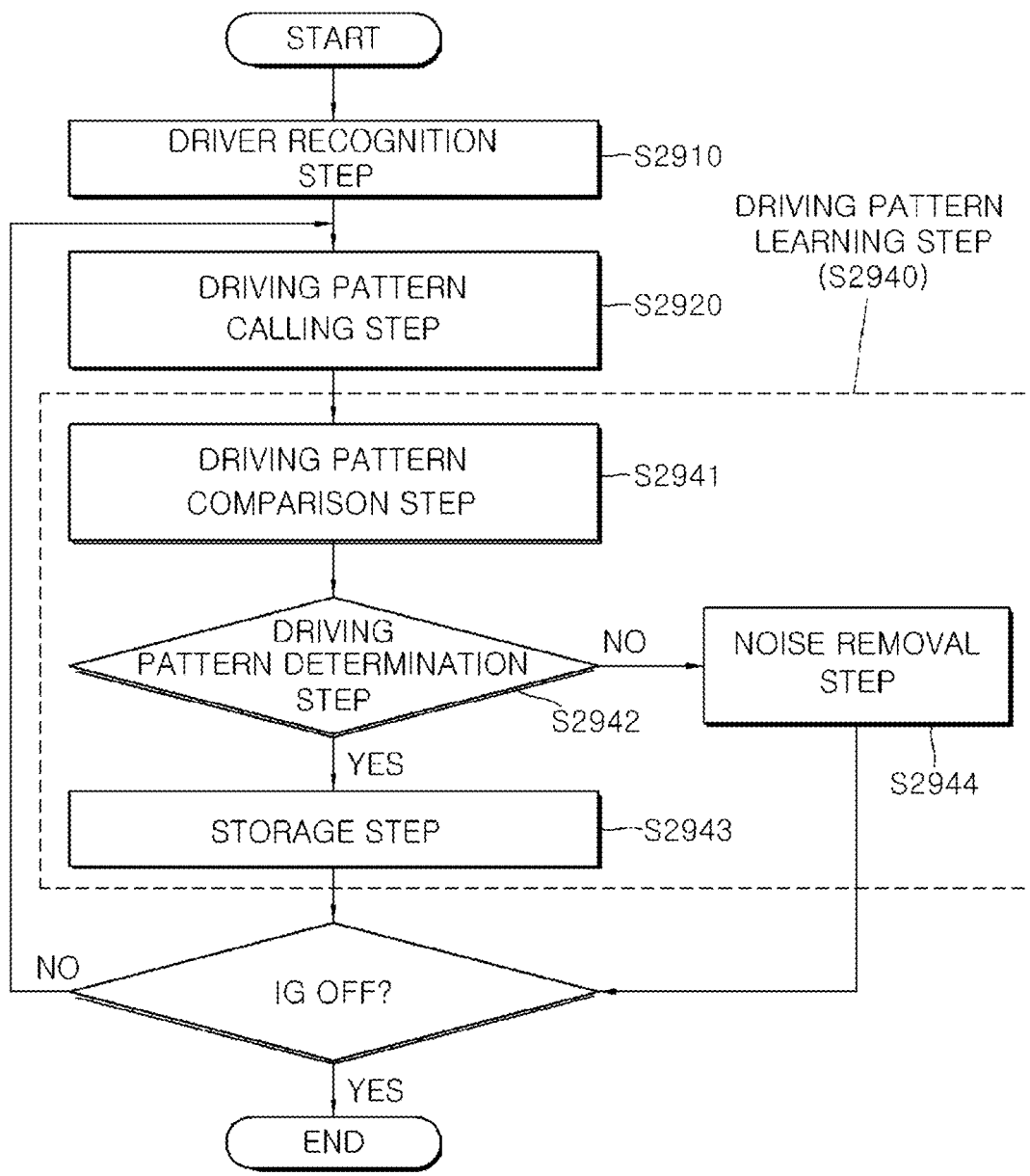
FIG. 29 is a flowchart illustrating a driving pattern learning step.
Figure 30:
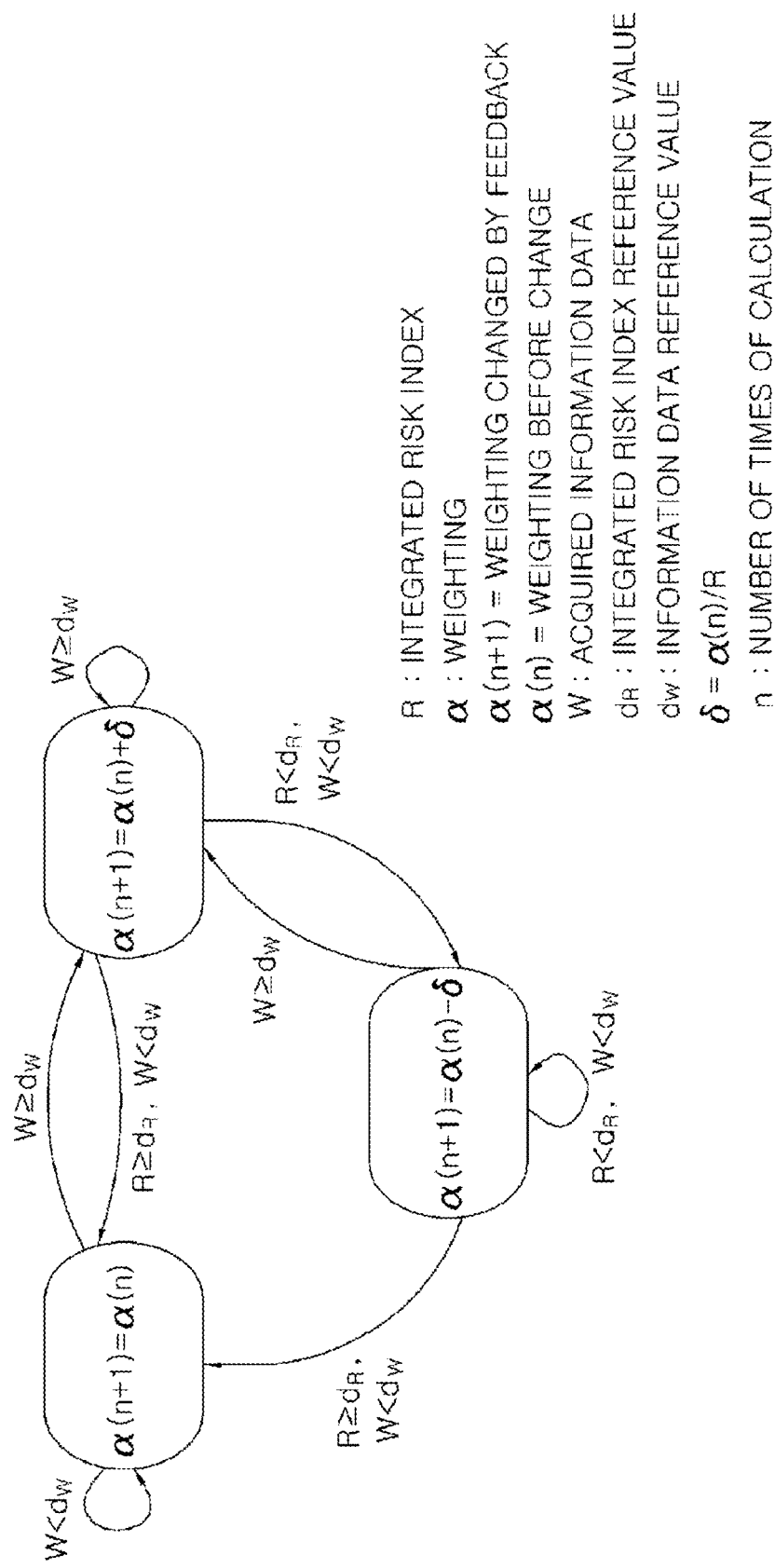
FIG. 30 is a view illustrating a state in a weighting determination step.
Figure 31:
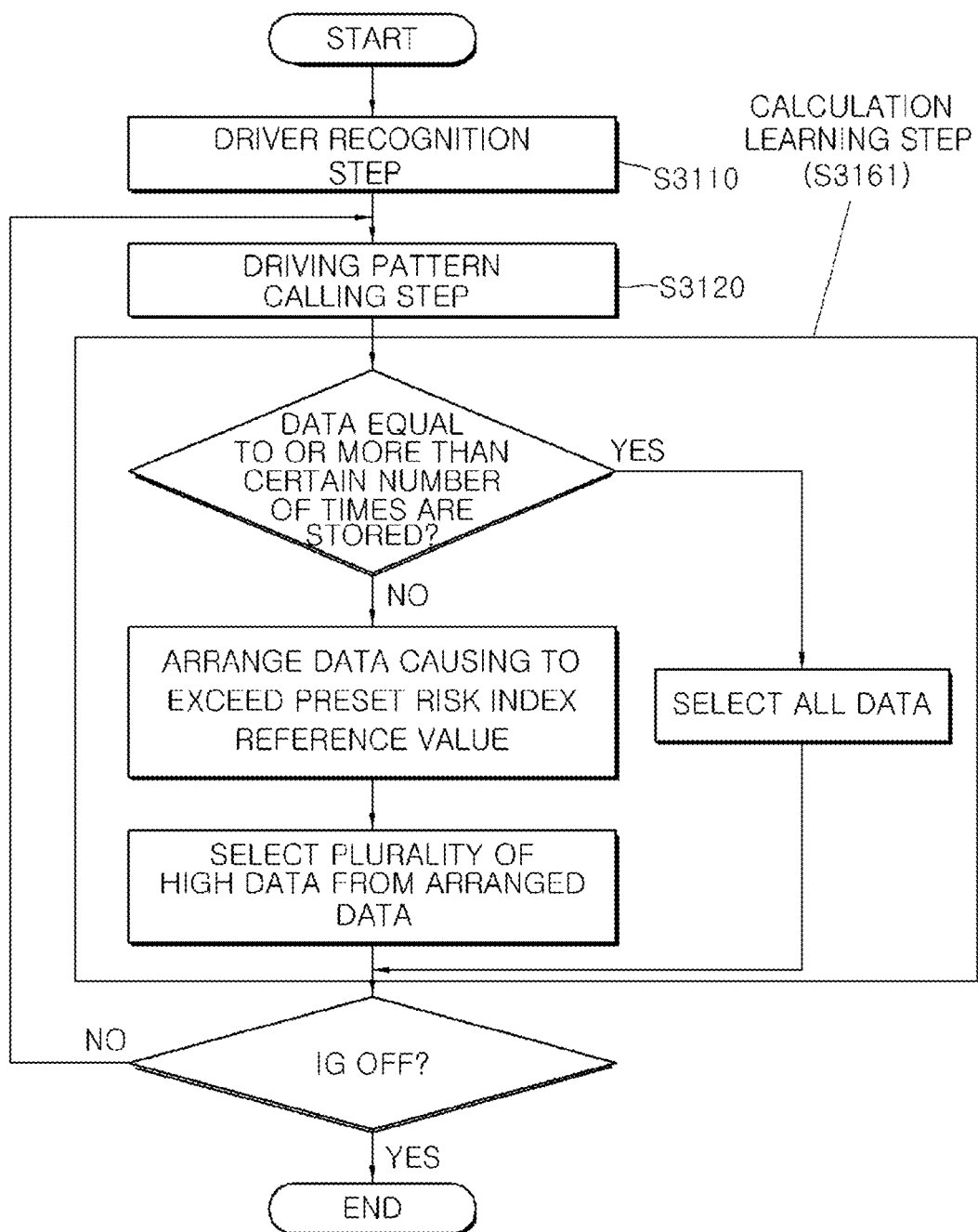
FIG. 31 is a flowchart illustrating a calculation learning step.
Figure 32:
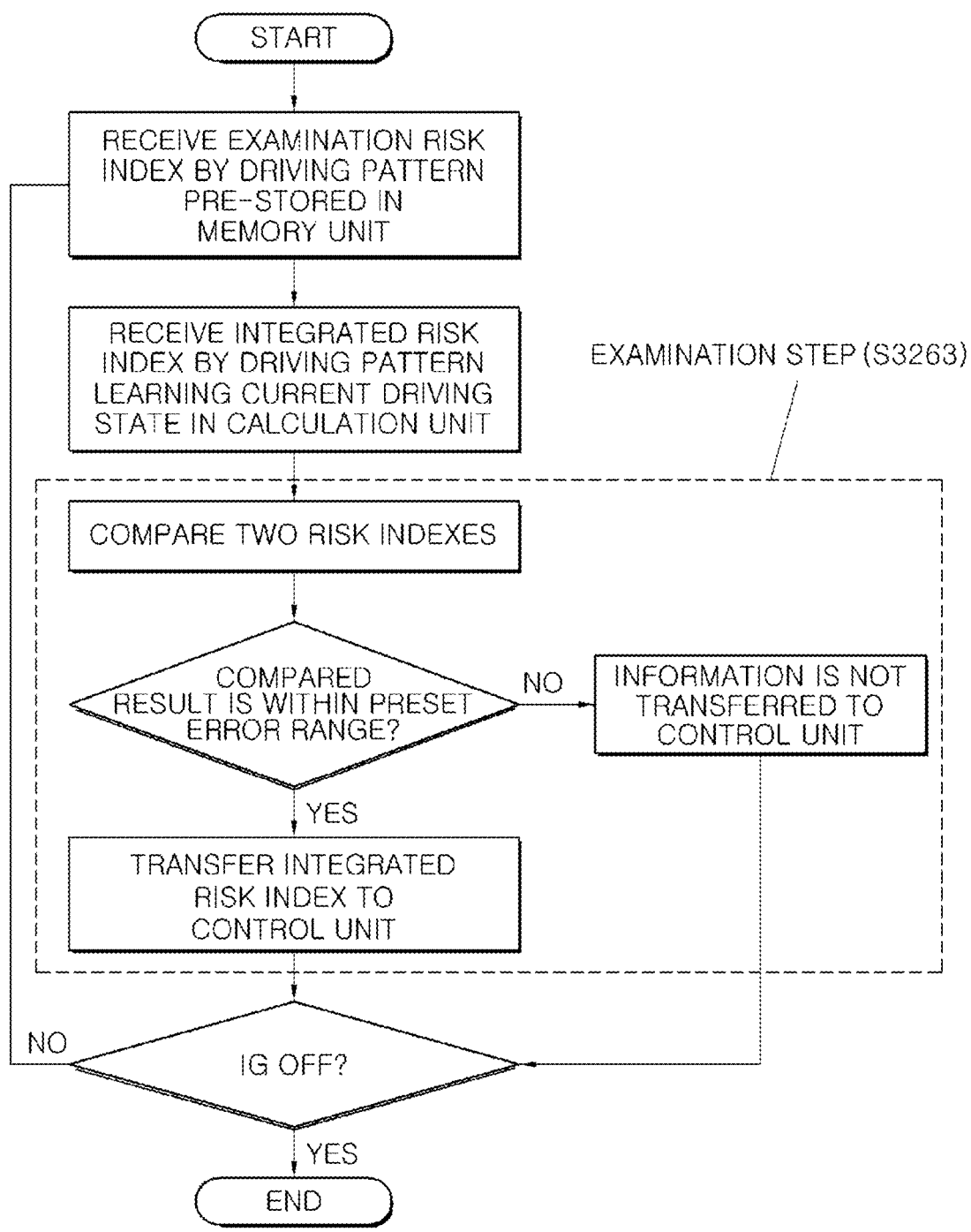
FIG. 32 is a flowchart illustrating an examination step.
Figure 33:
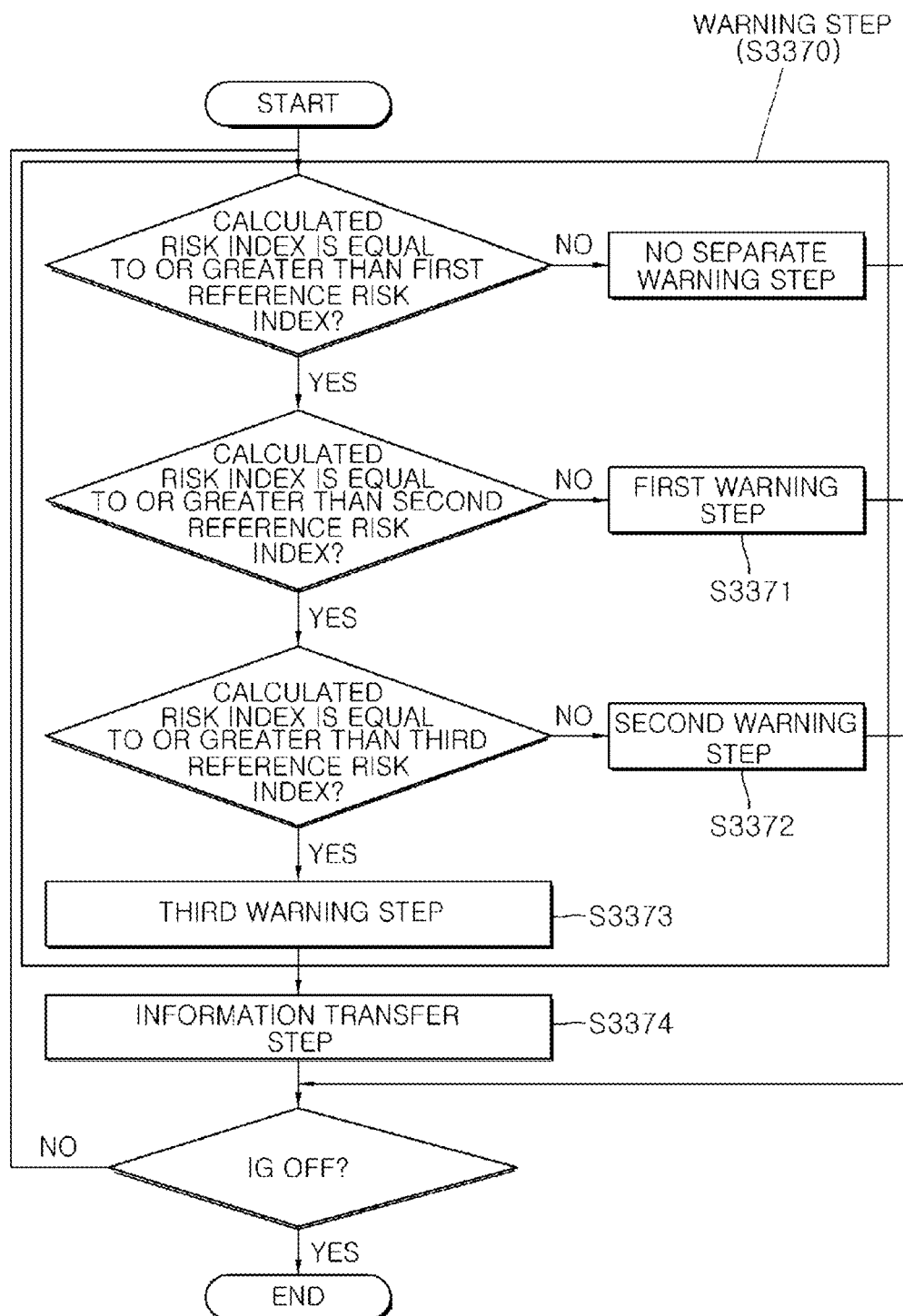
FIG. 33 is a flowchart illustrating a warning step.
Figure 34:
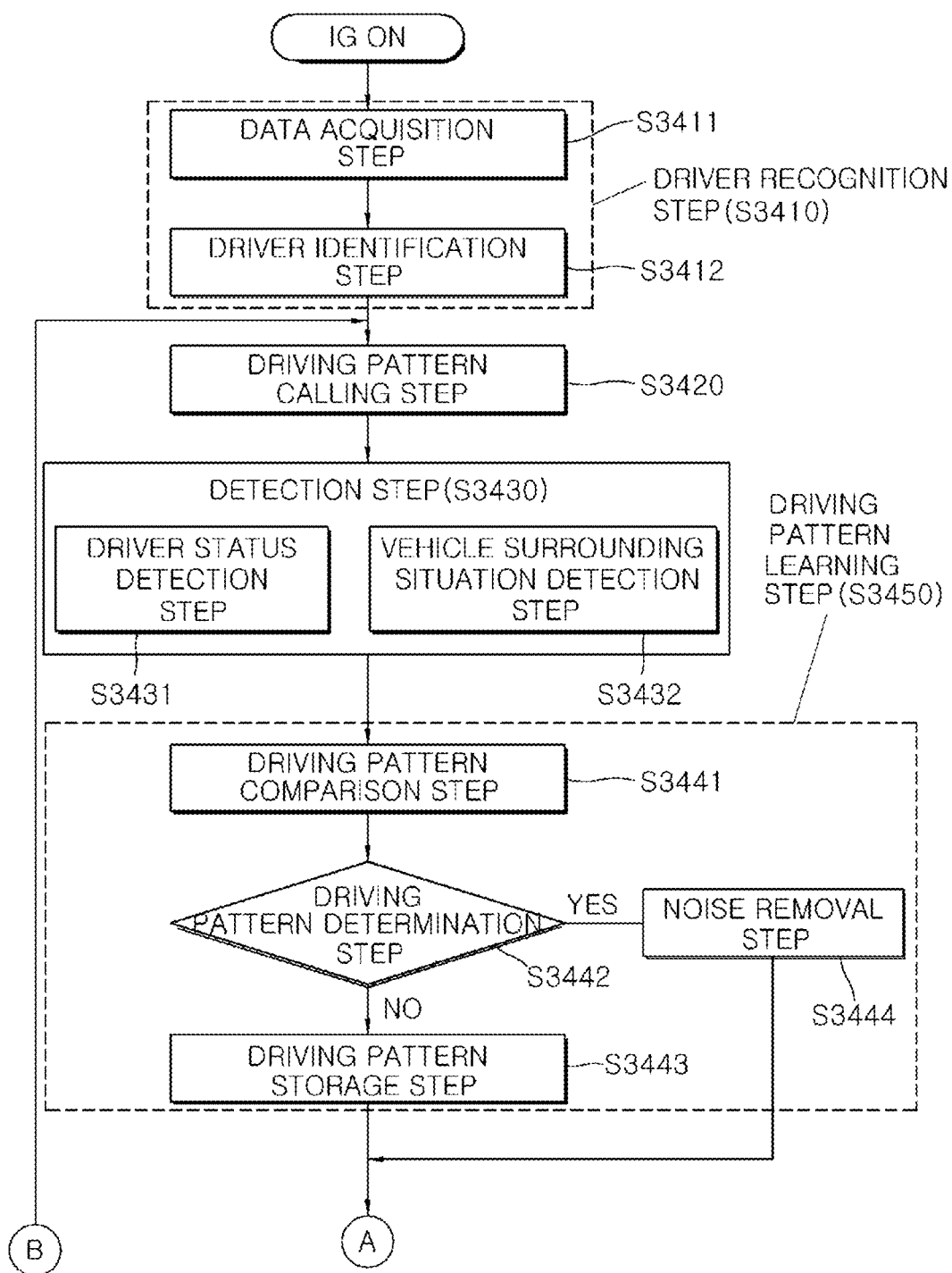
FIGS. 34 to 36 are detailed flowcharts illustrating the situation detection method.
Figure 35:
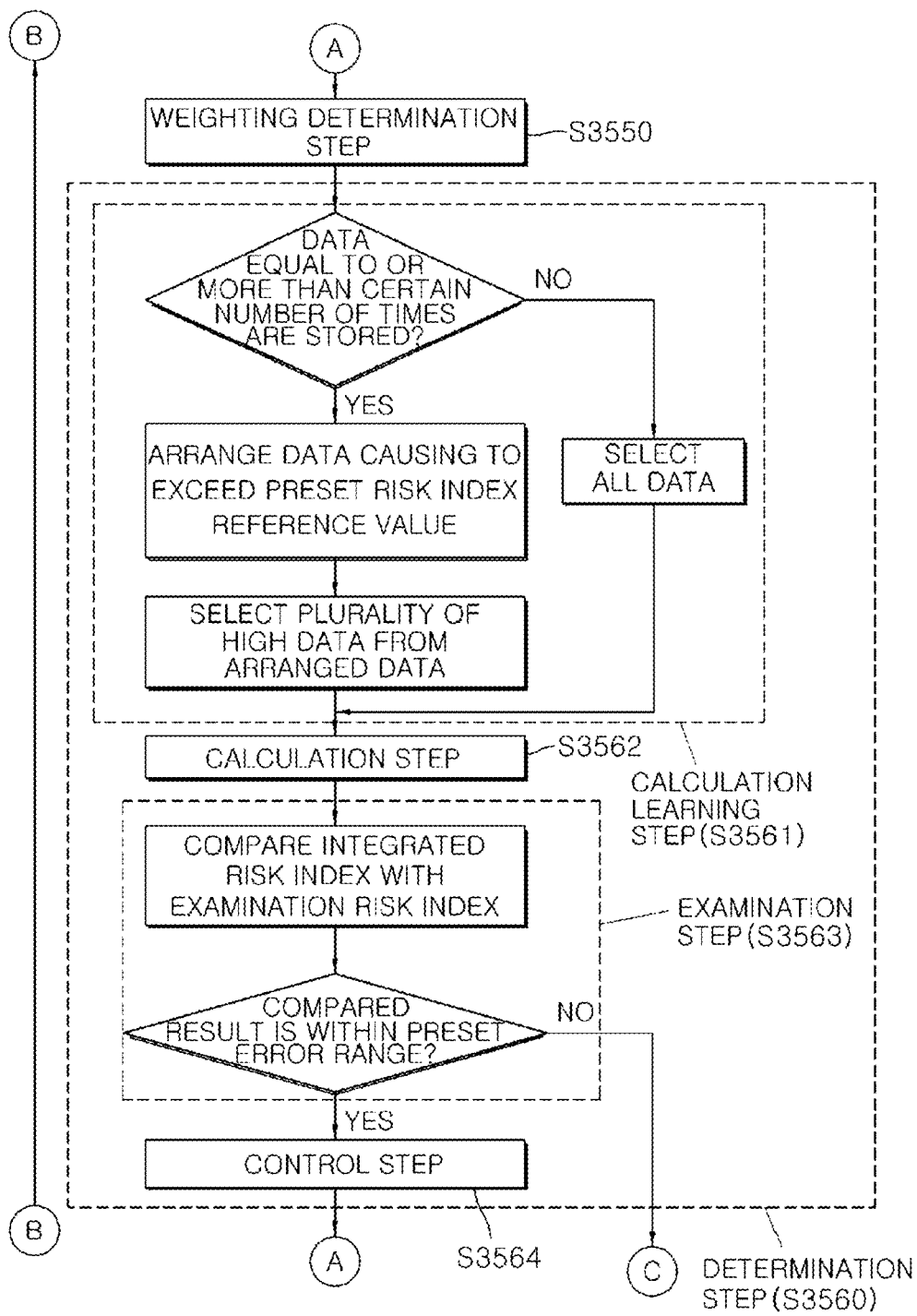
Figure 36:
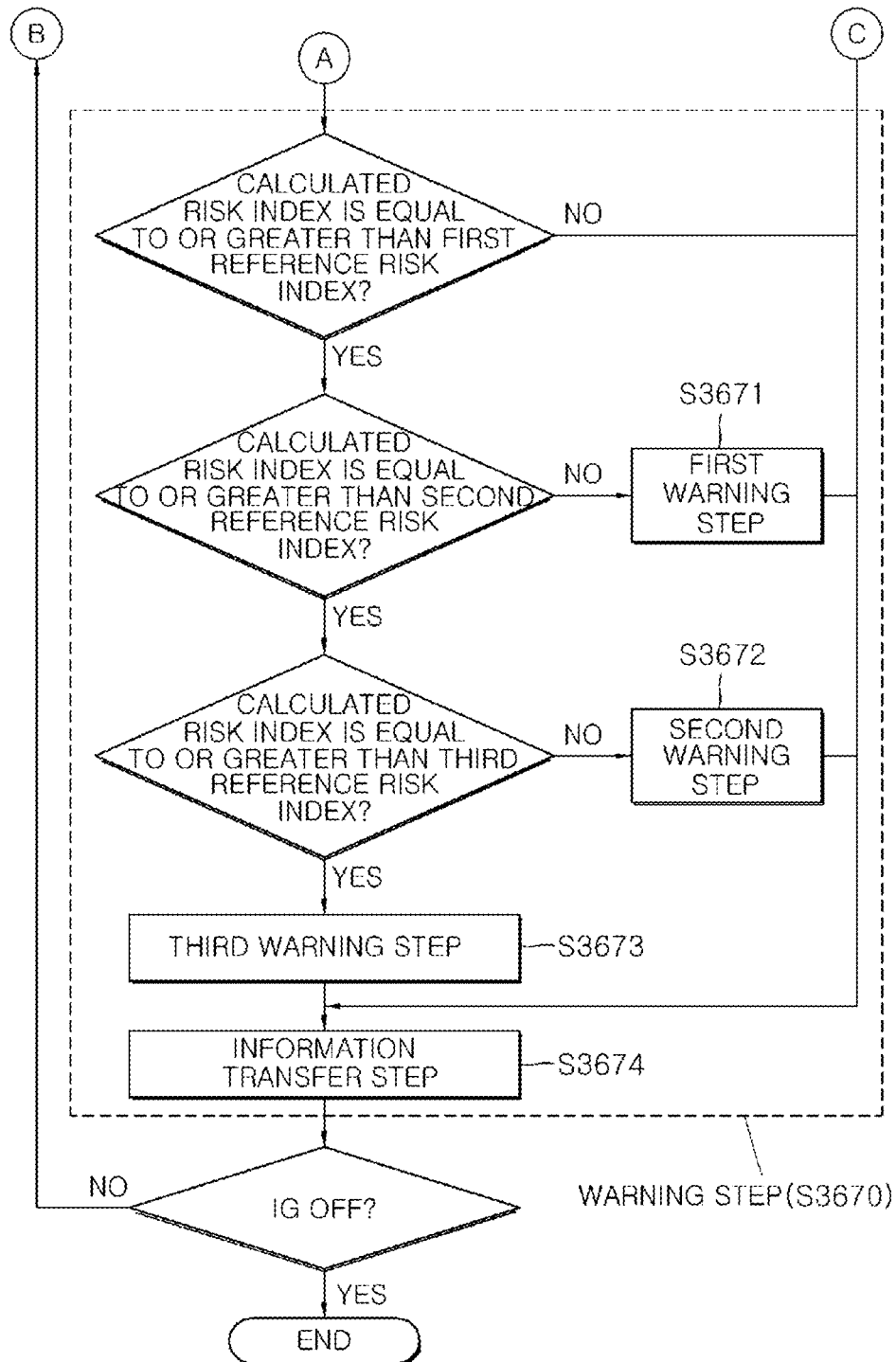

FIG. 28 is a flowchart schematically illustrating a situation detection method according to another embodiment of the present invention. FIG. 29 is a flowchart illustrating a driving pattern learning step. FIG. 30 is a view illustrating a state in a weighting determination step. FIG. 31 is a flowchart illustrating a calculation learning step. FIG. 32 is a flowchart illustrating an examination step. FIG. 33 is a flowchart illustrating a warning step. FIGS. 34 to 36 are detailed flowcharts illustrating the situation detection method. Referring to FIGS. 28 to 36, the situation detection method according to another embodiment of the present invention includes a driver recognition step S2810, S2910, S3110, S3410, a driving pattern calling step S2820, S2920, S3120, S3420, a detection step S2830, S3430, a driving pattern learning step S2840, S2940, S3450, a weighting determination step S2850, S3550, a determination step S2860, S3560, and a warning step S2870, S3370, S3670.

The driver recognition step S2810 is a step of calling pre-stored driver information to compare whether the driver information coincides with a current driver, and includes a driver data acquisition step S3411 and a driver identification step S3412. The driver data acquisition step S3411 is a step of acquiring image data of pupils or faces through an imaging device and the driver identification step S3412 is a step of comparing the image data of pupils or faces acquired by the driver data acquisition step S3411 with the driver information pre-stored in a memory unit 2060 to identify a driver.

The driving pattern calling step S2820 is a step of calling a pre-stored driving pattern of the driver identified by the driver identification step S2810 from the memory unit 2060. If the driver coinciding with the pre-stored driver information is not present because of a new driver, a pre-stored default driving pattern is called. The pre-stored default driving pattern may be an average driving pattern of a plurality of drivers defined by experiment. Thus, it may be possible to induce the new driver to drive a vehicle with safety corresponding to the driving of the new driver even in a case of the new driver, unlike the related art.

The detection step S2830 is a step of collecting driver status information and vehicle driving information or vehicle surrounding obstacle information, and includes a driver status detection step S2831 and a vehicle surrounding situation detection step S2832.

The driver status detection step S2831 is a step of collecting driver status information and acquires vehicle driving information, vehicle operation information, and driver status information. The vehicle driving information means, for example, information such as how often a driver steps on an accelerator pedal, how often a driver steps on a brake pedal, how often a driver operates a steering wheel, and how often a driver operates a multifunctional switch. In addition, in a manual transmission vehicle, the driving information may include information such as how often a driver steps on a clutch pedal and how often a driver operates a transmission, besides the above information. The multifunctional switch means a switch of a wiper, a turn signal indicator, a lighting lamp, or the like. Since the multifunctional switch is a factor necessary to vehicle driving, operation information of the multifunctional switch may be included in the vehicle driving information.

The vehicle operation information may include, for example, information such as how often a driver operates an AVN (Audio Video Navigation), how often a driver operates an air conditioning device, and how often a driver operates peripheral devices such as a gearbox, a console box, and a glove box. The driver status information may include, for example, information such as how long a driver makes conversation (including a telephone conversation), whether or not a driver drowses, whether or not a driver keeps eyes forward, and whether or not abnormality is generated in a driver's electrocardiogram or brainwave.

To this end, the driver status detection step S2831 may detect one or more of a driver eyelid, a driver pupils, a steering wheel speed, a steering wheel angle, a suspension movement, whether or not an accelerator pedal is operated, whether or not a brake pedal is operated, whether or not a multifunctional switch is operated, whether or not a driver makes conversation, whether or not an AVN is operated, whether or not an air conditioning device is operated, whether or not a gearbox is operated, whether or not a console box is operated, and whether or not a glove box is operated.

The vehicle surrounding situation detection step S2832 acquires self-vehicle driving information, surrounding vehicle driving information, vehicle surrounding obstacle information, etc. The self-vehicle driving information means, for example, information such as a self-vehicle speed, a yaw rate, a steering angle, an acceleration, a steering wheel angle change amount, and an angular speed in a self-vehicle. The surrounding vehicle driving information means, for example, information such as a surrounding vehicle speed, a yaw rate, a steering angle, an acceleration, a steering wheel angle change amount, and an angular speed in a surrounding vehicle. The vehicle surrounding obstacle information means, for example, information such as a traffic situation of a forward road, a road shape, and a road surface state. The vehicle surrounding situation detection step S2832 detects a vehicle surrounding situation using one or more of an SCC (Smart Cruise Control), an LKAS (Lane Keeping Assistant System), an SPAS (Smart Parking Assistant System), an AVM (Around View Monitoring), a camera, and a radar. The vehicle surrounding situation detection step S2832 collects the self-vehicle driving information and the surrounding vehicle driving information such as surrounding obstacles and surrounding environments, thereby enhancing reliability when a degree of risk is determined during driver's driving.

The driving pattern learning step S2840 is a step of learning a pre-stored driving pattern of the driver called by the driving pattern calling step S2820 and a driving pattern by the data acquired from the detection step S2830 to store the learned driving pattern in the memory unit 2060, and includes a driving pattern comparison step S2941, a driving pattern determination step S2942, a driving pattern storage step S2943, and a noise removal step S2944. In a case of the new driver, the driving pattern learning step S2840 calls a pre-stored default driving pattern to execute situation detection and newly allocates memory to begin learning. The pre-stored default driving pattern may be an average driving pattern of a plurality of drivers defined by experiment. Thus, it may be possible to induce the new driver to drive the vehicle with safety corresponding to the driving of the new driver, unlike the related art. In addition, a specific driving pattern for each driver may be grasped by performing of the driving pattern learning step S2840 and thus a situation detection method specified for each driver may be provided to induce safe driving.

The driving pattern comparison step S2941 is a step of comparing a pre-stored driving pattern of the driver called by the driving pattern calling step S2820, S2920 and a current driving pattern by the data acquired from the detection step S2830. The driving pattern determination step S2942 is a step of determining whether a difference of both in the driving pattern comparison step S2941 is within a preset noise range. The driving pattern storage step S2943 is a step of learning a current driving pattern when the difference of both is equal to or less than the preset noise range in the driving pattern determination step S2942 to store the learned driving pattern in the memory unit 2060. The noise removal step S2944 is a step of excluding a current driving pattern from a subject to be learned when the difference of both exceeds the preset noise range in the driving pattern determination step S2942. The preset noise range may be an experimental value according to conditions of test subjects.

The driving pattern learning step S2840, S2940 learns and stores a driving pattern within a preset noise range. A possibility of unnecessary warning is increased when a driving pattern such as rapid acceleration, rapid brake, or rapid rotation according to unexpected situations during driving is learned under the same condition. Accordingly, the driving pattern learning step S2840, S2940 is to remove such noise. The preset noise range may be determined by experiment according to conditions of test subjects.

The weighting determination step S2850 is a step of determining a weighting assigned to each data acquired from the detection step S2830, based on the driving pattern learned in the driving pattern learning step S2840. This is to induce safe driving by providing a situation detection and warning system specified for each driver according to the learned driving pattern. For example, when a driver A frequently operates the accelerator pedal, the brake pedal, the multifunctional switch, or the like, a weighting of operation information data of such a device is set high, and when a driver B frequently operates the AVN switch, the air conditioning device, or the like, a weighting of operation information data of such devices is set high.

The weighting may be determined by experiment according to conditions of test subjects. Thus, a weighting is also determined about the new driver and thus the situation detection of the vehicle may be performed. The determined weighting is changed as in the following equation by feedback from an information transfer step S3374 of the warning step S2870, S3370. Thus, it may be possible to induce safe driving by providing the situation detection and warning system specified for each driver according to the driver's driving pattern.

$\alpha(n+1)=\alpha(n)$, if $W<d_W$ and $R \geq d_R$ $\alpha(n+1)=\alpha(n)+\delta$, if $W \geq d_W$ $\alpha(n+1)=\alpha(n)-\delta$, if $W<d_W$ and $R<d_R$, where R=integrated risk index,
α=weighting,
α(n+1)=weighting changed by feedback,
α(n)=weighting before change,
W=acquired information data,
$d_R$=integrated risk index reference value,
$d_W$=information data reference value, and
δ=α(n)/R.

In the above equation, $d_W$ refers to an information data reference value and $d_R$ refers to an integrated risk index reference value. The weighting determination step S2850 compares current R and W values with respective reference values and changes the weighting as in FIG. 30 and the above equation. In addition, α(n+1) refers to a weighting changed by feedback and α(n) refers to a weighting before change. In addition, δ refers to a rate occupied by a weighting before change of each information data in the integrated risk index and the weighting of each information data may be increased or decreased by a δ value.

The determination step S2860, S3560 is a step of determining a safe driving state of a driver, based on the data to which the weighting determined in the weighting determination step S2850, S3550 is assigned. The determination step S2860, S3560 includes a calculation learning step S3561, a calculation step S3562, an examination step S3563, and a control step S3564.

The calculation learning step S3561 is a step of arranging data, to which the weighting determined in the weighting determination step S3550 is assigned, in the order of data mainly causing the integrated risk index to exceed a preset reference risk index and of selecting only a plurality of high data. The situation detection method of the present invention collects a great deal of data from a plurality of sensors inside/outside the vehicle to accurately detect situations. However, when a considerable time is required in processing a great deal of data, it is deviated from the purpose of the present invention for preventing accidents and inducing safe driving. Accordingly, there is a need to select some data from a great deal of data and perform rapid calculation during driving required for instantaneous determination. Thus, learning for rapid calculation and data selection are performed in the calculation learning step S3561. A selection function in the calculation learning step S3561 is initially inactivated and the calculation learning step S3561 stores results arising from the control step S3564. Subsequently, when data equal to or more than a certain number of times are stored, the calculation learning step S3561 arranges the data in the order of data mainly causing the integrated risk index calculated in the calculation step S3562 to exceed a preset reference risk index and selects only a plurality of high data. Here, the selected data is used for calculation and the remaining data is ignored such that calculation speed is increased. For example, when risk warnings equal to or more than 5000 times are generated and risk index data equal to or more than 5000 times are stored, data causing the calculated integrated risk index to exceed a preset reference risk index is selected. That is, the highest three data may be selected from data to which the weighting is reflected by analysis of causes such as the number of times of operation of the brake pedal, a steering wheel angle change amount, a forward observation neglect of a driver, and a trajectory of a surrounding vehicle. Subsequently, calculation speed may be increased in such a manner that only the selected data is reflected to calculate the integrated risk index and the remaining data is not reflected to calculate the integrated risk index. The data selected in the calculation learning step S3561 is transferred to the calculation step S3562.

The calculation step S3562 is a step of calculating a driver's integrated risk index by adding up respective risk indexes which multiply data selected in the calculation learning step S3561 among data, to which the weighting determined in the weighting determination step S3550 is assign, by a weighting for each data assigned in the weighting determination step S3550. For example, the risk index may be calculated as in the following equation.

$$R = \alpha_A \times W_A + \alpha_B \times W_B + \alpha_C \times W_C,$$

where R=integrated risk index,
α=weighting for each selected information data,
W=selected information data.

The examination step S3563 is a step of comparing the integrated risk index calculated by the calculation step S3562 with a risk index calculated based on a pre-stored driving pattern (hereinafter, referred to as "examination risk index) to determine whether the compared result is within a preset error range. That is, the examination step S3563 is a step of determining whether a result calculated by the calculation step S3562 is valid. When the calculation learning step S3561 selects some data for rapid calculation and calculation is performed based on the same, there is a possibility of error occurring in the calculated result. Since the object of the present invention is to induce safe driving, an examination process for error removal is required for driver's safe driving. Accordingly, the examination step S3563 compares a risk index calculated by a pre-stored driving pattern of a current driver (hereinafter, referred to as "examination risk index) with an integrated risk index calculated by a driving pattern learning a current driving pattern of the current driver and determines that a calculated risk index value is valid when a difference between the examination risk index and the calculated integrated risk index is within a preset error range. In addition, the calculated integrated risk index is transferred to the control step S3564. The preset error range may be determined by experiment according to conditions of test subjects. The examination risk index may be previously calculated before current driving of the driver and stored in the memory unit 2060. On the other hand, since the calculated integrated risk index is invalid when the difference between the examination risk index and the calculated integrated risk index exceeds the preset error range, the result is ignored.

The control step S3564 is a step of comparing, when the difference between the examination risk index and the calculated integrated risk index is determined to be within the preset error range in the examination step S3563, the calculated integrated risk index with a preset reference risk index to determine the compared result. That is, the control step S3564 is a step of comparing the integrated risk index transferred from the examination step S3563 with a preset reference risk index and activating the warning step S2870, S3670 according to the compared result.

The preset reference risk index may include a first reference risk index, a second reference risk index, and a third reference risk index. Each reference risk index may be determined by experiment according to conditions of test subjects.

When the calculated integrated risk index is equal to or greater than a preset first reference risk index and is less than a preset second reference risk index, the control step S3564 transfers a signal allowing a first warning step S3671 to be performed. In addition, when the calculated integrated risk index is equal to or greater than a preset second reference risk index and is less than a preset third reference risk index, the control step S3564 transfers a signal allowing a second warning step S3672 to be performed. In addition, when the calculated integrated risk index is equal to or greater than a preset third reference risk index, the control step S3564 transfers a signal allowing a third warning step S3673 to be performed.

The warning step S3670 is a step of warning a driver when the driver is determined to be not in a safe driving state in the determination step S3560, and includes a first warning step S3671, a second warning step S3672, a third warning step S3673, and an information transfer step S3674. The warning step S3670 serves to induce safe driving by performing respective warning steps of different warning levels depending on the signals transferred from the control step S3564 to inform of a warning corresponding to the driver status.

The first warning step S3671 is performed when the integrated risk index calculated in the control step S3564 is equal to or greater than a preset first reference risk index and is less than a preset second reference risk index, and includes one or more of a warning sound generation step through a speaker, a warning display step through an AVN or a HUD, and a vibration notification step through vibration of a steering wheel or a seat.

The second warning step S3672 is a step of holding functions of the AVN when the integrated risk index calculated in the control step S3564 is equal to or greater than a preset second reference risk index and is less than a preset third reference risk index.

The third warning step S3673 is a step of forcibly stopping a vehicle when the integrated risk index calculated in the control step S3564 is equal to or greater than a preset third reference risk index. In this case, the vehicle may be forcibly and safely stopped using an ADAS (Advanced Driver Assistance System) module. The ADAS module may include one or more of an LKAS, an SPAS, and an SCC.

The warning step S3670 includes the information transfer step S3674 of transferring information to the weighting determining step S3550 for change of the weighting through feedback. Thus, it may be possible to induce safe driving by providing the situation detection and warning system specified for each driver according to the driver's driving pattern.

Figure 37:
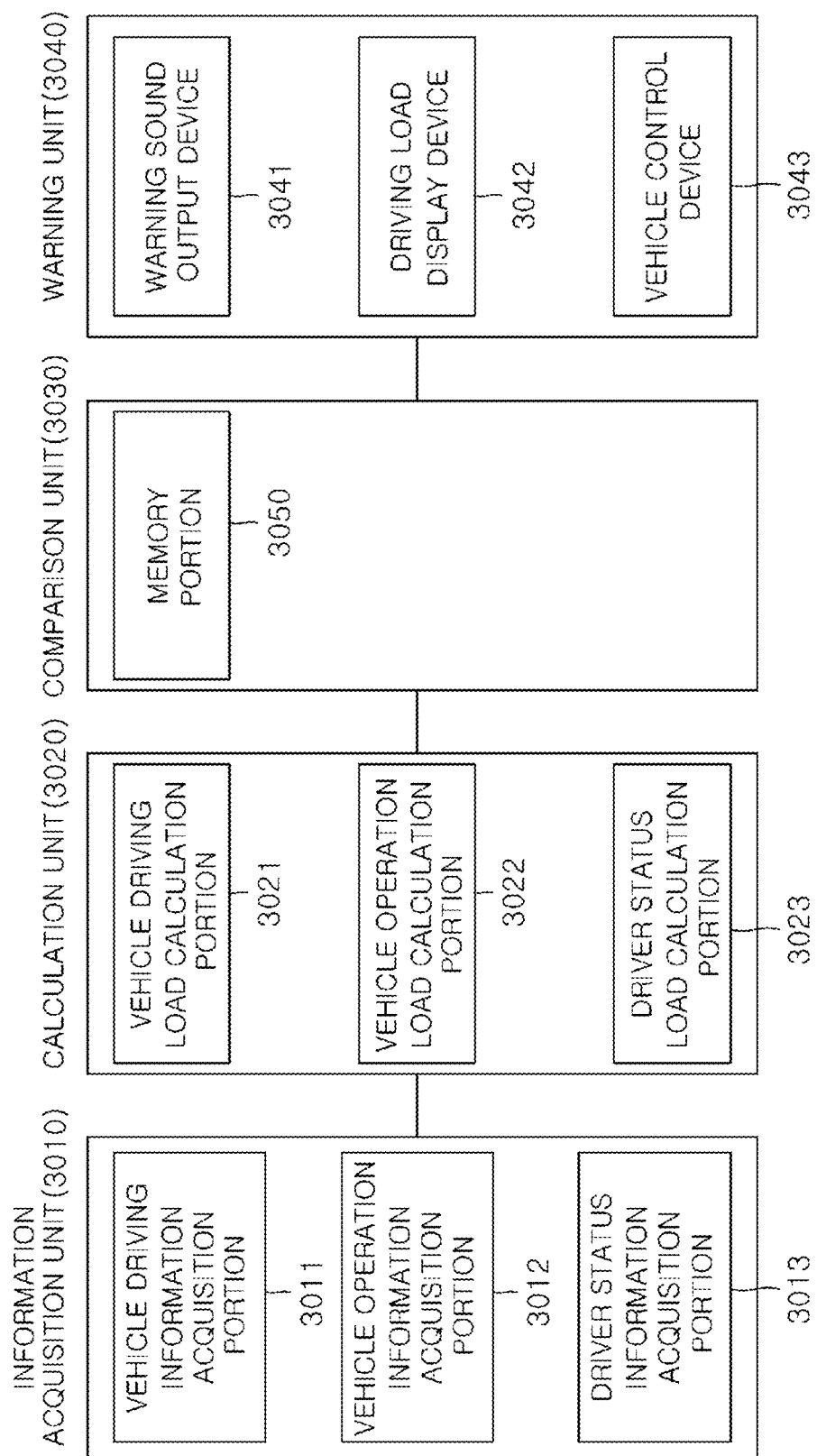
FIG. 37 is a block diagram illustrating a configuration of an apparatus for detecting a driver status according to an embodiment of the present invention.
Figure 38:
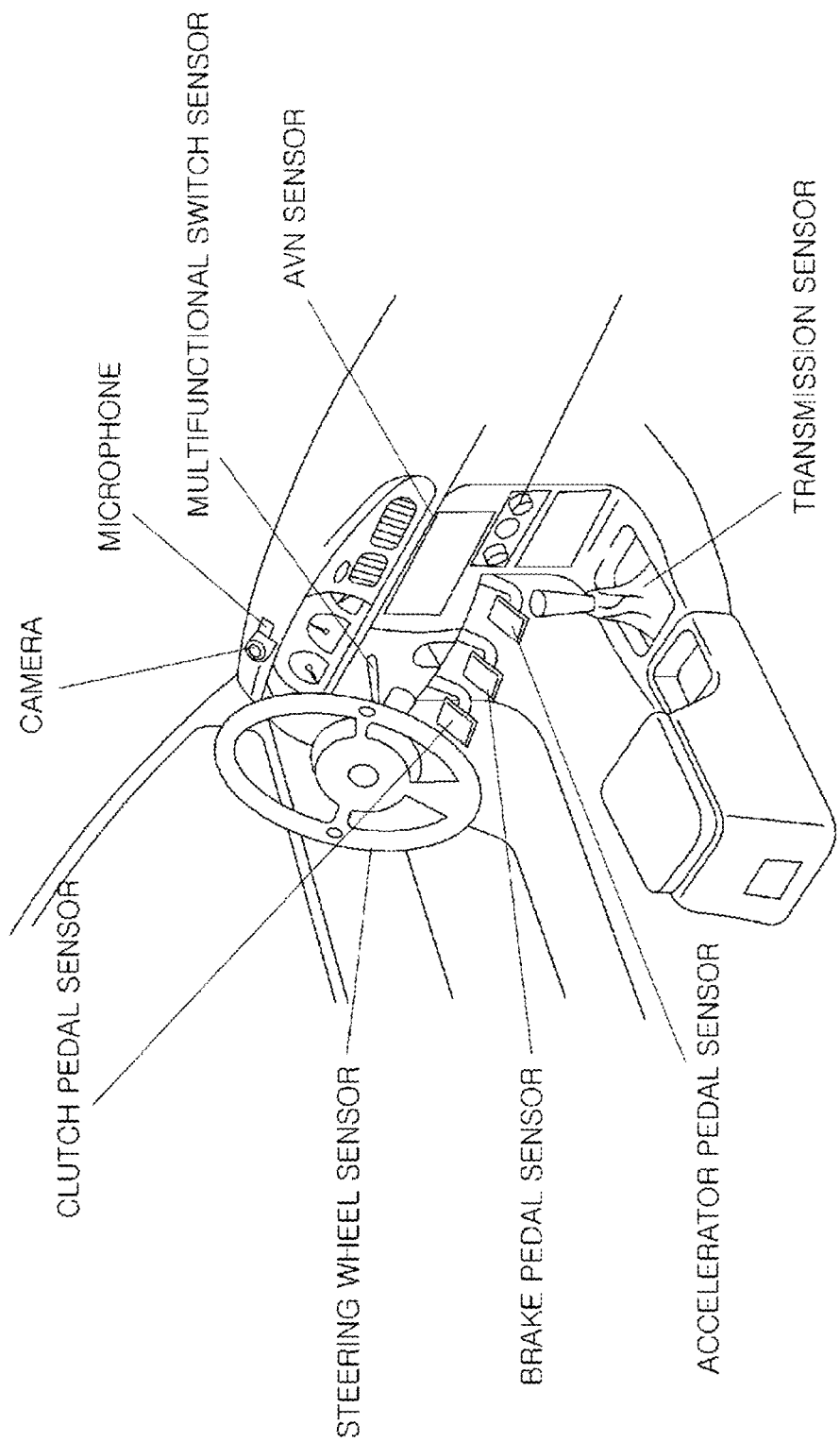
FIG. 38 is a view schematically illustrating a configuration of an information acquisition unit according to the embodiment of the present invention.
Figure 39:
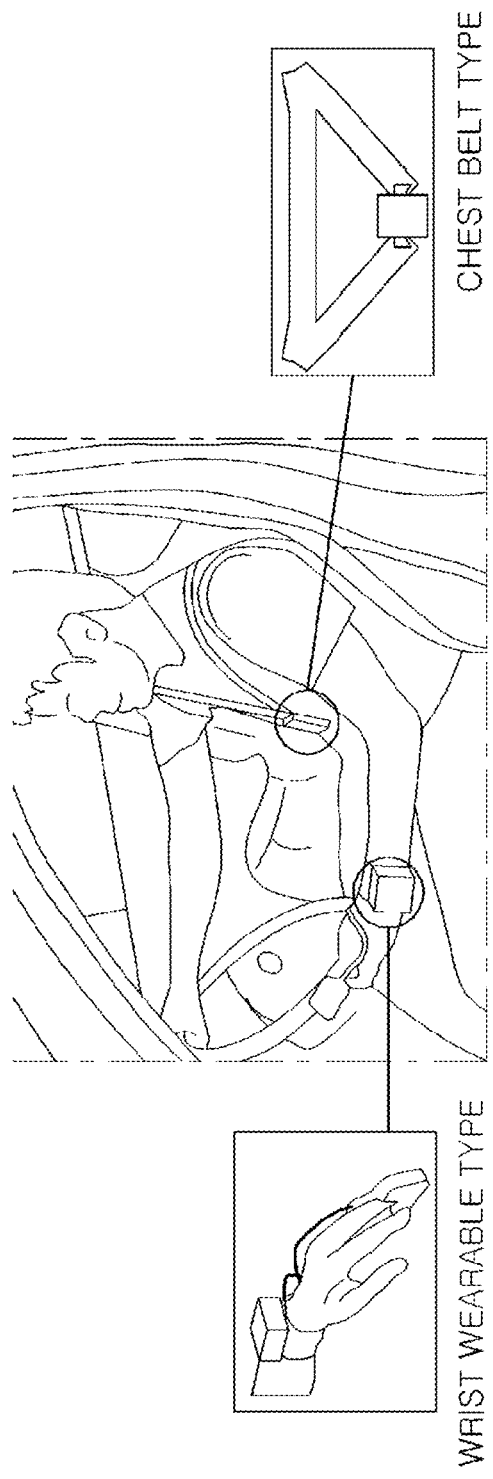
FIG. 39 is an exemplified view illustrating an ECG sensor and a PPG sensor according to the embodiment of the present invention.
Figure 40:
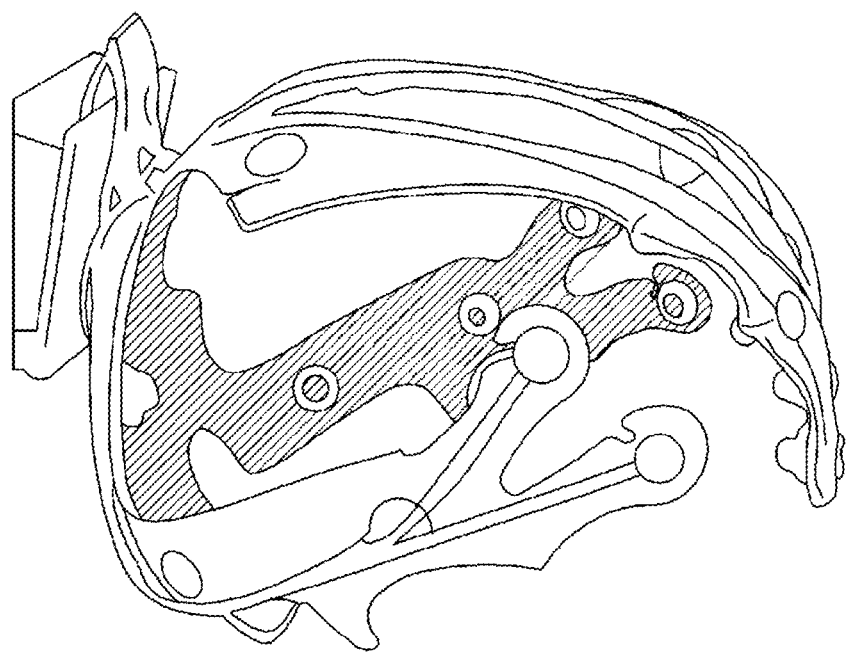
FIG. 40 is an exemplified view illustrating an EEG sensor according to the embodiment of the present invention.
Figure 41:
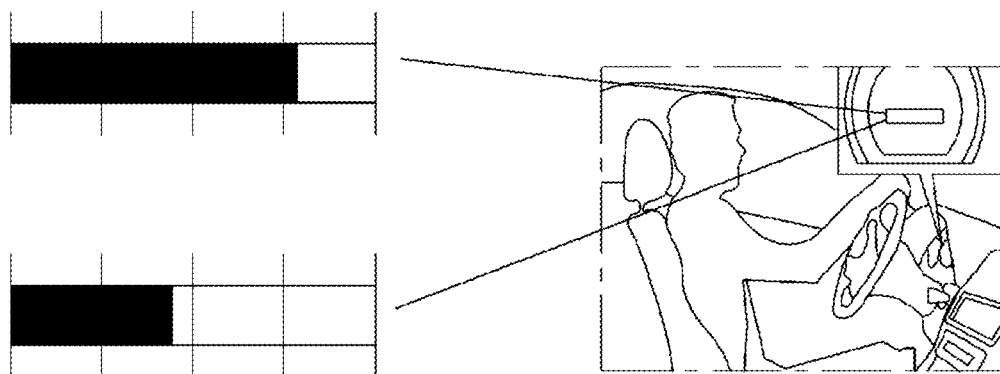
FIG. 41 is an exemplified view illustrating a driving load display device according to the embodiment of the present invention.

FIG. 37 is a block diagram illustrating a configuration of an apparatus for detecting a driver status according to an embodiment of the present invention. FIG. 38 is a view schematically illustrating a configuration of an information acquisition unit. FIG. 39 is an exemplified view illustrating an ECG sensor and a PPG sensor. FIG. 40 is an exemplified view illustrating an EEG sensor. FIG. 41 is an exemplified view illustrating a driving load display device according to the embodiment of the present invention. Referring to FIGS. 37 to 41, an apparatus for detecting a driver status according to an embodiment of the present invention includes an information acquisition unit 3010 which acquires driver status information, vehicle driving information, and driver's vehicle operation information, a calculation unit 3020 which calculates a driving load of a driver based on the information acquired by the information acquisition unit 3010, a comparison unit 3030 which comparing between the driving load calculated by the calculation unit 3020 and a preset load margin, and a warning unit 3040 which warns the driver when the comparison unit 3030 determines that the driving load exceeds the preset load margin. The information acquisition unit 3010 is a component to acquire the vehicle driving information, the vehicle operation information, and the driver status information.

The vehicle driving information is information generated when the driver drives a vehicle, and means, for example, information such as how often the driver steps on an accelerator pedal, how often the driver steps on a brake pedal, how often the driver operates a steering wheel, and how often the driver operates a multifunctional switch. In addition, in a manual transmission vehicle, the driving information may include information such as how often the driver steps on a clutch pedal and how often the driver operates a transmission, besides the above information. The multifunctional switch means a switch of a wiper, a turn signal indicator, a lighting lamp, or the like. Since the multifunctional switch is a factor necessary to the vehicle driving, operation information of the multifunctional switch may be included in the vehicle driving information. The vehicle operation information is information generated when the driver operates the vehicle, and may include, for example, information such as how often the driver operates an AVN (Audio Video Navigation) and how often the driver operates an air conditioning device. The driver status information is information according to a driver status during driving, and may include, for example, information such as how long the driver makes conversation (including a telephone conversation), whether or not the driver drowses, whether or not the driver keeps eyes forward, and whether or not abnormality is generated in a driver's electrocardiogram or brainwave.

To acquire the above information, the information acquisition unit 3010 may include a vehicle driving information acquisition portion 3011, a vehicle operation information acquisition portion 3012, and a driver status information acquisition portion 3013. The vehicle driving information acquisition portion 3011 may include an accelerator pedal sensor, a brake pedal sensor, a steering wheel sensor, a multifunctional switch sensor, a clutch pedal sensor, a transmission sensor. The vehicle operation information acquisition portion 3012 may include an air conditioning device sensor and an AVN sensor. The driver status information acquisition portion 3013 may include a microphone, a driver observation camera, an ECG (electrocardiogram) sensor, an EEG (electroencephalogram) sensor, and a PPG (photoplethysmography) sensor.

The microphone is a component to recognize whether or not the driver makes conversation (including a telephone conversation) and the driver observation camera is a component to recognize whether or not the driver drowses or keeps eye forward by capturing a driver's face image or eye area image. The ECG sensor is a component to recognize a driver's electrocardiogram and the PPG sensor is a component to recognize a driver's PPG signal. The PPG signal may mean a photoplethysmography. The ECG sensor and the PPG sensor may be a wearable sensor, and, particularly, may have a wearable structure such as a chest belt type or a wristwatch type. The ECG sensor and the PPG sensor may be worn on a driver's body to accurately measure an electrocardiogram and a photoplethysmography. The EEG sensor is to acquire driver's brainwave information and may be a wearable sensor. Particularly, the EEG sensor may have a wearable structure such as a headset type. The EEG sensor may be worn on a driver's body to accurately measure a brainwave.

The calculation unit 3020 calculates a driving load indicated by converting each factor having a negative effect on safe driving of the driver into a quantitative numerical value, based on the information acquired by the information acquisition unit 3010. The calculation unit 3020 may include a vehicle driving load calculation portion 3021, a vehicle operation load calculation portion 3022, and a driver status load calculation portion 3023. The driving load may be calculated by summing loads calculated by the respective calculation portions 3021, 3022, and 3023.

The comparison unit 3030 comparing between the driving load calculated by the calculation unit 3020 and a preset load margin. When the driving load is equal to or less than the preset load margin, the comparison unit 3030 determines that the driver is in a safe driving state. On the other hand, when the driving load exceeds the preset load margin, the comparison unit 3030 determines that the driver is not in the safe driving state. The preset load margin may be an experimental value extracted from a sum of a vehicle driving load, a vehicle operation load, and a driver status load through an experiment according to conditions of a test subject. In addition, the preset load margin may be a value of the driving load calculated based on information according to existing driving patterns of the driver. The comparison unit 3030 may include a memory portion 3050 for storing a value of the preset load margin. The memory portion 3050 may be a nonvolatile memory as a storage means for storing data.

The warning unit 3040 is a component to warn the driver when the comparison unit 3030 determines that the driver is not in the safe driving state, and may include a warning sound output device 3041, a driving load display device 3042, and a vehicle control device 3043. As shown in FIG. 41, the driving load display device 3042 may be mounted on a dashboard of the vehicle. In addition, the driving load may also be displayed through an AVN or a HUD (Head Up Display). When the driver is determined to be not in the safe driving state, the warning sound output device 3041 may generate a warning sound to the driver or play an announcement for notifying that the driver is not in the safe driving state. The warning sound output device 3041 may also utilize a speaker installed to the vehicle. The vehicle control device 3043 is a device to safely stop the vehicle when the driver is determined to be not in the safe driving state, and may be a device for controlling a steering wheel, a transmission, and a brake which are installed to the vehicle.

The information acquisition unit 3010, the calculation unit 3020, the comparison unit 3030, the warning unit 3040, and the memory portion 3050 may also be interconnected in a wireless manner using Bluetooth, ZigBee, WiFi, etc. or in a wired manner using RS-232, RS-485, CAN, etc.

Figure 42:
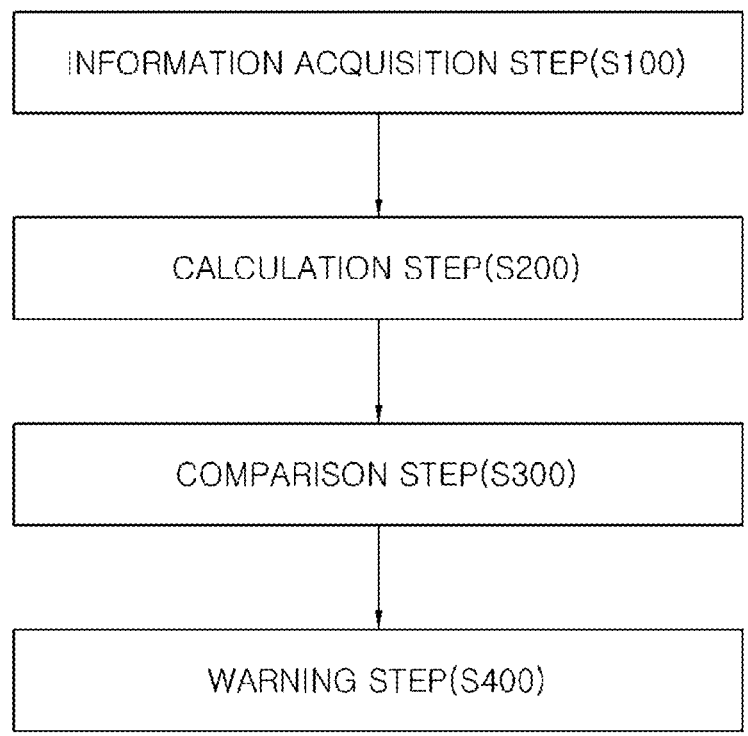
FIG. 42 is a flowchart schematically illustrating a method of detecting a driver status according to another embodiment of the present invention.
Figure 43:
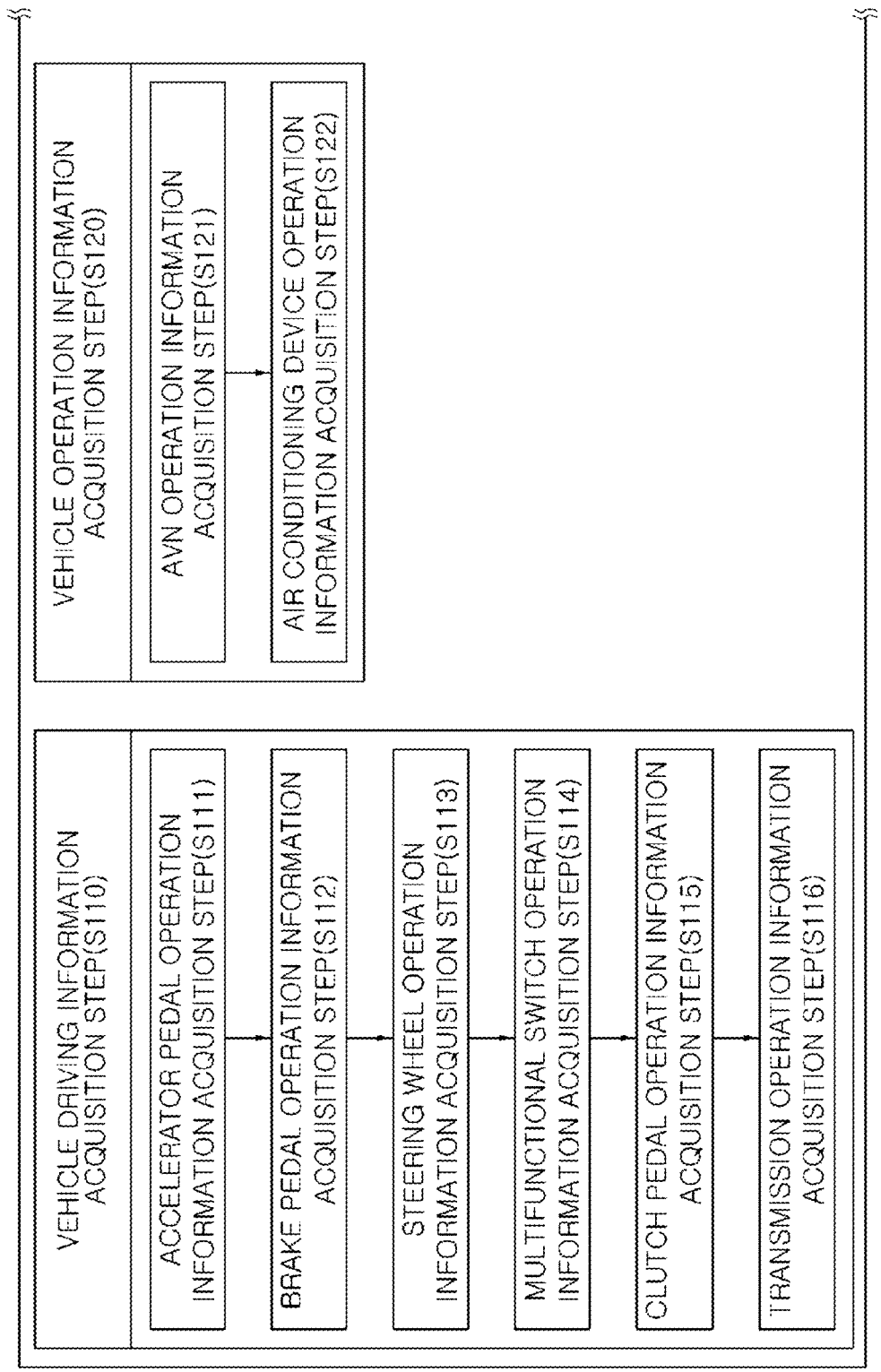
FIGS. 43 and 44 are flowcharts illustrating an information acquisition step in the method of detecting a driver status according to the embodiment of the present invention.
Figure 44:
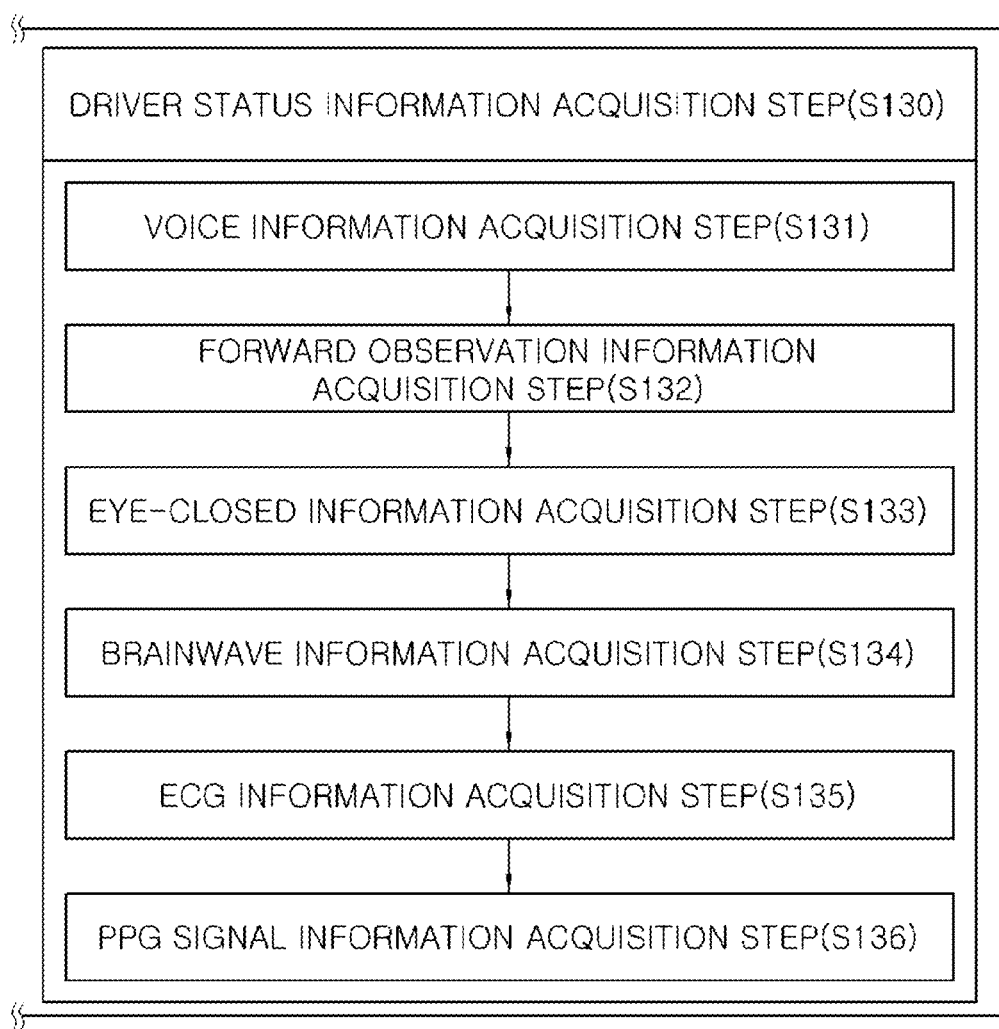
Figure 45:
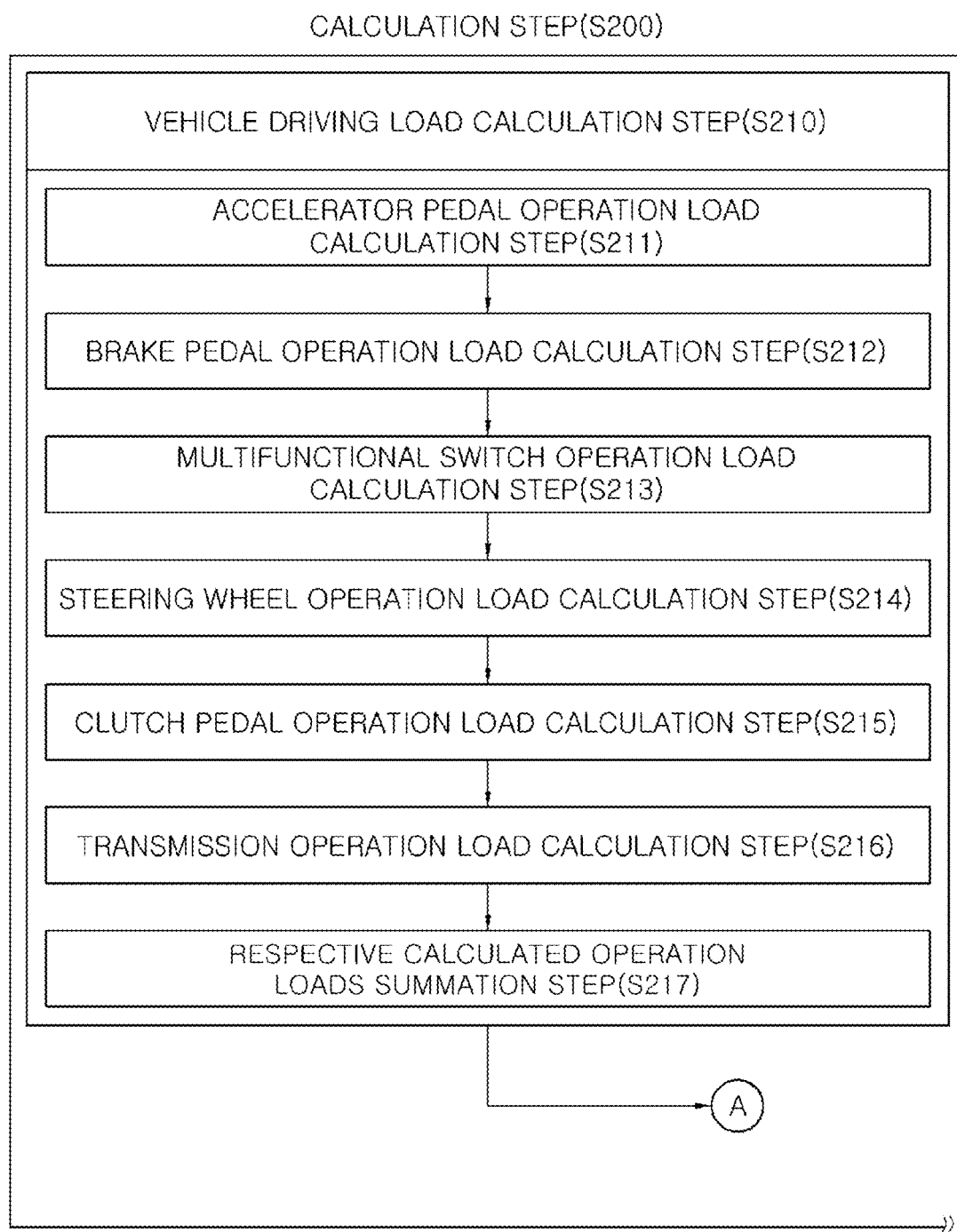
FIGS. 45 and 46 are flowcharts illustrating a calculation step in the method of detecting a driver status according to the embodiment of the present invention.
Figure 46:
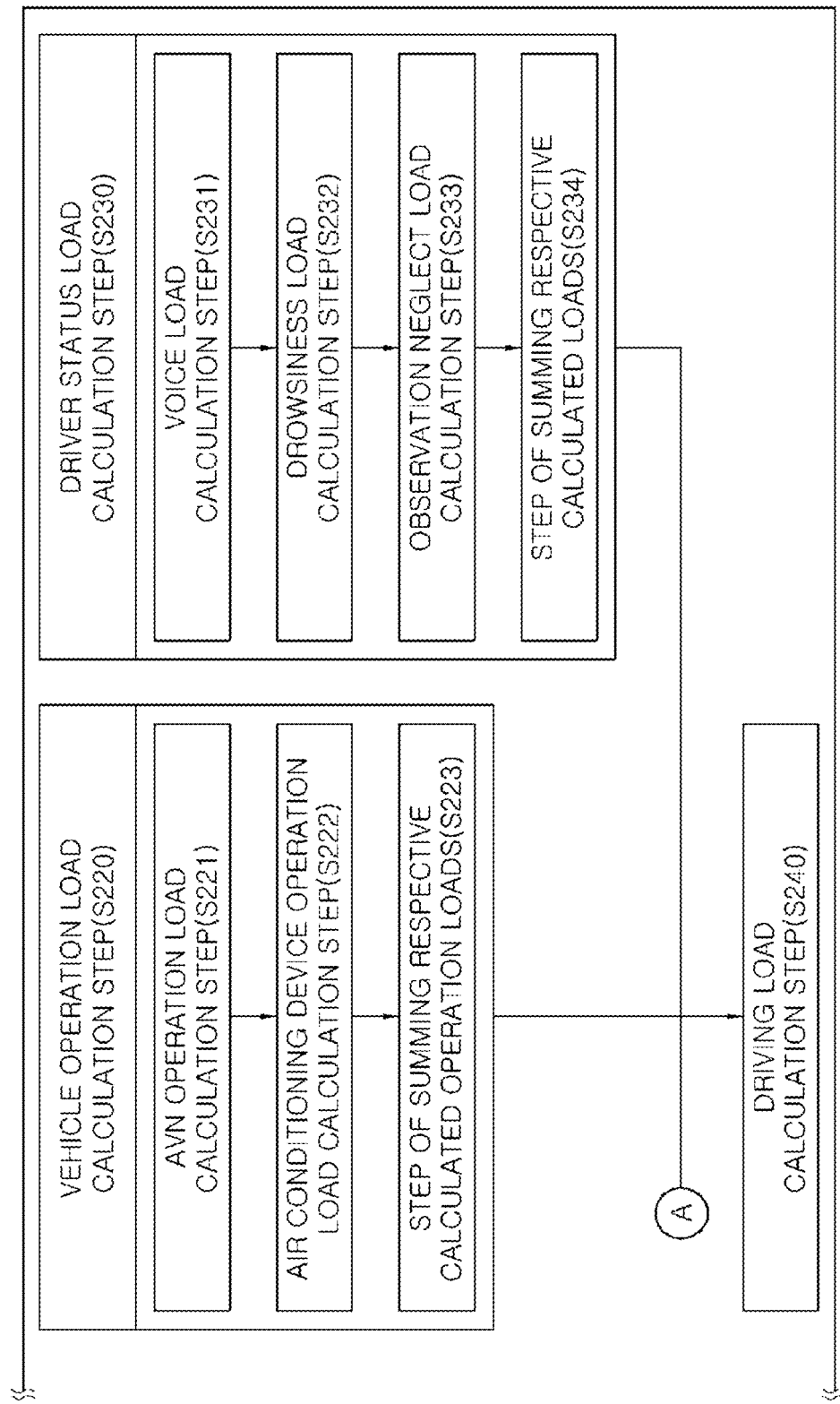
Figure 47:
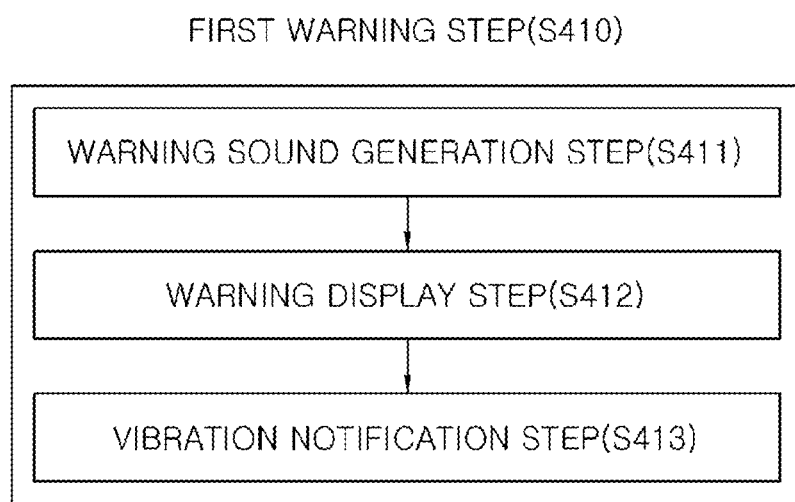
FIG. 47 is a flowchart illustrating a first warning step in the method of detecting a driver status according to the embodiment of the present invention.
Figure 48:
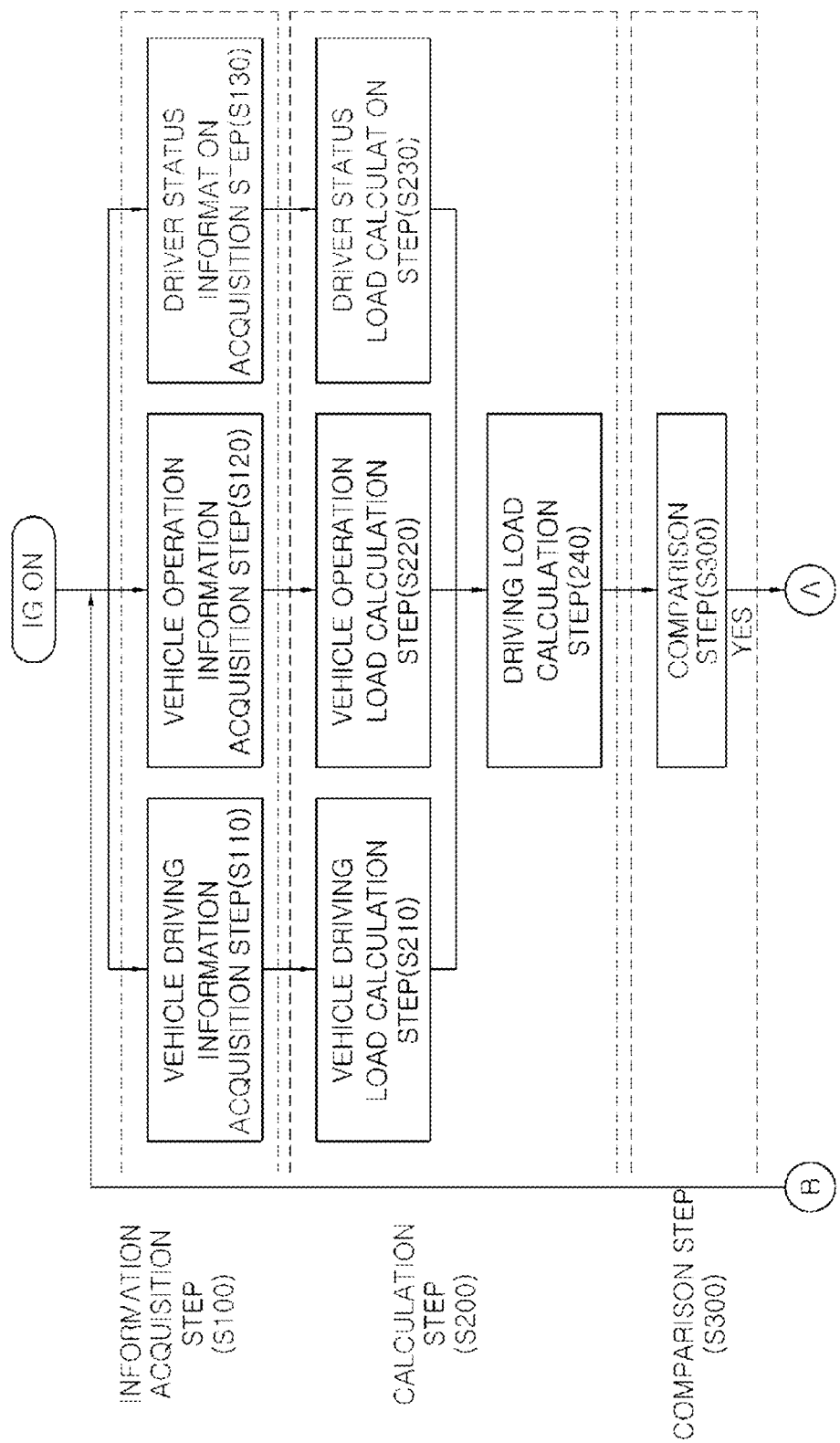
FIGS. 48 and 49 are flowcharts illustrating the method of detecting a driver status according to the embodiment of the present invention.
Figure 49:
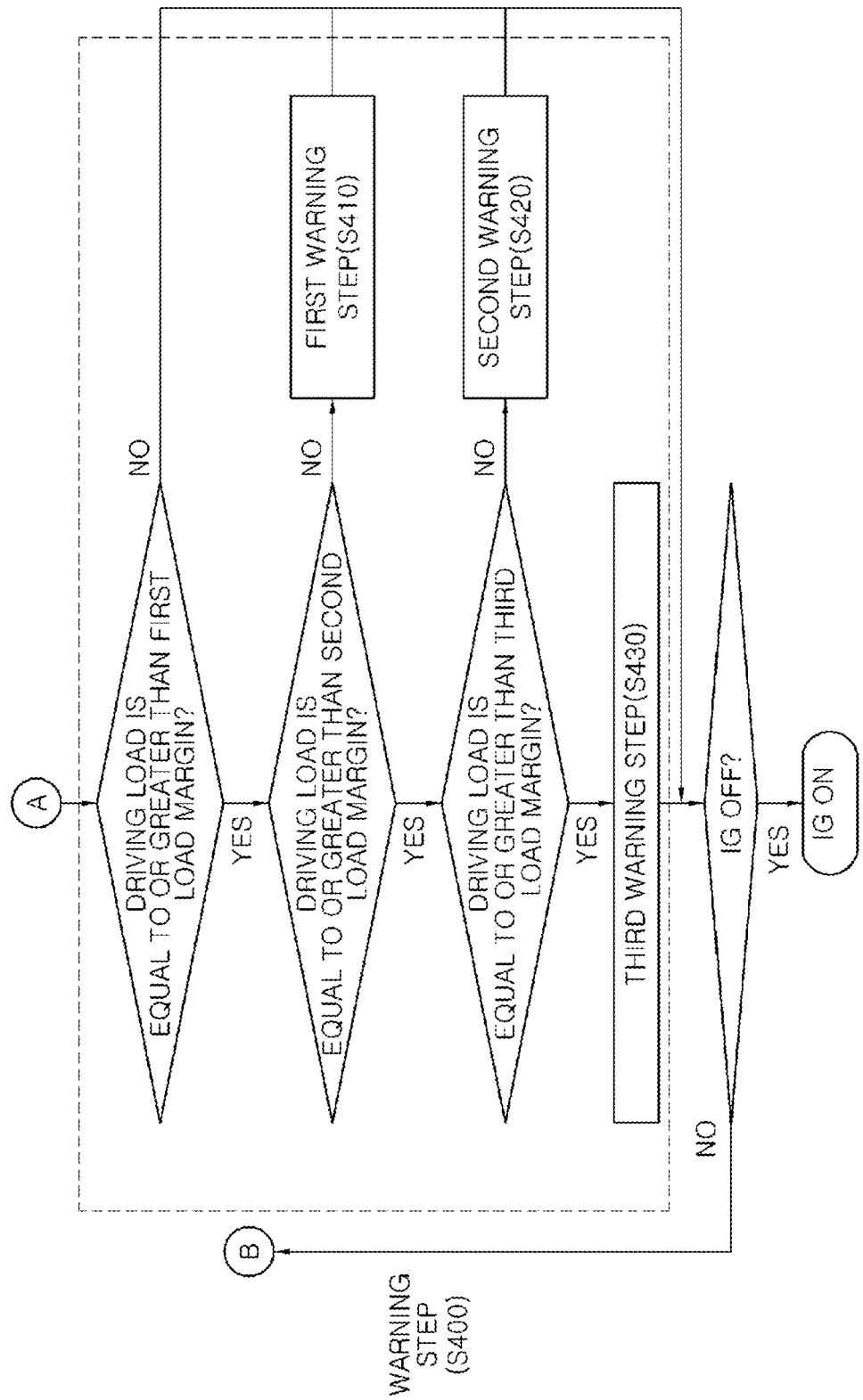
Figure 50:
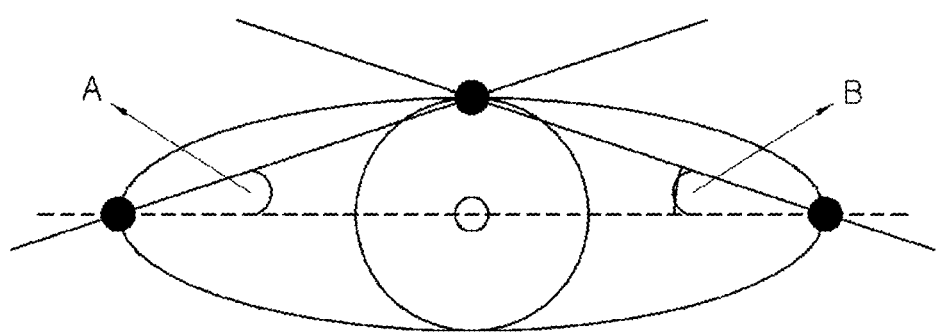
FIG. 50 is a view for explaining a method of determining that a driver closes eyes in the method of detecting a driver status according to the embodiment of the present invention.
Figure 51:
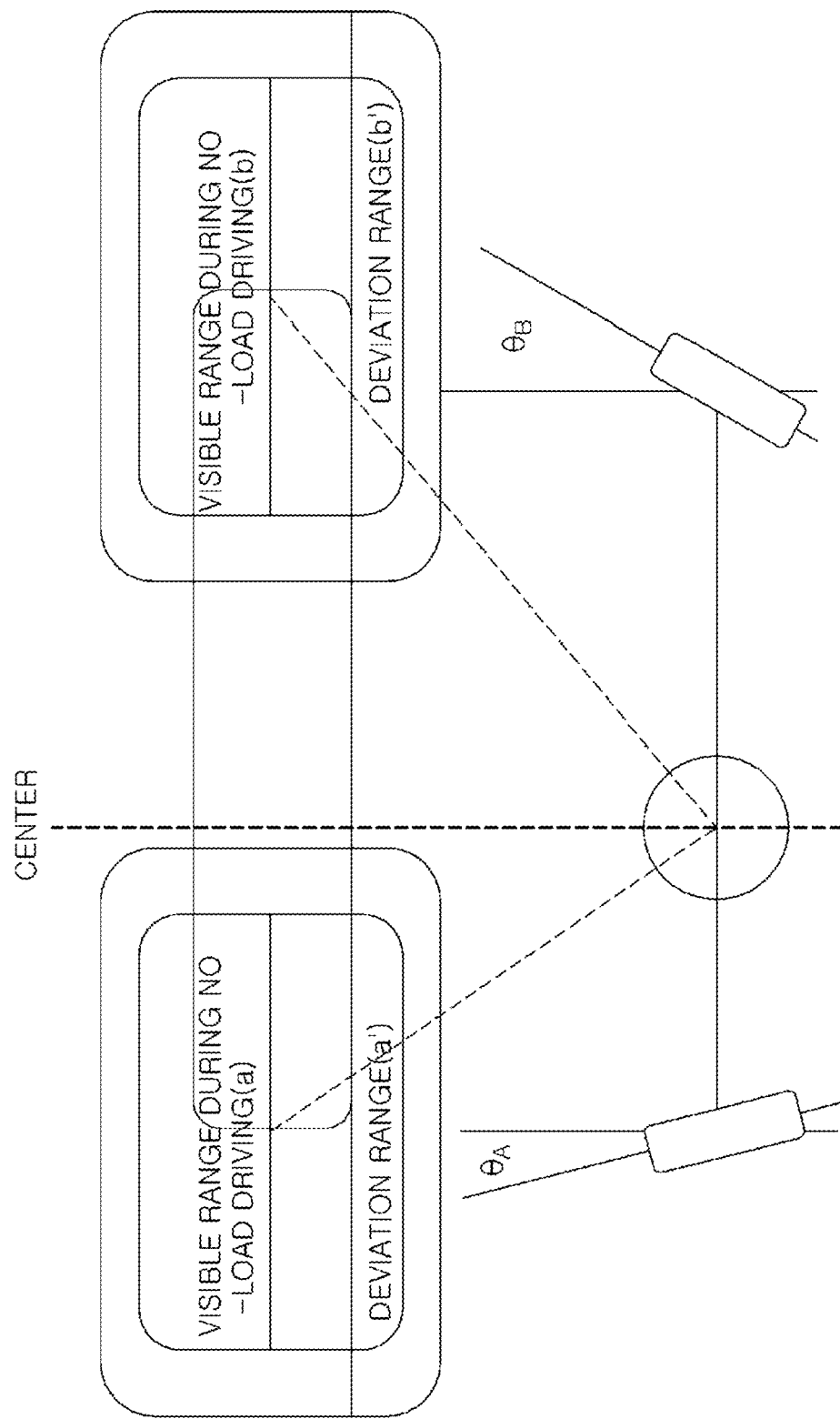
FIG. 51 is a view for explaining a visible range during no-load driving depending on a wheel angle in the method of detecting a driver status according to the embodiment of the present invention.
Figure 52:
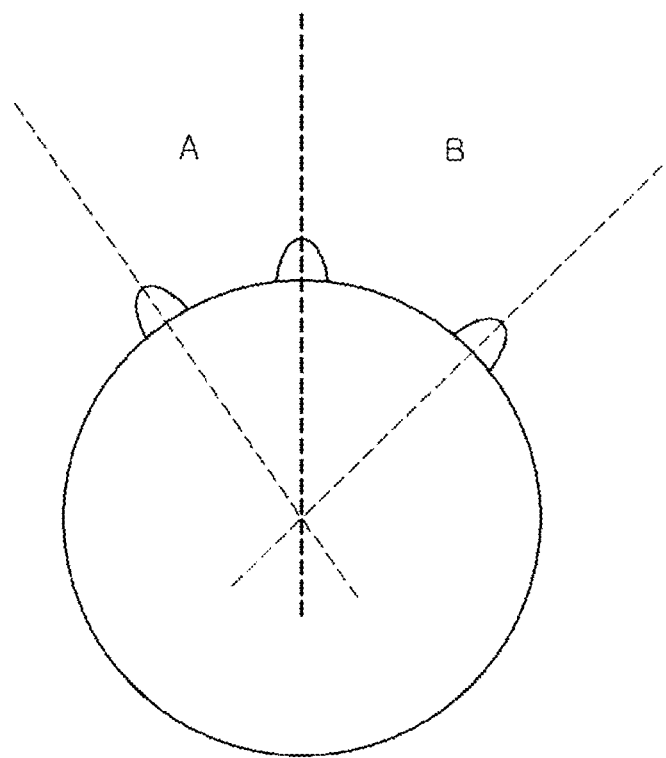
FIGS. 52 and 53 are views for explaining a method of determining a driver's viewing range in the method of detecting a driver status according to the embodiment of the present invention.
Figure 53:
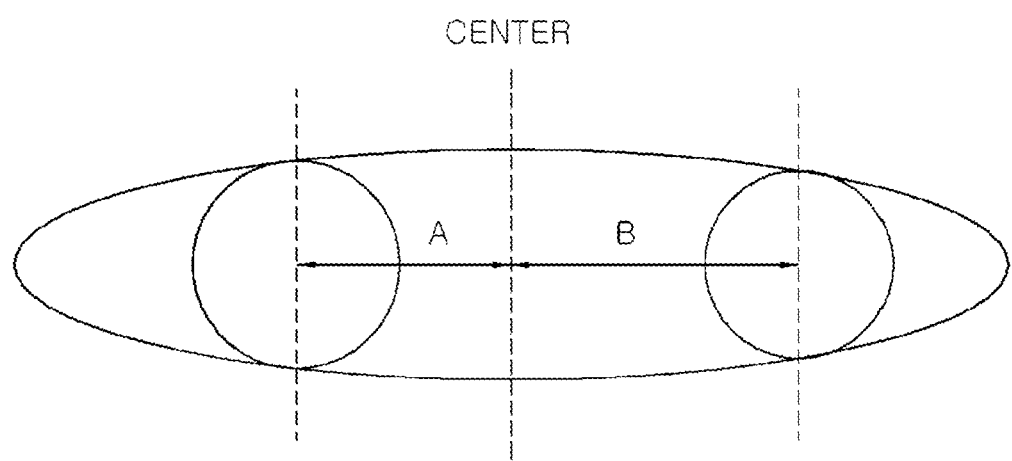

FIG. 42 is a flowchart schematically illustrating a method of detecting a driver status according to another embodiment of the present invention. FIGS. 43 and 44 are detailed flowcharts illustrating an information acquisition step. FIGS. 45 and 46 are flowcharts illustrating a calculation step. FIG. 47 is a flowchart illustrating a first warning step. FIGS. 48 and 49 are flowcharts illustrating the method of detecting a driver status. FIG. 50 is a view for explaining a method of determining that the driver closes eyes. FIG. 51 is a view for explaining a visible range during no-load driving. FIGS. 52 and 53 are views for explaining a method of determining a driver's viewing range. Referring to FIGS. 42 to 53, a method of detecting a driver status according to another embodiment of the present invention includes an information acquisition step S100 which acquires driver status information and driver's vehicle operation information, a calculation step S200 which calculates a driving load of a driver based on the information acquired in the information acquisition step S100, a comparison step S300 which compares the driving load of the driver calculated in the calculation step S200 and a preset load margin, and a warning step S400 which warns the driver when the comparison step S300 determines that the driving load of the driver exceeds the preset load margin.

In the information acquisition step S100, information of the driver is acquired by a sensor, a microphone, a camera, etc. The information acquisition step S100 includes a vehicle driving information acquisition step S110 of measuring the number of times the driver operates a pedal or the like for driving the vehicle, an operation time of the pedal or the like by the driver, etc., a vehicle operation information acquisition step S120 of measuring the number of times the driver operates a switch or the like for operating additional devices, an operation time of the switch or the like by the driver, etc., and a driver status information acquisition step S130 of measuring a conversation time of the driver, an eye-closed time of the driver, a time for which the driver does not keep eyes forward, a driver's brainwave, a driver's electrocardiogram, etc.

The vehicle driving information acquisition step S110 includes an accelerator pedal operation information acquisition step S111 of measuring the number of times the driver operates an accelerator pedal for a preset unit time, a brake pedal operation information acquisition step S112 of measuring the number of times the driver operates a brake pedal for a preset unit time, a steering wheel operation information acquisition step S113 of measuring an angle change rate of a steering wheel rotated by the driver for a preset unit time, and a multifunctional switch operation information acquisition step S114 of measuring the number of times the driver operates a multifunctional switch such as a wiper or a turn signal indicator for a preset unit time. Particularly, in a manual transmission vehicle, the vehicle driving information acquisition step S110 further includes a clutch pedal operation information acquisition step S115 of measuring the number of times the driver operates a clutch pedal for a preset unit time and a transmission operation information acquisition step S116 of measuring the number of times the driver operates a transmission for a preset unit time. The vehicle operation information acquisition step S120 includes an AVN operation information acquisition step S121 of measuring an operation time of an AVN by the driver and the number of times the driver operates the AVN, for a preset unit time, and an air conditioning device operation information acquisition step S122 of measuring an operation time of an air conditioning device such as a heater or an air conditioner by the driver and the number of times the driver operates the air conditioning device, for a preset unit time.

The driver status information acquisition step S130 includes a driver's voice information acquisition step S131 of sensing a voice of the driver through a microphone mounted at a predetermined position within the vehicle to measure a pulse amplitude (a voice amplitude) of the received voice data and a generation time of the voice having a pulse amplitude of a reference value or more, a driver's forward observation information acquisition step S132 of measuring a time for which a driver's viewing range is deviated from a visible range during no-load driving as a range, in which safe driving is not obstructed, using a driver's face image and eye area image captured by a camera mounted at a predetermined position within the vehicle, a driver's eye-closed information acquisition step S133 of measuring the number of times the driver closes eyes and an eye-closed time using a driver's eye area image captured by the camera mounted at a predetermined position within the vehicle, a driver's brainwave information acquisition step S134, a driver's ECG information acquisition step S135, and a PPG signal information acquisition step S136 of measuring a driver's photoplethysmographic signal. The respective information acquisition steps are not necessary to be sequentially performed. For example, the information acquisition steps may be simultaneously or reversely performed.

The calculation step S200 includes a vehicle driving load calculation step S210 of calculating a vehicle driving load indicated by converting each factors obstructing safe driving into a quantitative numerical value in connection with vehicle driving by the driver, a vehicle operation load calculation step S220 of calculating a vehicle operation load indicated by converting each factors obstructing safe driving into a quantitative numerical value in connection with vehicle operation by the driver, and a driver status load calculation step S230 of calculating a driver status load indicated by converting each factors obstructing safe driving into a quantitative numerical value in connection with a driver's mental and physical condition, and a driving load calculation step S240 of calculating a driving load by summing the respective calculated loads.

The vehicle driving load calculation step S210 includes an accelerator pedal operation load calculation step S211, a brake pedal operation load calculation step S212, a multifunctional switch operation load calculation step S213, a steering wheel operation load calculation step S214, and a step S217 of summing the respective calculated operation loads. Since the safe driving may be obstructed when the driver frequently operates the accelerator pedal, the brake pedal, the multifunctional switch, the steering wheel, etc., the above steps may be included in the vehicle driving load calculation step S210. The vehicle driving load calculation step S210 is performed only when a vehicle speed exceeds a preset speed. In accordance with an exemplary embodiment of the present invention, in a case in which a preset speed is 10 km/h, a vehicle driving load becomes 0 when a vehicle speed by a driver is 9 km/h. In the vehicle driving load calculation step S210, the vehicle driving load is calculated by calculating the number of times of operation or operation time of each term included in the vehicle driving information acquired in the vehicle driving information acquisition step S110 and a weighting preset at the term. The preset weighting may be set by an experiment according to each vehicle driving load. In addition, the preset weighting may be a value calculated based on information according to existing driving patterns of the driver. The preset weighting may be stored in the memory portion 3050.

In accordance with another exemplary embodiment of the present invention, a vehicle driving load $W_d$ is calculated for every 200 ms. Each term is measured in 50 ms and communication is performed in a CAN manner. In a state in which a vehicle starts up, the vehicle driving load begins to be calculated when a vehicle speed is 10 km/h or more.

(1) When an IG is turned ON, a vehicle speed is 10 km/h or more, a timer 1 is set as 200 ms, and a timer 2 is set as 50 ms, whether or not an accelerator pedal is operated is measured for every 50 ms and a preset accelerator pedal operation load weighting is loaded from a memory.

(2) When the IG is turned ON, the vehicle speed is 10 km/h or more, the timer 1 is set as 200 ms, and the timer 2 is set as 50 ms, whether or not a brake pedal is operated is measured for every 50 ms and a preset brake pedal operation load weighting is loaded from the memory.

(3) When the IG is turned ON, the vehicle speed is 10 km/h or more, and the timer 1 is set as 200 ms, whether or not a multifunctional switch is operated is measured for 200 ms and a preset multifunctional switch operation load weighting is loaded from the memory.

(4) When the IG is turned ON, the vehicle speed is 10 km/h or more, the timer 1 is set as 200 ms, and the timer 2 is set as 50 ms, an angle change rate of a steering wheel is operated is measured for every 50 ms and a preset steering wheel operation load weighting is loaded from the memory.

(5) The vehicle driving load $W_d$ for 200 ms is calculated according to the following equation:

$$W_d = D_A \times n_A \times 50\ ms + D_B \times n_B \times 50\ ms + D_M \times n_M + \theta \times n_\theta \times 50\ ms$$

$W_d$=vehicle driving load
$D_A$=accelerator pedal operation load weighting
$n_A$=number of times of operation of accelerator pedal
$D_B$=brake pedal operation load weighting
$n_B$=number of times of operation of brake pedal
$D_M$=multifunctional switch operation load weighting
$n_M$=number of times of operation of multifunctional switch
$\theta$=steering wheel operation load weighting
$n_\theta$=total angle change rate of steering wheel.

(6) Each term included in the vehicle driving information and the vehicle driving load may be added or omitted, if necessary. For example, in the manual transmission vehicle, the vehicle driving load may be calculated by adding a clutch pedal operation load and a transmission operation load.

In accordance with still another exemplary embodiment of the present invention, a vehicle driving load $W_M$ may be calculated by calculating the number of times of operation of each term included in the acquired vehicle operation information and a weighting preset at the term, according to the following equation:

$$W_M = \frac{D_C \times n_C \times T_C}{T_{preset\ time}} + \frac{D_D \times n_D \times T_D}{T_{preset\ time}}$$

$W_M$=vehicle operation load
$T_{preset\ time}$=preset time
$D_C$=AVN operation load weighting
$n_C$=number of times of operation of AVN
$T_C$=AVN operation time
$D_D$=air conditioning device operation load weighting
$n_D$=number of times of operation of air conditioning device
$T_D$=air conditioning device operation time.

In accordance with yet another exemplary embodiment of the present invention, a driver status load may be calculated by calculating an operation time of each term included in the acquired driver status information and a weighting preset at the term.

A voice load V may be calculated by sensing a voice of the driver through a microphone mounted at a predetermined position within the vehicle and using a pulse amplitude (a voice amplitude) of the received voice data and information of a generation time of the voice, according to the following equation:

$$V = \frac{T_v}{T_{preset\ time}} \times D_v$$

V=voice load
$T_{preset\ time}$=preset time
$T_V$=generation time of voice having pulse amplitude of reference value or more
$D_V$=voice load weighting.

Driver's eye-closed information may be acquired using a driver's eye area image captured by a camera mounted at a predetermined position within the vehicle. The camera may have a near infrared LED to capture images at the daytime and the nighttime. Referring to FIG. 50, when a sum of $\angle A$ and $\angle B$ as angles of an eyelid is equal to or less than $\angle C$ as a preset reference value ($\angle A + \angle B \le \angle C$) at the time of sensing an eyelid area from the eye area image, it is determined that the driver closes eyes. A drowsiness load may be calculated by identifying an angle of a driver's eyelid for every preset time to sense the number of times the driver closes eyes and calculating the number of time being eye-closed for the preset time and an eye-closed time, according to the following equation:

$$P = \frac{T_P \times n_P}{T_{preset\ time}} \times D_P$$

P=drowsiness load
$T_{preset\ time}$=preset time
$T_P$=eye-closed time
$n_P$=number of time being eye-closed
$D_P$=drowsiness load weighting.

Driver's forward observation information may be acquired using the driver's face image and eye area image captured by the camera mounted at a predetermined position within the vehicle. The camera may have a near infrared LED to capture images at the daytime and the nighttime. Referring to FIG. 51, visible ranges during no-load driving a and b are determined based on angles of the wheel. That is, the visible ranges during no-load driving a and b are determined by angle rates $\theta_A$ and $\theta_B$ changed on the basis of a central direction. Referring to FIGS. 52 and 53, a driver's viewing range is determined by face angles of the driver (see FIG. 52) and pupil positions of the driver (see FIG. 53) captured by the camera. An observation neglect load is generated when a driver's current viewing range is deviated from the visible ranges during no-load driving a and b, and a preset observation neglect load weighting may vary according to a range corresponding to the driver's current viewing range. The observation neglect load begins to be calculated when the vehicle speed is 10 km/h or more in a state in which the vehicle starts up. The observation neglect load may be calculated by the following equation:

$$E = \frac{T_E}{T_{preset\ time}} \times D_E$$

E=observation neglect load
$T_{preset\ time}$=preset time
$T_E$=time for which driver's viewing range is deviated from visible range during no-load driving
$D_E$=observation neglect load weighting.

As described above, the driver status load may be calculated at S230 by performing a voice load calculation step S231, a drowsiness load calculation step S232, and an observation neglect load calculation step S233, and then performing a step S234 of summing the respective loads, according the following equation:

$$W_i = V + P + E$$

$W_i$=driver status load
V=voice load
P=drowsiness load
E=observation neglect load.

In addition, as described above, the driving load may be calculated at S200 by performing the vehicle driving load calculation step S210, the vehicle operation load calculation step S220, and the driver status load calculation step S230, and then driving load calculation step S240, according the following equation:

$$W_{total} = W_d + W_M + W_i$$

$W_{total}$=driving load
$W_d$=vehicle driving load
$W_M$=vehicle operation load
$W_i$=driver status load.

The comparison step S300 compares between the driving load of the driver calculated in the calculation step S200 and a preset load margin. When the driving load is equal to or less than the preset load margin, it is determined that the driver is in a safe driving state. On the other hand, when the driving load exceeds the preset load margin, it is determined that the driver is not in the safe driving state. The preset load margin may be an experimental value extracted from a sum of a vehicle driving load, a vehicle operation load, and a driver status load through an experiment according to conditions of a test subject. In addition, the preset load margin may be a value of the driving load calculated based on information according to existing driving patterns of the driver. The preset load margin includes a first load margin, a second load margin, and a third load margin. The preset load margin may be stored in the memory portion 3050. The memory portion 3050 may be a nonvolatile memory as a storage means for storing data.

As shown in FIG. 47, the warning step S400 includes a first warning step S410, a second warning step S420, and a third warning step S430. The warning step S400 serves to guide safe driving by performing respective steps of different warning levels depending on signals transferred from the comparison step S300 to inform of a warning corresponding to the driver status. The first warning step S410 is performed when the driving load is equal to or greater than a first load margin and less than a second load margin, and includes a warning sound generation step S411 through a speaker, a warning display step S412 through an AVN or a HUD (Head Up Display), and a vibration notification step S413 through vibration of a steering wheel or a seat. The warning sound generation step S411 plays an announcement or a warning sound for notifying that the driver is not in the safe driving state through the speaker. The warning display step S412 displays a warning message or a warning icon for notifying that the driver is not in the safe driving state through the AVN or the HUD. The vibration notification step S413 induces the driver to have awareness by generating vibration to the steering wheel or the seat. The first warning step S410 is a step of the lowest warning level in the warning step S400.

The second warning step S420 is performed when the driving load is equal to or greater than a second load margin and less than a third load margin, and holds functions of the AVN. That is, since there is a high possibility of safe driving being obstructed when the AVN is operated for a long time, the second warning step S420 induces the driver to concentrate on driving of the vehicle by allowing the AVN to not operate. The second warning step S420 is a step of an intermediate warning level in the warning step S400.

The third warning step S430 is performed when the driving load is equal to or greater than a third load margin, and is a step of safely stopping the vehicle through steering wheel control, transmission control, and brake control. The third warning step S430 is a step of the highest warning level in the warning step S400. When it is determined that the driver may not safely drive the vehicle any more, the third warning step S430 is a step of stopping the vehicle in a safe region through the steering wheel control, the transmission control, and the brake control so as to safely protect the driver.

In accordance with another exemplary embodiment of the present invention, when a first warning step S410 is a first warning, the first warning step S410 may include a warning sound generation step S411 through a speaker, a warning display step S412 through an AVN or a HUD, and a notification step S413 through vibration of a steering wheel or a seat. Since the first warning step S410 is a first warning, the first warning step S410 performs a slight warning for informing the driver of an unsafe driving state. After the first warning step S410 is performed, the process is returned to the information acquisition step S100. Then, the calculation step S200 and the comparison step S300 are performed again so as to determine whether or not the driver is restored to a safe driving state. When it is determined that the driver is not restored to the safe driving state despite execution of the first warning step S410, a second warning step S420 is performed. When the second warning step S420 is a second warning, the second warning step S420 limits functions of an AVN. That is, when the driver operates the AVN despite execution of the first warning step S410, the second warning step S420 stops operation of the AVN to alert the driver to awareness. After the second warning step S420 is performed, the information acquisition step S100, the calculation step S200, and the comparison step S300 are performed again so as to determine whether or not the driver is restored to the safe driving state. When it is determined that the driver is not restored to the safe driving state despite execution of the second warning step S420, a third warning step S430 is performed. When the third warning step S430 is a third warning, the third warning step S430 safely stops the vehicle through steering wheel control, transmission control, and brake control. That is, when the driver is not restored to the safe driving state despite the first and second warnings, the vehicle is autonomously stopped in a safe region against control of the driver. Consequently, it may possible to protect the driver which is not personally restored to the safe driving state.

Figure 54:
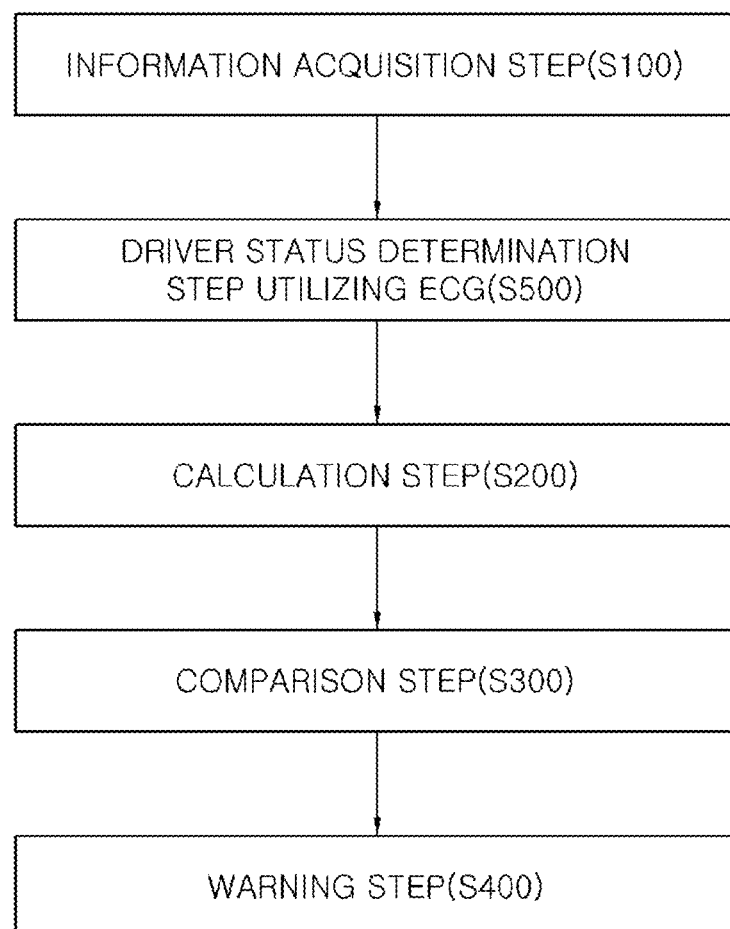
FIG. 54 is a flowchart schematically illustrating a method of detecting a driver status which includes a driver status determination step utilizing an ECG according to still another embodiment of the present invention.
Figure 55:
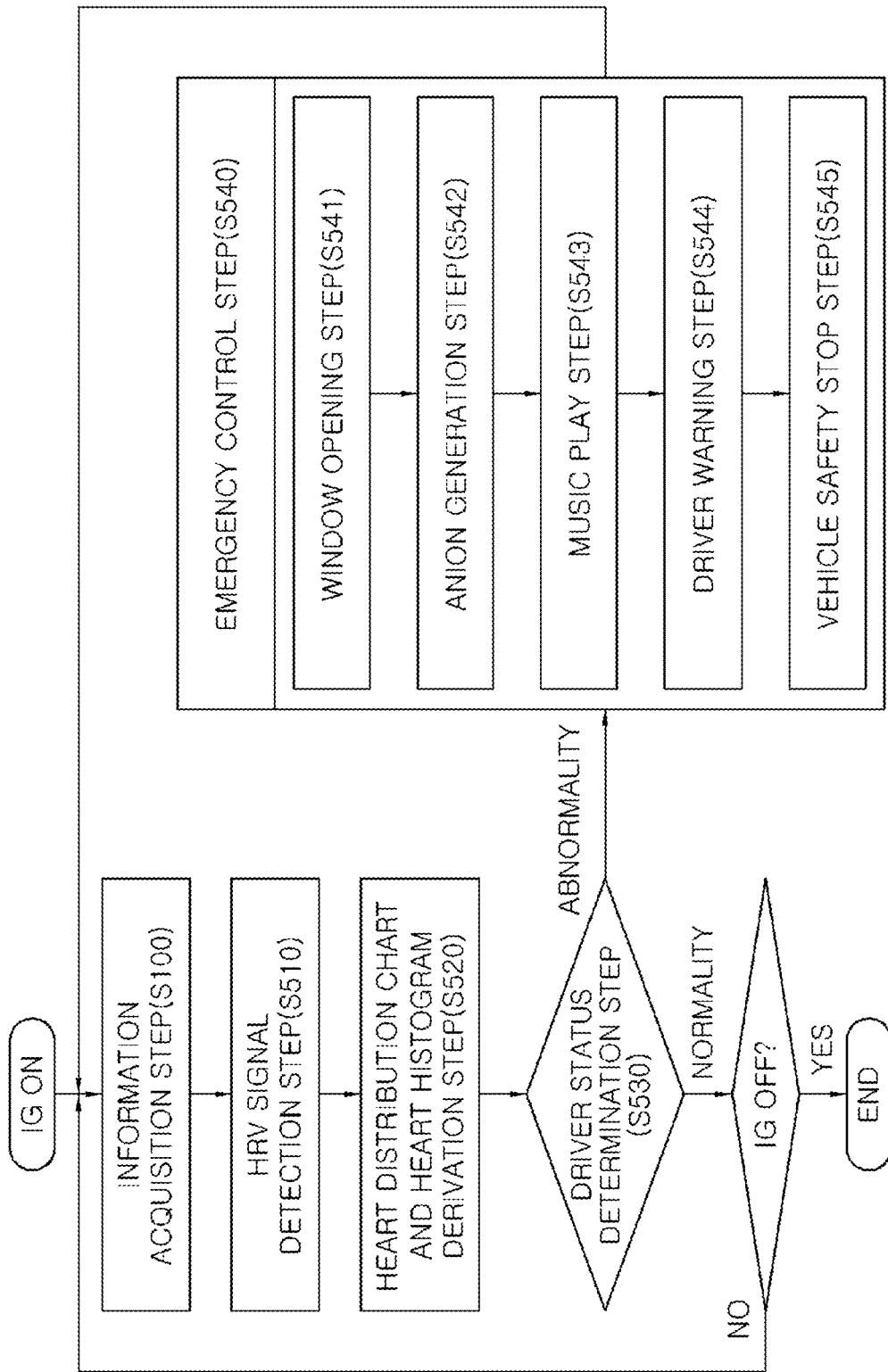
FIG. 55 is a detailed flowchart illustrating the driver status determination step utilizing the ECG according to the embodiment of the present invention.
Figure 56:
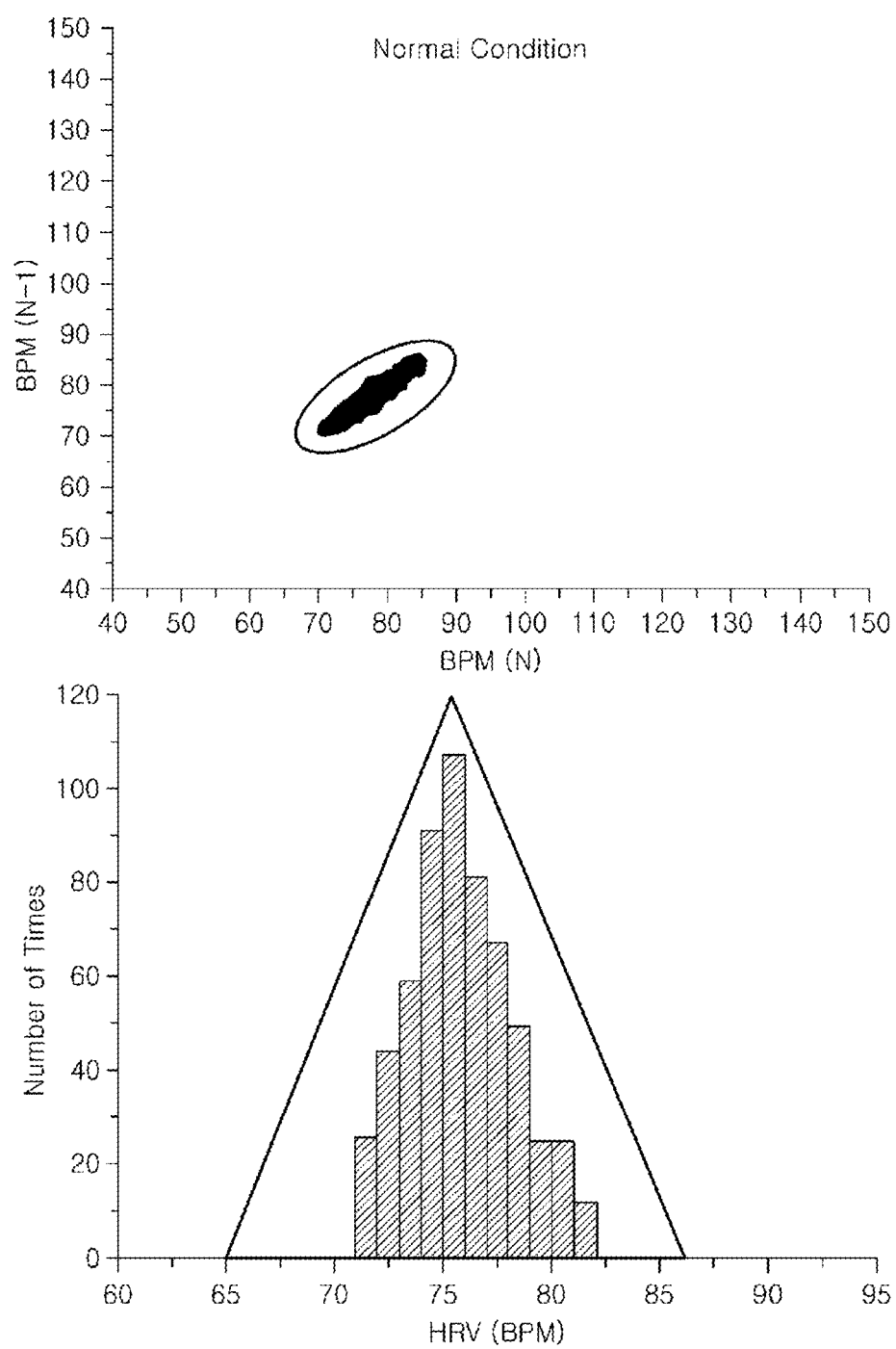
FIGS. 56 and 57 are views for explaining a method of determining a driver status from a driver's heart distribution chart and heart histogram in the method of detecting a driver status according to the embodiment of the present invention.
Figure 57:
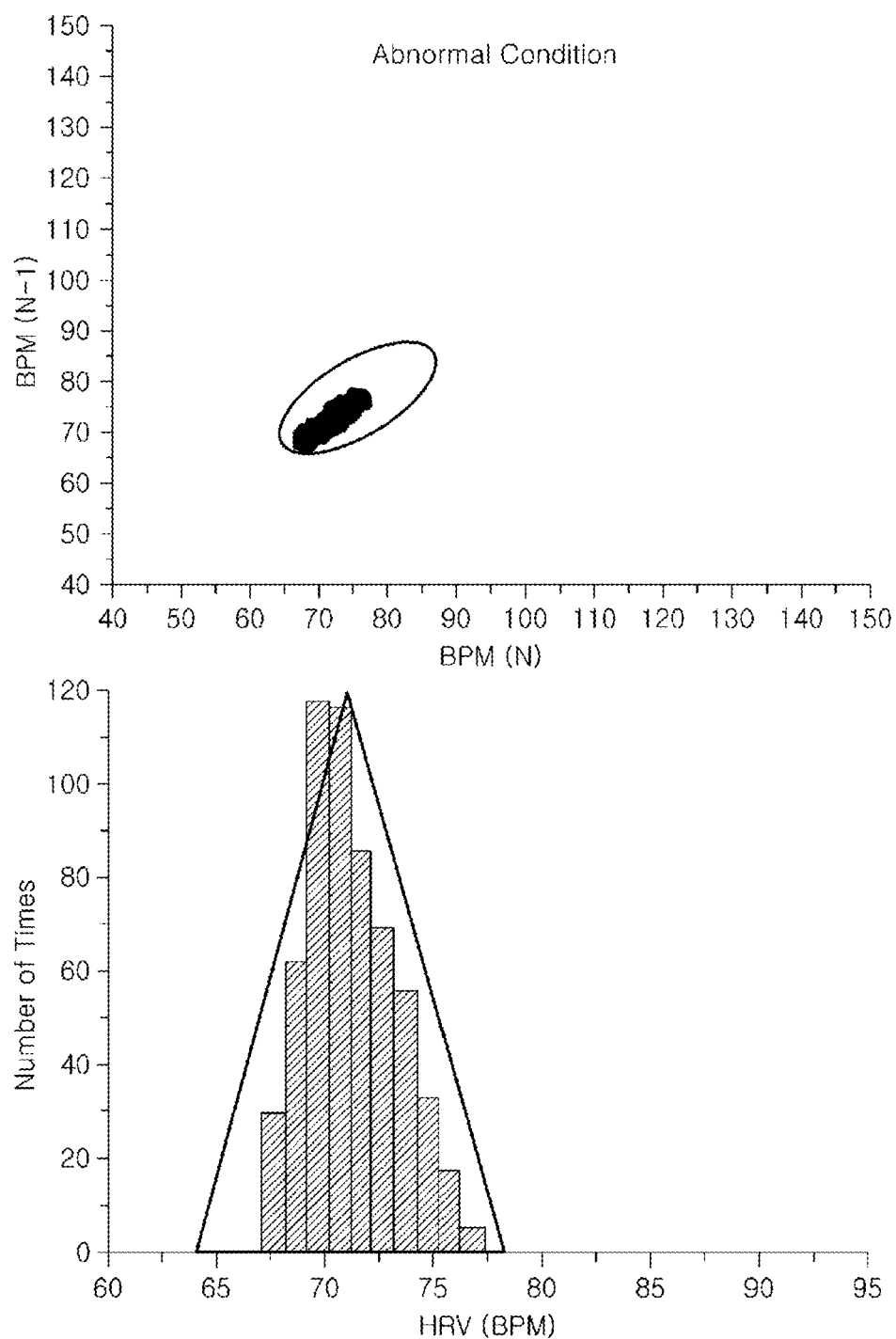

FIG. 54 is a flowchart schematically illustrating a method of detecting a driver status which includes a driver status determination step utilizing an ECG according to still another embodiment of the present invention. FIG. 55 is a detailed flowchart of FIG. 50. FIGS. 56 and 57 are views for explaining a method of determining a driver status from a driver's heart distribution chart and heart histogram. Referring to FIGS. 54 to 57, in the present invention, an HRV (Heart Rate Variability) is calculated using an ECG measurement value in order to allow a driver to directly analyze a driving load. The HRV is an index of measurement of a driver's work load, namely, the driving load, and is a method used together with an HR measurement method. Since the HRV obviously exhibits a level of difficulty to which a human body responds to stimulation, the HRV may be used as a quantified index in measuring the driving load.

As shown in FIG. 55, driver's ECG and PPG signal information is acquired through an ECG sensor and a PPG sensor as a wearable sensor in an information acquisition step S100, an HRV signal is detected from the acquired ECG and PPG signal information in an HRV signal detection step S510, a heart distribution chart and a heart histogram are derived from analysis of a time domain and frequency range of the HRV signal in a heart distribution chart and heart histogram derivation step S520, and a driver status determination step S530 determines whether a driver is in a normal condition or in an abnormal condition through the heart distribution chart and the heart histogram.

As shown in FIGS. 56 and 57, in the normal condition, it may be identified that the heart distribution chart is evenly and widely distributed within a red reference range and the heart histogram forms a large triangular shape. On the other hand, in the abnormal condition due to activation of the stress or parasympathetic nerve, it may be identified that the heart distribution chart is intensively exhibited at a low numerical value and the heart histogram forms a small triangular shape.

When the driver status determination step S530 determines that the driver is in the abnormal condition, an emergency control step S540 is separately performed without performing a calculation step S200, a comparison step S300, and a warning step S400. The emergency control step S540 may include a window opening step S541, an anion generation step S542, a music play step S543, a driver warning step S544 through an AVN or a HUD, and a vehicle safety stop step S545 through steering wheel control, transmission control, and brake control. As described above, when it is determined that the driver is in the abnormal condition in a driver status determination step utilizing an ECG S500, it is an emergency situation capable of being a deadly danger to safety of the driver. Accordingly, the emergency control step S540 is separately performed without performing the calculation step S200, the comparison step S300, and the warning step S400.

Figure 58:
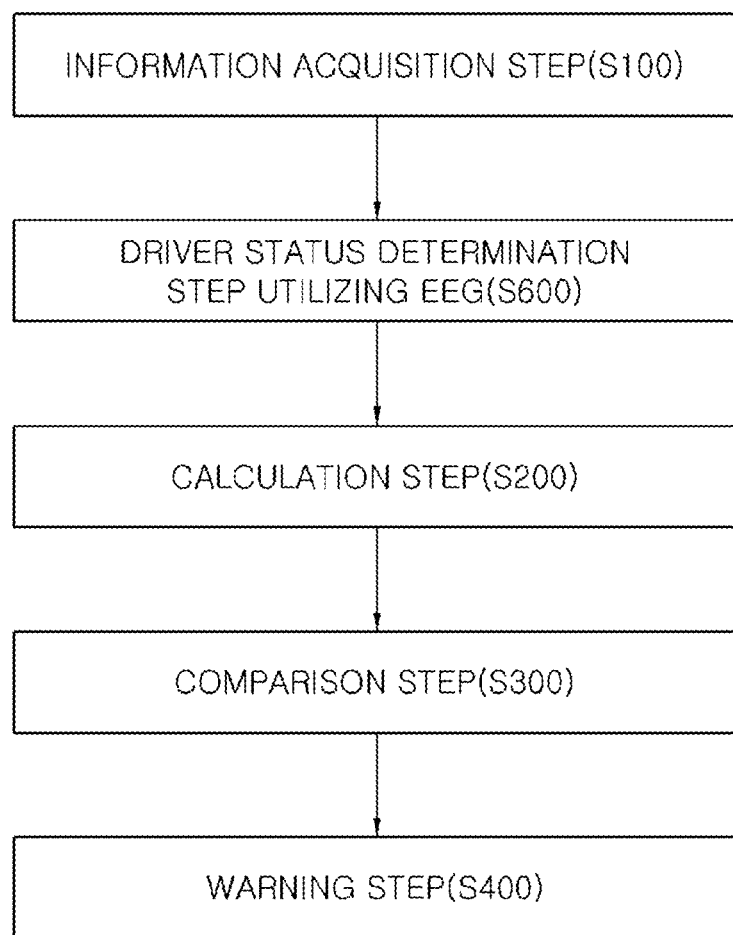
FIG. 58 is a flowchart schematically illustrating a method of detecting a driver status which includes a driver status determination step utilizing an EEG according to yet another embodiment of the present invention.
Figure 59:
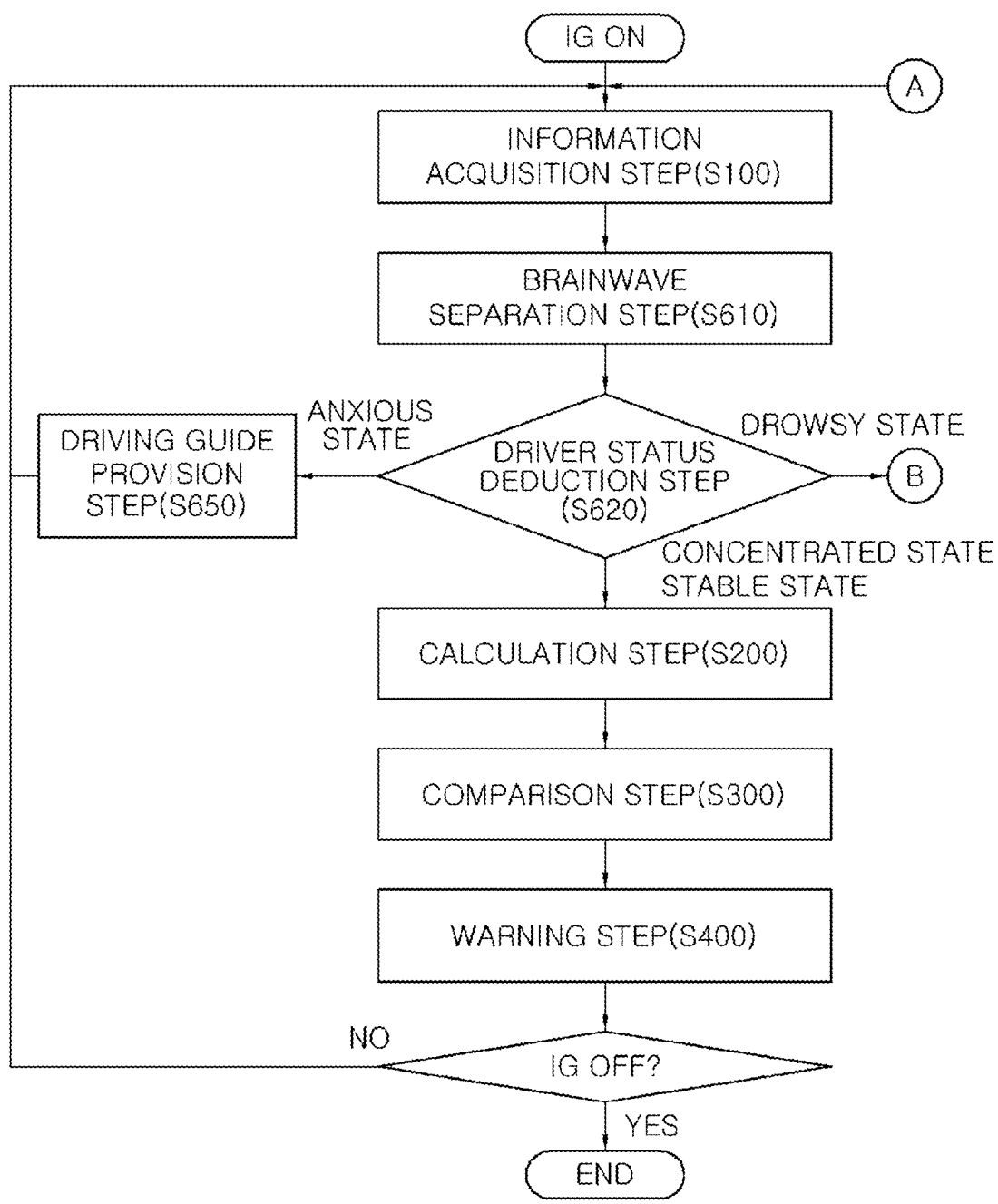
FIGS. 59 and 60 are detailed flowcharts illustrating the driver status determination step utilizing the EEG according to the embodiment of the present invention.
Figure 60:
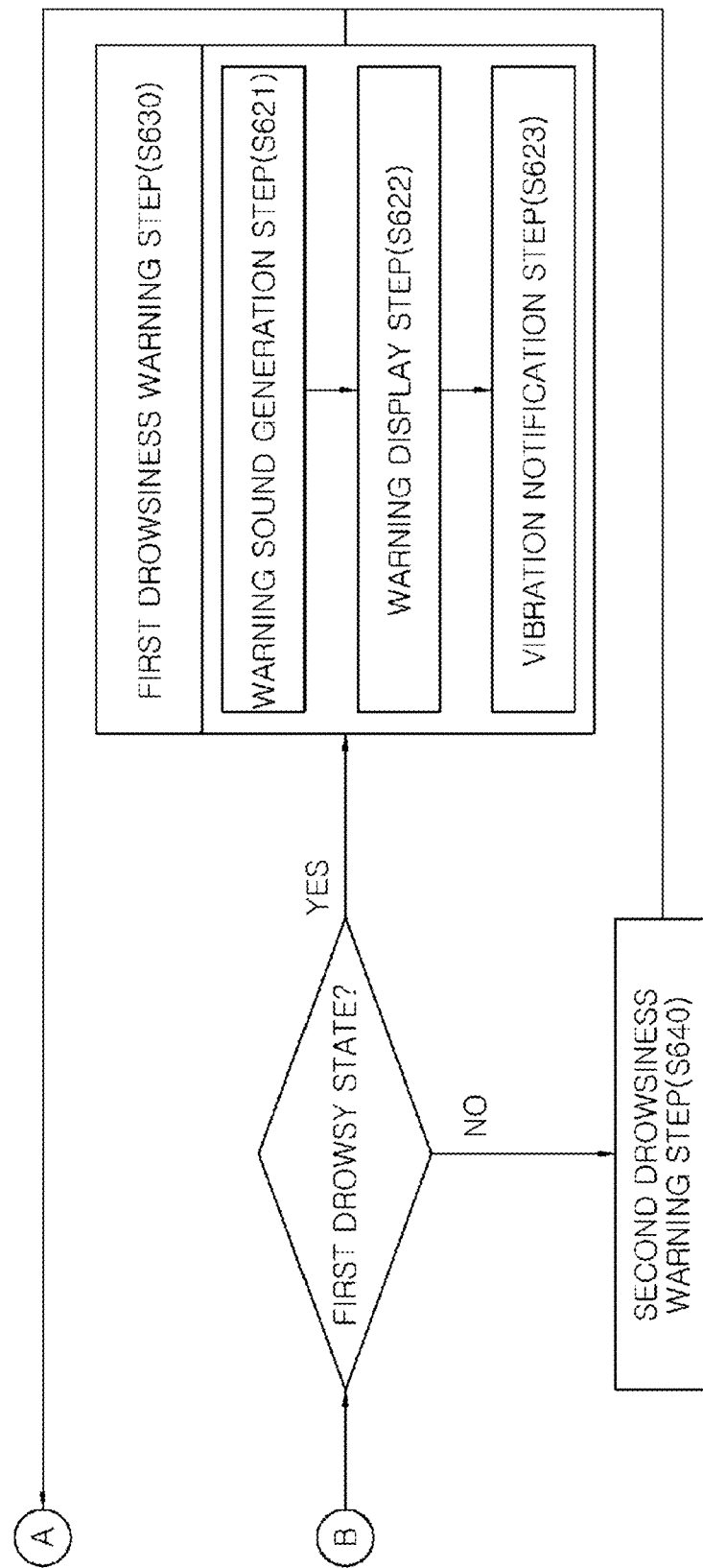
Figure 61:
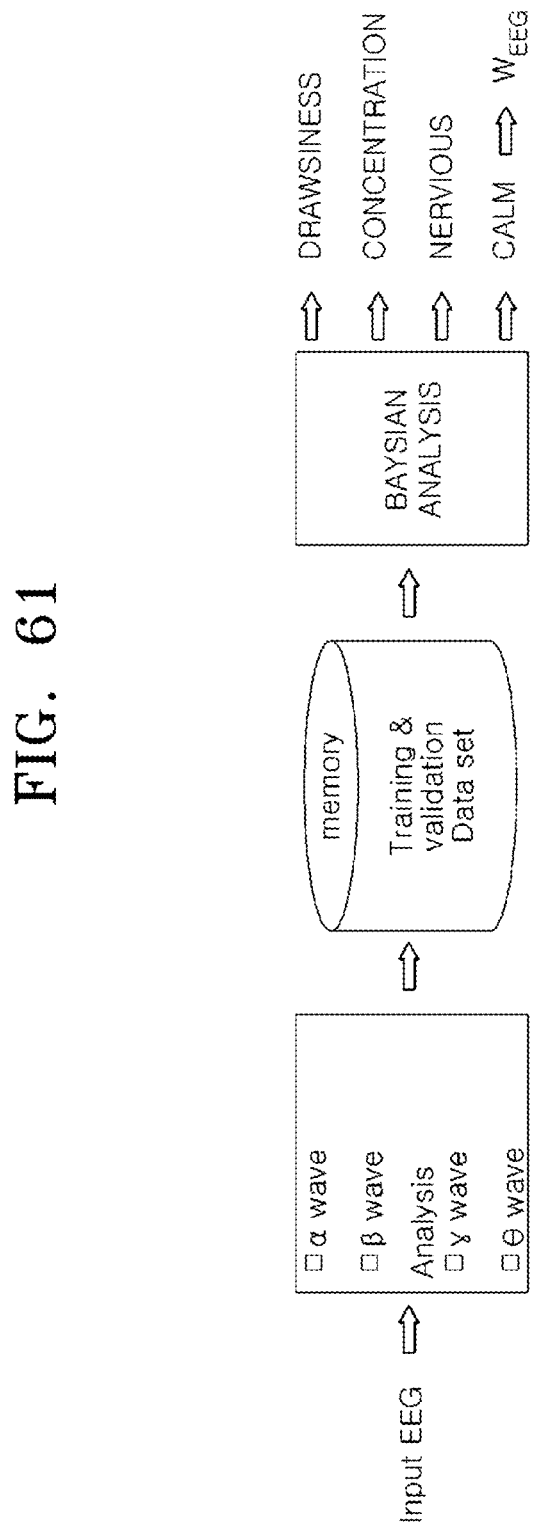
FIG. 61 is a view for schematically explaining a method of determining a driver status utilizing the EEG in the method of detecting a driver status according to the embodiment of the present invention.
Figure 63:
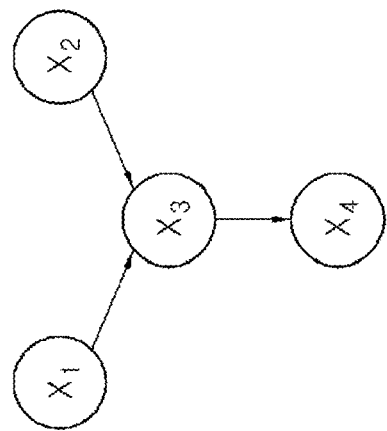
FIG. 63 is a diagram for explaining a method of finding a frequency range for each brainwave using a Bayesian network.
Figure 64:
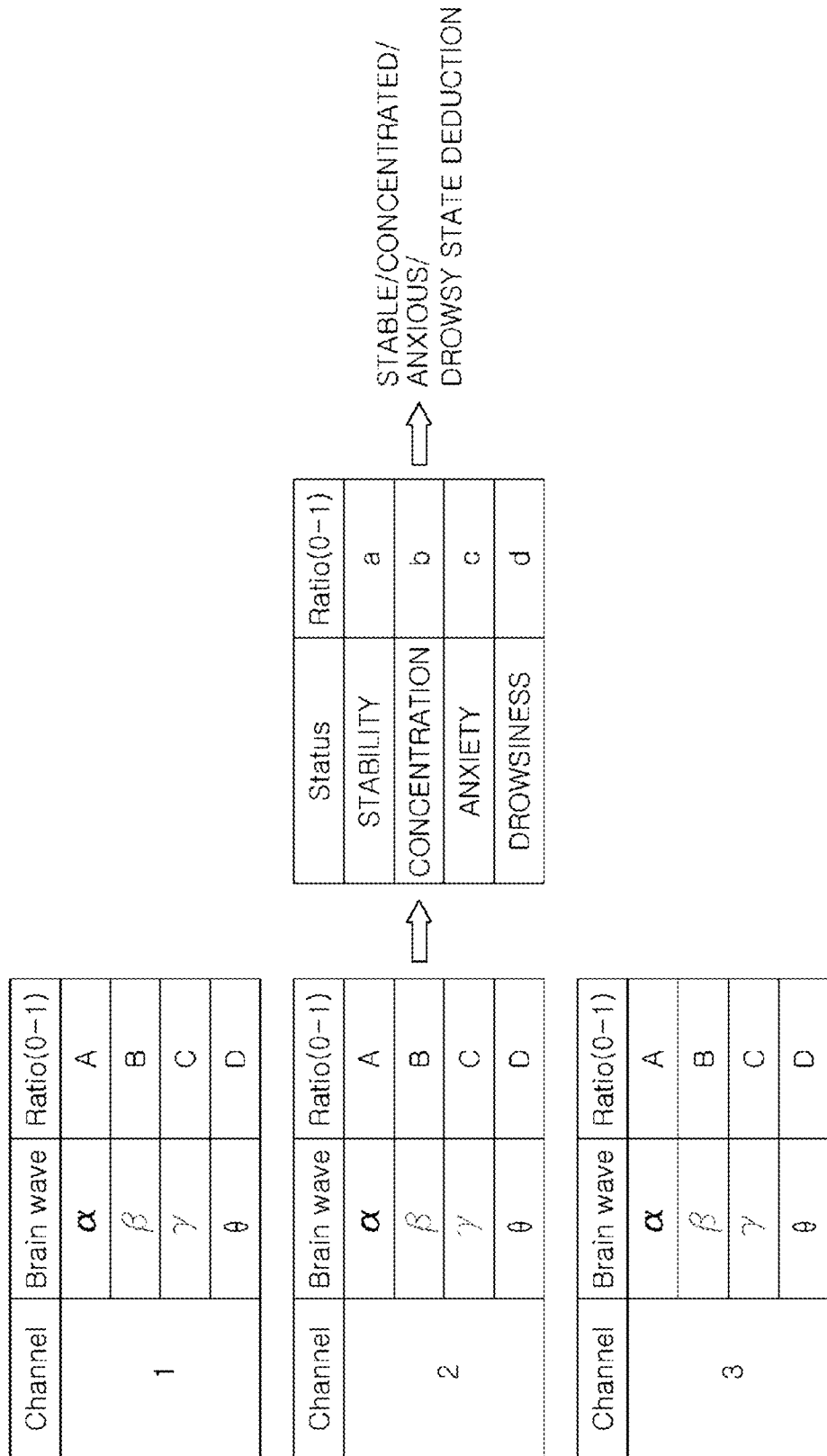
FIG. 64 is a conceptual diagram illustrating a driver status deduction step using the Bayesian network according to the embodiment of the present invention.
Figure 65:
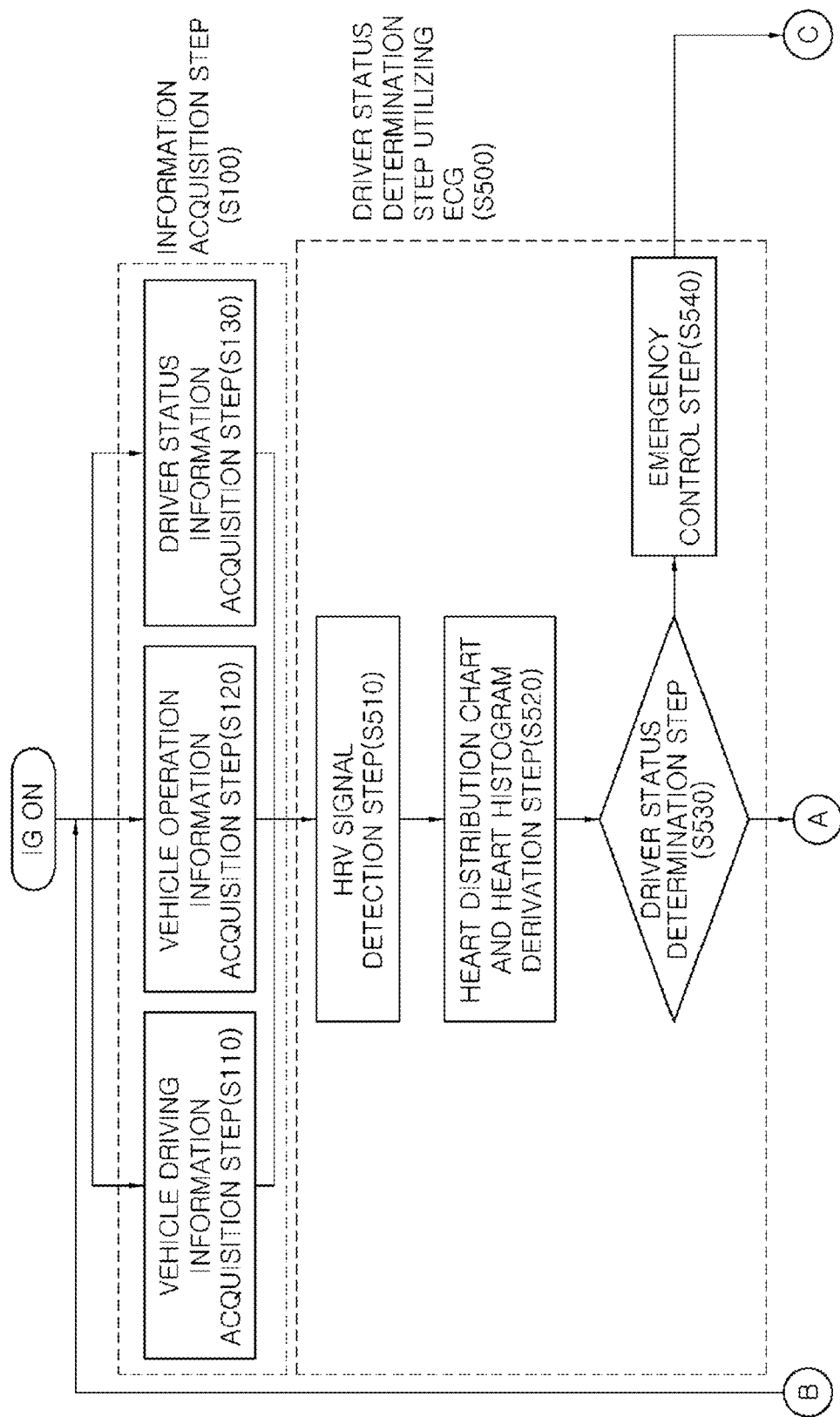
FIGS. 65 to 68 are detailed flowcharts illustrating a method of determining a driver status utilizing an ECG and an EEG according to a further embodiment of the present invention.
Figure 66:
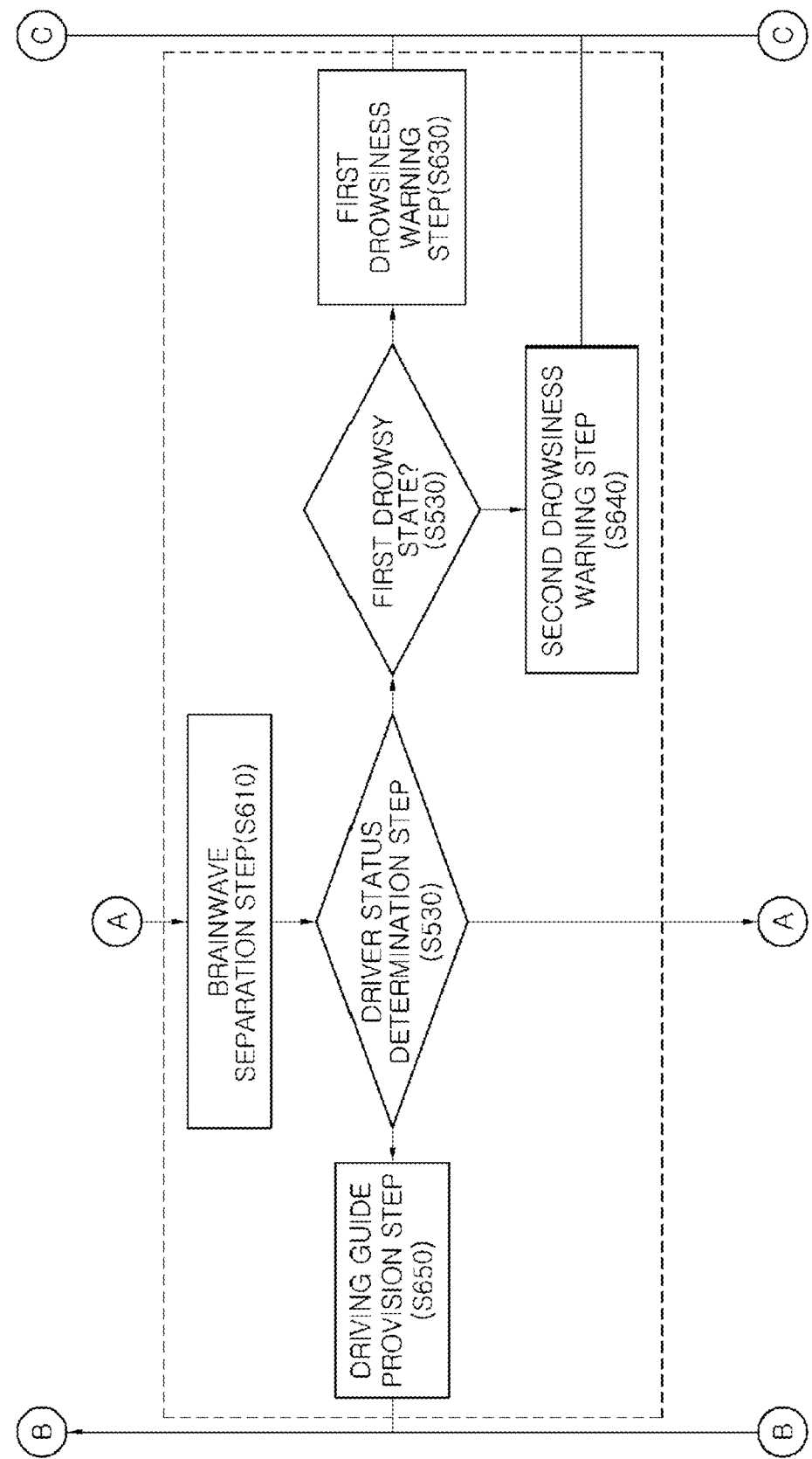
Figure 67:
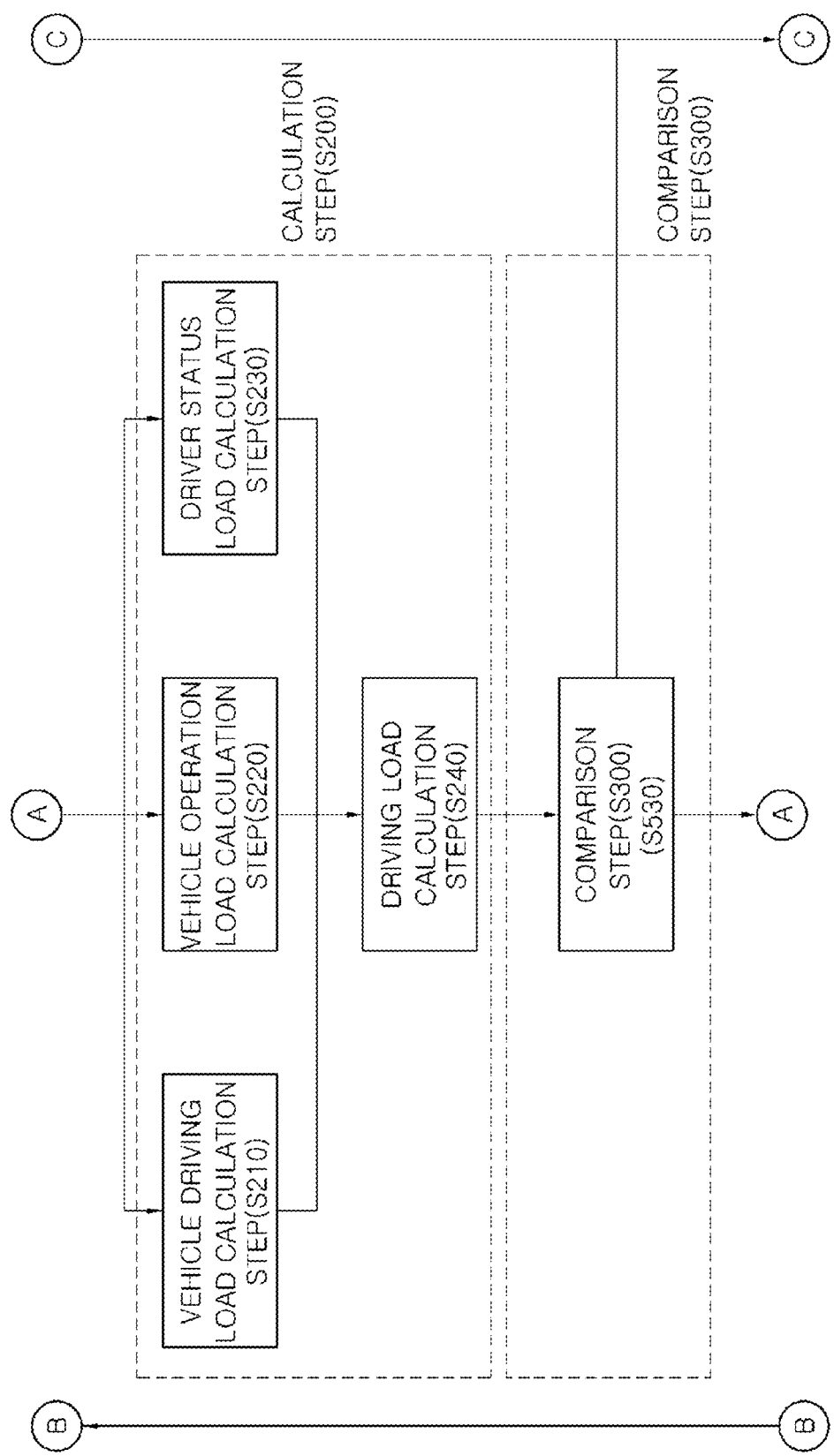
Figure 68:
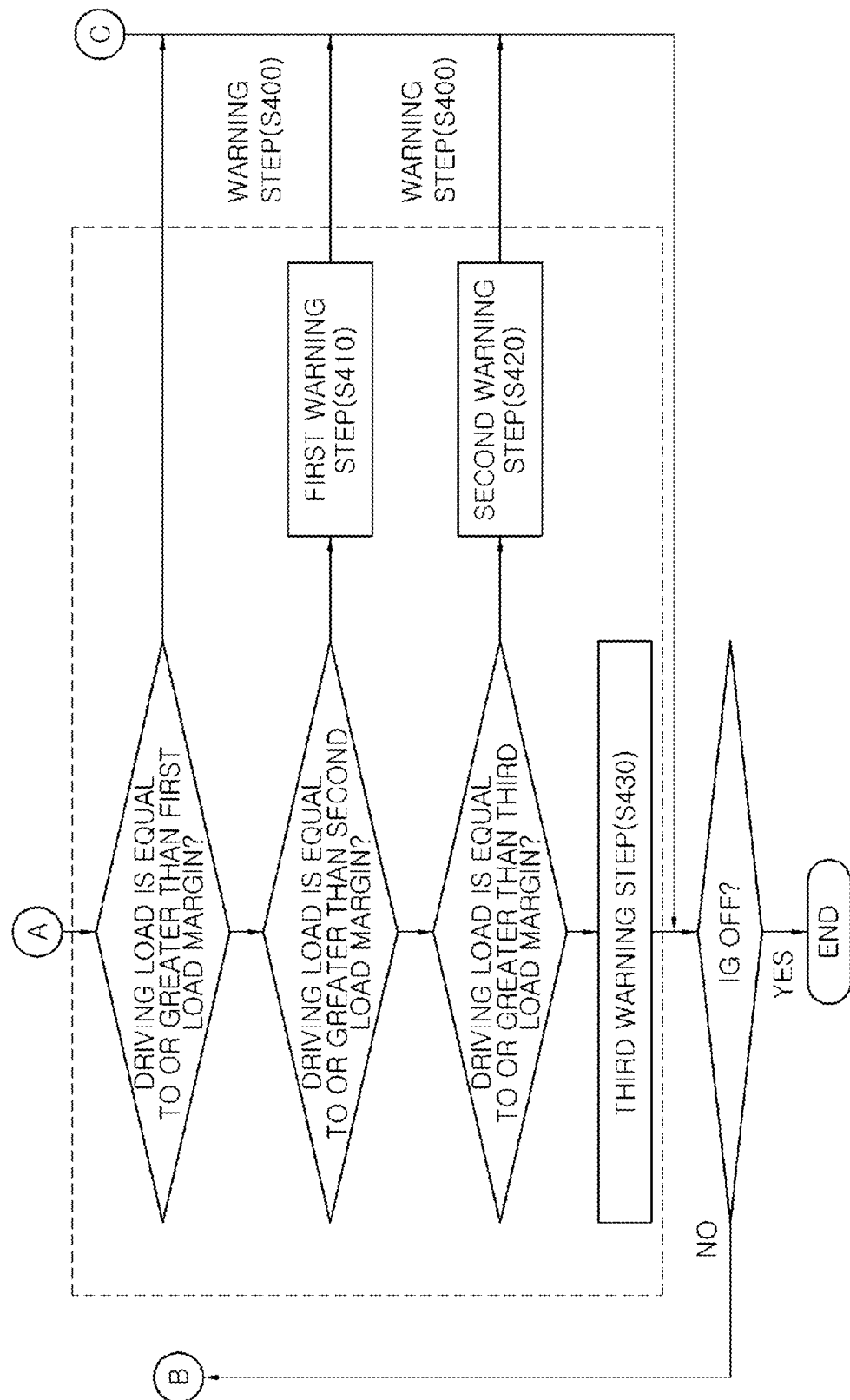

FIG. 58 is a flowchart schematically illustrating a method of detecting a driver status which includes a driver status determination step utilizing an EEG according to yet another embodiment of the present invention. FIGS. 59 and 60 are detailed flowcharts illustrating the driver status determination step utilizing the EEG. FIG. 61 is a view for schematically explaining a method of determining a driver status utilizing the EEG. FIG. 62 is a table illustrating a frequency range and characteristic of each brainwave. FIG. 63 is a diagram for explaining a method of finding a frequency range for each brainwave using a Bayesian network. FIG. 64 is a conceptual diagram illustrating a driver status deduction step using the Bayesian network. Referring to FIGS. 58 to 64, a α wave is increased in a driver's brainwave when a driver has relaxed tension or is drowsy, and a β wave is increased in the driver's brainwave when the driver feels tense and anxious. Since a brainwave activity may quantify tension and anxiety, the brainwave activity may be used as quantitative data for determination of a driving load.

As shown in FIGS. 59 and 60, a driver status is deduced at S620 by acquiring driver's brainwave information through a wearable sensor of a headset type S100, separating respective waveforms of the acquired driver's brainwave for each frequency S610, and finding a frequency range for each brainwave using a Bayesian network. That is, as shown in FIGS. 61 to 64, the driver status may be finally deduced using a method of determining a comparison between the drive status and existing data by indicating an uncertain situation as a probability value through the Bayesian network and simplifying a complicated deduction process as a relation between quantitative nodes. The existing data may be stored in the memory portion 3050.

The driver status deduction step S620 determines whether or not the driver is in a first drowsy state when the driver is deduced to be in a drowsy state. When it is determined that the driver is in the first drowsy state, a first drowsiness warning step S630 is performed. The first drowsiness warning step S630 includes steps, such as a music play or warning sound generation step S621 through a speaker, a warning display step S622 through an AVN or a HUD, and a vibration notification step S623 through vibration of a steering wheel or a seat, which are capable of awakening the driver from the drowsy state. In order to identify whether or not the driver is awakened from the drowsy state after the first drowsiness warning step S630, the information acquisition step S100, the brainwave separation step S610, and the driver status deduction step S620 are performed again. When the driver status deduction step S620 deduces that the driver is in a second drowsy state despite execution of the first drowsiness warning step S630, the process performs a second drowsiness warning step S640 of safely stopping the vehicle through steering wheel control, transmission control, and brake control. That is, when the driver is restored to the awakened state despite the first and second drowsiness warnings, the vehicle is autonomously stopped in a safe region against control of the driver. Consequently, it may possible to protect the drowsy driver. As described above, when it is deduced that the driver is in the drowsy state in a driver status determination step utilizing an EEG S600, it is an emergency situation capable of being a deadly danger to safety of the driver. Accordingly, the first and second drowsiness warning steps S630 and S640 are separately performed without performing a calculation step S200, a comparison step S300, and a warning step S400.

When the driver status deduction step S620 deduces that the driver is in an anxious state, a system determines an operation condition algorithm for vehicle driving such that errors are not present in the algorithm, so as to provide the driver with a driving guide through the AVN or the HUD S650. As described above, when it is deduced that the driver is in the anxious state in the driver status determination step utilizing an EEG S600, it is an emergency situation capable of being a deadly danger to safety of the driver. Accordingly, the driving guide provision step S650 is separately performed without performing the calculation step S200, the comparison step S300, and the warning step S400.

When it is deduced that the driver is in a concentrated or stable state in the driver status deduction step S620, the calculation step S200 including calculation of a brainwave load $W_{EEG}$ is performed. The brainwave load $W_{EEG}$ is calculated through a signal ratio in the concentrated or stable state, as in the following equation:

$$W_{EEG} = \frac{\alpha \, \text{wave}(8 \sim 12.99 \, \text{Hz})}{\beta \, \text{wave}(13 \sim 29.99 \, \text{Hz})}.$$

When a 60 wave value becomes a maximum value (12.99 Hz) by dividing a mean frequency value of the α wave and β wave extracted for a unit time, the greatest value of the brainwave load $W_{EEG}$ approximates 1. Accordingly, the brainwave load $W_{EEG}$ is maximized. In addition, the contraposition is established. A value, which multiplies the calculated value of the brainwave load $W_{EEG}$ by a brainwave load correction value φ calculated by an experiment, is summed in the calculation step S200, as in the following equation:

$$W_{total} = W_D + W_M + W_i + \varphi + W_{EED}$$

$W_{total}$=driving load
$W_D$=vehicle driving load
$W_M$=vehicle operation load
$W_i$=driver status load
$W_{EED}$=brainwave load
φ=brainwave load correction value.

FIGS. 65 to 68 are detailed flowcharts illustrating a method of determining a driver status utilizing an ECG and an EEG according to a further embodiment of the present invention. As shown in FIG. 59, a method of detecting a driver status according to an exemplary embodiment of the present invention may be performed in order of an information acquisition step S100, a driver status determination step utilizing an ECG S500, a driver status determination step utilizing an EEG S600, a calculation step S200, a comparison step S300, and a warning step S400. A method of detecting a driver status according to another exemplary embodiment of the present invention may also be performed in reversed order of a driver status determination step utilizing an ECG S500 and a driver status determination step utilizing an EEG S600. That is, the method may be performed in order of an information acquisition step S100, a driver status determination step utilizing an EEG S600, a driver status determination step utilizing an ECG S500, a calculation step S200, a comparison step S300, and a warning step S400.

Figure 69:
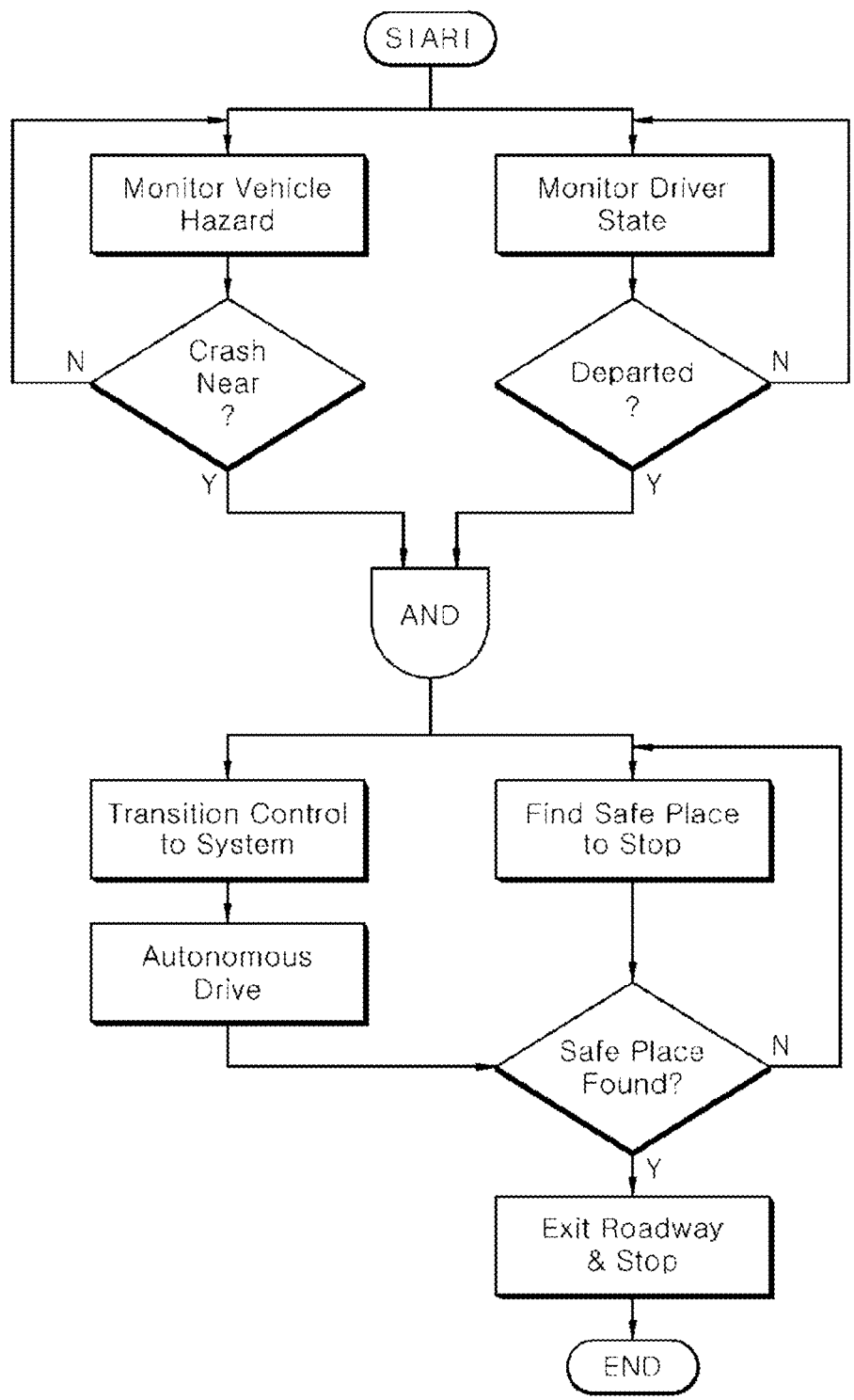
FIG. 69 is diagrams for describing a basic algorithm of the vehicle safety support apparatus in accordance with the embodiment of the present invention.

FIG. 69 is diagrams for describing a basic algorithm of the vehicle safety support apparatus in accordance with the embodiment of the present invention.

As shown in FIG. 69, the vehicle safety support apparatus evaluates collision hazard level and detects departed driver, and then rescues the driver from the hazard and performs exit maneuver.

Specifically, in the steps of "Monitor Vehicle Hazard" and "Crash Near?", outside sensors are used to evaluate collision hazard level and the apparatus evaluates hazard situations such as leaving lane, approaching other car, unsafe change in speed, etc.

In the steps of "Monitor Driver State" and "Departed?", driver camera is used to detect driver no longer watching roadway, and steering and controls of the driver are monitored to monitor driver no longer controlling.

And the apparatus requires positive states for both "Driver Appears Departed" and "Crash is Very Near" to transition control to autonomous.

In the step of "Transition Control to System", full control of vehicle is transferred to the apparatus and further driver inputs are filtered.

In the step of "Autonomous Drive", outside sensors, brake and steer actuators and map are used to rescue the vehicle from immediate hazard, and the apparatus continues to drive and maintain safe behavior in current traffic.

In the steps of "Find Safe Place to Stop" and "Safe Place Found?", map is used to identify local road side safe area candidates and outside sensors are used to verify roadside area clear and safe for pulling over.

In the steps of "Exit Roadway & Stop", outside sensors are used to confirm clear area off roadway edge, and the apparatus maneuvers the vehicle off of roadway and out of traffic, and the apparatus sends signal for Help for departed driver.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A vehicle safety support apparatus comprising:
a driver monitoring sensor configured to monitor a driver;
an external environment monitoring sensor configured to monitor an external environment of a vehicle; and
at least one processor configured to:
determine whether the vehicle is in an immediate hazard situation based on data acquired from the driver monitoring sensor and the external environment monitoring sensor;
determine, in response to determining that the vehicle is in the immediate hazard situation, whether to perform a recovery maneuver or a rescue maneuver based on the data acquired from the driver monitoring sensor and the external environment monitoring sensor to get out of the immediate hazard situation;
perform, in response to determining to perform the rescue maneuver, autonomous driving to move the vehicle to a safe area by taking over a driving control from the driver; and
a driver input filtering unit configured to filter a vehicle control input by the driver,
wherein the at least one processor is configured to control the driver input filtering unit to block the vehicle control input from the driver in response to determining to perform the rescue maneuver.

2. The vehicle safety support apparatus of claim 1, wherein the at least one processor is configured to:
estimate an availability of the driver based on the data acquired from the driver monitoring sensor;
estimate a traffic hazard based on the data acquired from the external environment monitoring sensor; and
determine to take over the driving control based on the estimated availability of the driver and traffic hazard.

3. The vehicle safety support apparatus of claim 1, wherein the at least one processor is configured to perform the rescue maneuver in response to the vehicle is in immediate hazard situation and there is no response by the driver.

4. The vehicle safety support apparatus of claim 1, wherein the recovery maneuver comprises at least one of:

returning the vehicle to original lane; emergency braking to avoid colliding into another vehicle; and running through an intersection.

5. The vehicle safety support apparatus of claim 1, wherein the at least one processor is configured to operate a hazard lamp of the vehicle in response to performing the autonomous driving.

6. The vehicle safety support apparatus of claim 1, wherein the at least one processor is configured to transmit a signal requesting for emergency assistance through a communication unit, in response to performing autonomous driving to move the vehicle to the safe area.

7. The vehicle safety support apparatus of claim 1, wherein the at least one processor is configured to perform the autonomous driving based on the data acquired from the external environment monitoring sensor.

8. The vehicle safety support apparatus of claim 1, wherein the driver monitoring sensor comprises: at least one interior camera for filming the driver; a steering wheel angle sensor; an accelerator pedal sensor; and a brake pedal sensor.

9. The vehicle safety support apparatus of claim 1, wherein the external environment monitoring sensor comprises: at least one exterior camera; radar; and ultrasonic sensor, configured to detect an outside environment of the vehicle.

10. A vehicle safety support method comprising:
monitoring, using sensors, a driver and an external environment of a vehicle;
estimating, by at least one processor, an availability of a driver and traffic hazard based on data acquired from monitoring the driver and the external environment;
determining whether the vehicle is in an immediate hazard situation based on the estimated availability of the driver and traffic hazard;
determining, by the at least one processor in response to determining that the vehicle is in the immediate hazard situation, whether to perform a recovery maneuver or a rescue maneuver based on the estimated availability of the driver and traffic hazard to get out of the immediate hazard situation;
performing, by the at least one processor in response to determining to perform the rescue maneuver, autonomous driving to move the vehicle to a safe area, by taking over a driving control from the driver; and
blocking, by the at least one processor, a vehicle control input from the driver, in response to determining to perform the rescue maneuver.

11. The vehicle safety support method of claim 10, further comprising:
transmitting, by the at least one processor, a signal for requesting an emergency assistance through a communication unit, in response to the performing of the autonomous driving to move the vehicle to the safe area.

12. The vehicle safety support method of claim 10, wherein the monitoring, using the sensors, of the driver and the external environment comprises:
monitoring at least one of physical feature, posture, and control intention of the driver.

13. The vehicle safety support method of claim 10, wherein the monitoring of the driver and the external environment, using the sensors, comprises:
monitoring at least one of road and traffic environment outside of the vehicle.

14. The vehicle safety support method of claim 10, wherein the recovery maneuver comprises at least one of: returning the vehicle to original lane; emergency braking to avoid colliding into another vehicle; and running through an intersection.

* * * * *